United States Patent
Kim et al.

(10) Patent No.: US 12,022,854 B2
(45) Date of Patent: Jul. 2, 2024

(54) COOKING APPARATUS, COOKING APPARATUS CONTROLLING SYSTEM, AND METHOD OF CONTROLLING COOKING APPARATUS

(71) Applicant: Samsung Electronics Co., Ltd., Suwon-si (KR)

(72) Inventors: Tae-Woo Kim, Suwon-si (KR); Cheol Jin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 852 days.

(21) Appl. No.: 17/105,880

(22) Filed: Nov. 27, 2020

(65) Prior Publication Data

US 2021/0076714 A1 Mar. 18, 2021

Related U.S. Application Data

(63) Continuation of application No. 15/339,122, filed on Oct. 31, 2016, now abandoned.

(30) Foreign Application Priority Data

Oct. 30, 2015 (KR) .......................... 10-2015-0151887

(51) Int. Cl.
*A23L 5/10* (2016.01)
*A47J 36/32* (2006.01)
(Continued)

(52) U.S. Cl.
CPC ............... *A23L 5/15* (2016.08); *A47J 36/321* (2018.08); *F24C 3/126* (2013.01); *F24C 7/082* (2013.01);
(Continued)

(58) Field of Classification Search
CPC ....... A47J 36/321; A23L 5/15; F24C 15/2021; F24C 3/122; F24C 3/126; F24C 7/081;
(Continued)

(56) References Cited

U.S. PATENT DOCUMENTS 4,143,646 A 3/1979 Sampsel
4,567,763 A 2/1986 Schiffbauer
(Continued)

FOREIGN PATENT DOCUMENTS

CN 1704669 A 12/2005
CN 103271630 A 9/2013
(Continued)

OTHER PUBLICATIONS

European Search Report dated Oct. 4, 2018, issued in European Patent Application No. 16860302.5.
(Continued)

*Primary Examiner* — Reginald Alexander
(74) *Attorney, Agent, or Firm* — Jefferson IP Law, LLP

(57) ABSTRACT

A cooking apparatus, a cooking apparatus controlling system, and a method of controlling a cooking apparatus are provided. The cooking apparatus controlling system includes a first cooking apparatus having a user interface configured to receive a user command from a user and a second cooking apparatus separated from the first cooking apparatus and configured to receive the user command input to the first cooking apparatus and operate according to the user command. The user interface receives one or more of a user command related to the first cooking apparatus and a user command related to the second cooking apparatus. The first cooking apparatus includes a first communicator. The second cooking apparatus includes a second communicator configured to communicate with the first communicator.

7 Claims, 46 Drawing Sheets

(51) Int. Cl.
*F24C 3/12* (2006.01)
*F24C 7/08* (2006.01)
*F24C 15/20* (2006.01)
*G05B 15/02* (2006.01)
*H05B 6/64* (2006.01)

(52) U.S. Cl.
CPC .......... *F24C 15/2021* (2013.01); *G05B 15/02* (2013.01); *H05B 6/6423* (2013.01); *H05B 6/6435* (2013.01); *A23V 2002/00* (2013.01); *G05B 2219/2643* (2013.01)

(58) Field of Classification Search
CPC ..... F24C 7/082; H05B 6/6423; H05B 6/6435; G05B 15/02; G05B 19/9423
See application file for complete search history.

(56) References Cited

U.S. PATENT DOCUMENTS

| | | | |
|---|---|---|---|
| 4,812,963 | A | 3/1989 | Albrecht et al. |
| 4,919,950 | A | 4/1990 | Mak |
| 5,525,771 | A | 6/1996 | Lund |
| 6,043,461 | A | 3/2000 | Holling et al. |
| 6,933,477 | B2 | 8/2005 | Becker et al. |
| 2003/0109938 | A1 | 6/2003 | Daum et al. |
| 2004/0200828 | A1 | 10/2004 | Becker et al. |
| 2004/0256378 | A1 | 12/2004 | Shukla |
| 2009/0095738 | A1 | 4/2009 | McNamee et al. |
| 2010/0205295 | A1 | 8/2010 | Dietmayer et al. |
| 2011/0070340 | A1 | 3/2011 | Pechaigner et al. |
| 2013/0171305 | A1 | 7/2013 | Cescot et al. |
| 2013/0176116 | A1 | 7/2013 | Jung et al. |
| 2013/0255661 | A1 | 10/2013 | Yamanaka et al. |
| 2014/0165849 | A1* | 6/2014 | Mateos Martin ....... F23N 5/242 431/14 |
| 2015/0302569 | A1 | 10/2015 | Armstrong et al. |
| 2023/0129115 | A1* | 4/2023 | Sinur .................. H04L 12/2816 126/299 D |

FOREIGN PATENT DOCUMENTS

| | | |
|---|---|---|
| DE | 35 16 464 A1 | 11/1986 |
| DE | 297 23 914 U1 | 12/1999 |
| DE | 103 27 273 A1 | 1/2005 |
| DE | 10 2012 210852 A1 | 1/2014 |
| EP | 2 894 816 A1 | 7/2015 |
| EP | 3 353 472 | 8/2018 |
| JP | 2-140512 A | 5/1990 |
| KR | 20-1999-0041009 U | 12/1999 |
| KR | 10-2015-0022393 A | 3/2015 |

OTHER PUBLICATIONS

Chinese Office Action dated Mar. 11, 2019, issued in a counterpart Chinese application No. 201680074976.0.
Chinese Office Action dated Sep. 25, 2019, issued in a counterpart Chinese application No. 201680074976.0.
Chinese Office Action dated Jul. 31, 2020, issued in Chinese Application No. 2016800749760.
European Office Action dated Jun. 8, 2020, issued in European Patent Office Application No. 16 860 302.5.
Chinese Office Action dated Jul. 31, 2020, issued in Chinese Patent Application No. 2016800749760.
Chinese Office Action dated Mar. 17, 2020, issued in a counterpart Chinese application No. 201680074976.0.
Australian Office Action dated Jul. 21, 2021, issued in Australian Patent Application No. 2016346866.
Korean Office Action dated Aug. 23, 2021, issued in Korean Patent Application No. 10-2015-0151887.
Indian Office Action dated Dec. 29, 2022, issued in Indian Patent Application No. 201817019806.

* cited by examiner

COOKING APPARATUS, COOKING APPARATUS CONTROLLING SYSTEM, AND METHOD OF CONTROLLING COOKING APPARATUS

CROSS-REFERENCE TO RELATED APPLICATION(S)

This application is a continuation application of prior application Ser. No. 15/339,122, filed on Oct. 31, 2016, which was based on and claimed priority under 35 U.S.C. § 119(a) of a Korean patent application number 10-2015-0151887 filed on Oct. 30, 2015 in the Korean Intellectual Property Office, the disclosure of which is incorporated by reference herein in its entirety.

TECHNICAL FIELD

The present disclosure relates to a cooking apparatus, a cooking apparatus controlling system, and a method of controlling a cooking apparatus.

BACKGROUND

A cooking apparatus is an apparatus for heating and cooking a cooking target such as food and refers to an apparatus used for various purposes related to cooking such as heating, defrosting, drying, and sterilizing. Examples of a cooking apparatus include an oven such as a gas oven and an electric oven, a microwave oven heating apparatus (hereinafter, a microwave), a gas stove, and an electric stove.

An oven includes a cooking compartment and a heating apparatus configured to heat an inner portion of the cooking compartment, and may cook a cooking target by the cooking target being put in the cooking compartment, the cooking compartment being closed, and applying heat to the cooking target to broil, fry, boil, or defrost the cooking target. An oven may be mainly classified as a gas oven for burning gas to generate heat that will be applied and an electric oven for converting electrical energy to thermal energy to generate heat that will be applied.

A microwave oven may heat a heating target inside the microwave oven using a dielectric heating phenomenon caused by high-frequency microwaves. Specifically, when the heating target is exposed to an electric field, molecules having a dipole moment inside the heating target are oriented toward the electric field, and polarization occurs. Here, when the heating target is exposed to an alternating current electric field such as microwaves, a dipole vibrates or rotates since the dipole orientation described above is repeated in a short time, and heat is generated as a result. The microwave oven may heat the heating target using the principle described above.

A gas stove or an electric stove is a cooking apparatus for generating heat to heat a cooking container placed on an upper plate. A gas stove may burn gas to heat a cooking container. An electric stove may use a heating element or use a principle of induction heating to heat a cooking container. Specifically, the electric stove may heat the cooking container by applying a current to a heating element such as a nichrome wire and using heat generated due to the applied current, or may heat the cooking container by using a magnetic field generated due to an induction coil disposed at a bottom surface of the upper plate of the electric stove.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a cooking apparatus capable of improving user convenience and safety because an operation thereof is started according to an operation of another cooking apparatus and the cooking apparatus is provided with information on the operation of the other cooking apparatus, a cooking apparatus controlling system, and method of controlling a cooking apparatus.

Another aspect of the present disclosure is to provide a cooking apparatus capable of providing a user with a safe cooking environment by performing an operation of suctioning gas generated during a cooking process using an electric stove in response to an operation of the electric stove when the electric stove disposed below the cooking apparatus is operating, a cooking apparatus controlling system, and method of controlling a cooking apparatus.

In accordance with an aspect of the present disclosure, a cooking apparatus controlling system is provided. The cooking apparatus controlling system includes a first cooking apparatus having a user interface configured to receive a user command from a user and a second cooking apparatus separated from the first cooking apparatus and configured to receive the user command input to the first cooking apparatus and operate according to the user command. The user interface receives one or more of a user command related to the first cooking apparatus and a user command related to the second cooking apparatus. The first cooking apparatus includes a first communicator and the second cooking apparatus includes a second communicator configured to communicate with the first communicator.

The user interface may include a first inputter configured to receive the user command related to the first cooking apparatus and a second inputter configured to receive the user command related to the second cooking apparatus.

The first cooking apparatus may include a user interface controller configured to determine whether the user command input through the user interface is the command related to the first cooking apparatus or the command related to the second cooking apparatus.

The user interface may include a display configured to display one or more of a state of the first cooking apparatus and a state of the second cooking apparatus.

The display may include a first display configured to display the state of the first cooking apparatus and a second display configured to display the state of the second cooking apparatus.

The user command related to the second cooking apparatus may include one or more of commands related to starting cooking, stopping cooking, ending cooking, scheduling cooking using the second cooking apparatus, setting a cooking duration, an operation mode of the second cooking apparatus, and cleaning the second cooking apparatus.

The first communicator and the second communicator may communicate with each other using one or more of Wi-Fi, Bluetooth (BT), Bluetooth low energy (BLE) communication, ZigBee, Wi-Fi direct (WFD), ultra-wideband (UWB) communication, infrared data association (IrDA) communication, and near field communication (NFC).

The second cooking apparatus may include a stop command inputter configured to temporarily interrupt or non-temporarily stop an operation of the second cooking apparatus.

The second cooking apparatus may include an operation state display configured to display whether the second cooking apparatus is operating according to a user command received from the first cooking apparatus.

The operation state display may include one or more of a light emitting diode (LED) lamp, a fluorescent lamp, an ultraviolet (UV) lamp, a halogen lamp, a mercury lamp, a sodium lamp, and an incandescent lamp.

One or more of the first cooking apparatus and the second cooking apparatus may include one or more of an electric oven, a gas oven, and a microwave oven.

The second cooking apparatus may be disposed below the first cooking apparatus.

The cooking apparatus controlling system may further comprise a third cooking apparatus installed between the first cooking apparatus and the second cooking apparatus.

The third cooking apparatus may have an upper surface facing a bottom surface of the second cooking apparatus.

The first cooking apparatus may include an exhaust configured to suction smoke generated due to a cooking operation of one or more of the second cooking apparatus and the third cooking apparatus and installed in a direction in which the third cooking apparatus is arranged.

The exhaust may start operating corresponding to an operation of one or more of the second cooking apparatus and the third cooking apparatus when one or more of the second cooking apparatus and the third cooking apparatus starts operating or the first cooking apparatus receives a user command related to the operation of one or more of the second cooking apparatus and the third cooking apparatus.

The third cooking apparatus may include an ignition switch and an ignition switch manipulation sensor configured to sense an operation of the ignition switch and transmit a sensed result to the first cooking apparatus and the exhaust starts operating according to the sensed result.

In accordance with another aspect of the present disclosure, an ignition switch is provided. The ignition switch includes a first driven portion configured to move according to rotation of a first driver formed at a cam member rotating corresponding to rotation of a gripping portion, and a first contact portion configured to come into contact with or be spaced apart from the first driven portion according to the movement of the first driven portion, an electrical signal transmitted due to contact between the first driven portion and the first contact portion is transmitted to an ignition plug, the ignition switch manipulation sensor includes a second driven portion configured to move according to rotation of a second driver formed at a cam member rotating corresponding to rotation of the gripping portion, and a second contact portion configured to come into contact with or be spaced apart from the second driven portion according to the movement of the second driven portion and an electrical signal transmitted due to contact between the second driven portion and the second contact portion is transmitted to the first cooking apparatus.

One or more of the second cooking apparatus and the third cooking apparatus may include a stop command inputter configured to temporarily interrupt or non-temporarily stop an operation of the second cooking apparatus.

One or more of the first cooking apparatus and the second cooking apparatus may communicate with a terminal device separated from the first cooking apparatus and the second cooking apparatus and receive a user command input through the terminal device or transmit a state of one or more of the first cooking apparatus and the second cooking apparatus to the terminal device.

In accordance with another aspect of the present disclosure, a method of controlling a cooking apparatus is provided. The method comprises receiving of a user command by a user interface provided at a first cooking apparatus, determining whether the user command is related to the first cooking apparatus or related to a second cooking apparatus separated from the first cooking apparatus, performing, by the first cooking apparatus, an operation according to the user command when the user command is determined to related to the first cooking apparatus, transmitting, by the first cooking apparatus, the user command to the second cooking apparatus when the user command is determined to be related to the second cooking apparatus and performing, by the second cooking apparatus, an operation according to the user command transmitted from the first cooking apparatus.

The receiving one or more of a user command related to a first cooking apparatus and a user command related to a second cooking apparatus may comprises operating at least one of a first inputter configured to receive the user command related to the first cooking apparatus and a second inputter configured to receive the user command related to the second cooking apparatus.

The method of controlling a cooking apparatus may further comprises displaying, by the first cooking apparatus, at least one of a state of the first cooking apparatus and a state of the second cooking apparatus.

The first cooking apparatus and the second cooking apparatus may communicate with each other using at least one of Wireless Fidelity (Wi-Fi), Bluetooth (BT), Bluetooth low energy (BLE), ZigBee, Wi-Fi direct (WFD), ultra-wideband (UWB) communication, infrared data association (IrDA) communication, and near field communication (NFC).

In accordance with another aspect of the present disclosure, a cooking apparatus is provided. The cooking apparatus may comprise a communicator configured to receive a control command from other cooking apparatus and a cooker configured to start a cooking operation according to the control command.

The cooking apparatus may further comprise a stop command inputter configured to stop the operation of the cooking apparatus temporarily or non-temporarily.

The cooking apparatus may further comprises an operation state display configured to display whether the cooking apparatus is operating or not.

The communicator may be configured to communicate with the other cooking apparatus using at least one of Wireless Fidelity (Wi-Fi), Bluetooth (BT), Bluetooth low energy (BLE), ZigBee, Wi-Fi direct (WFD), ultra-wideband (UWB) communication, infrared data association (IrDA) communication, and near field communication (NFC).

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an embodiment of a cooking apparatus controlling system including two cooking apparatuses will be described with reference to FIGS. 1 to 3.

Figure 1:
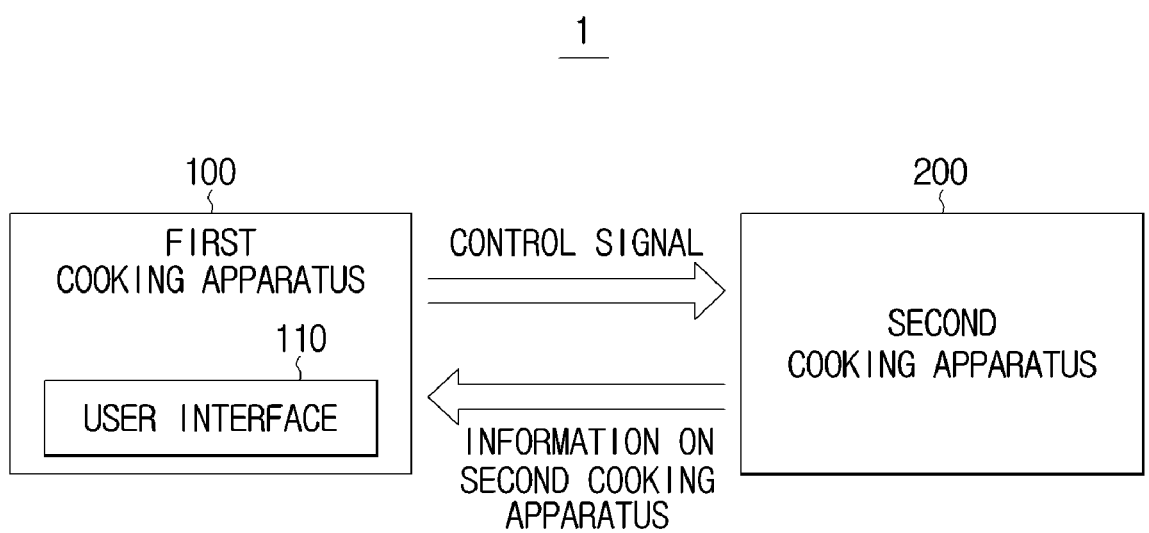
FIG. 1 is a view illustrating a cooking apparatus controlling system according to an embodiment of the present disclosure.

FIG. 1 is a view illustrating a cooking apparatus controlling system according to an embodiment of the present disclosure.

Figure 2:
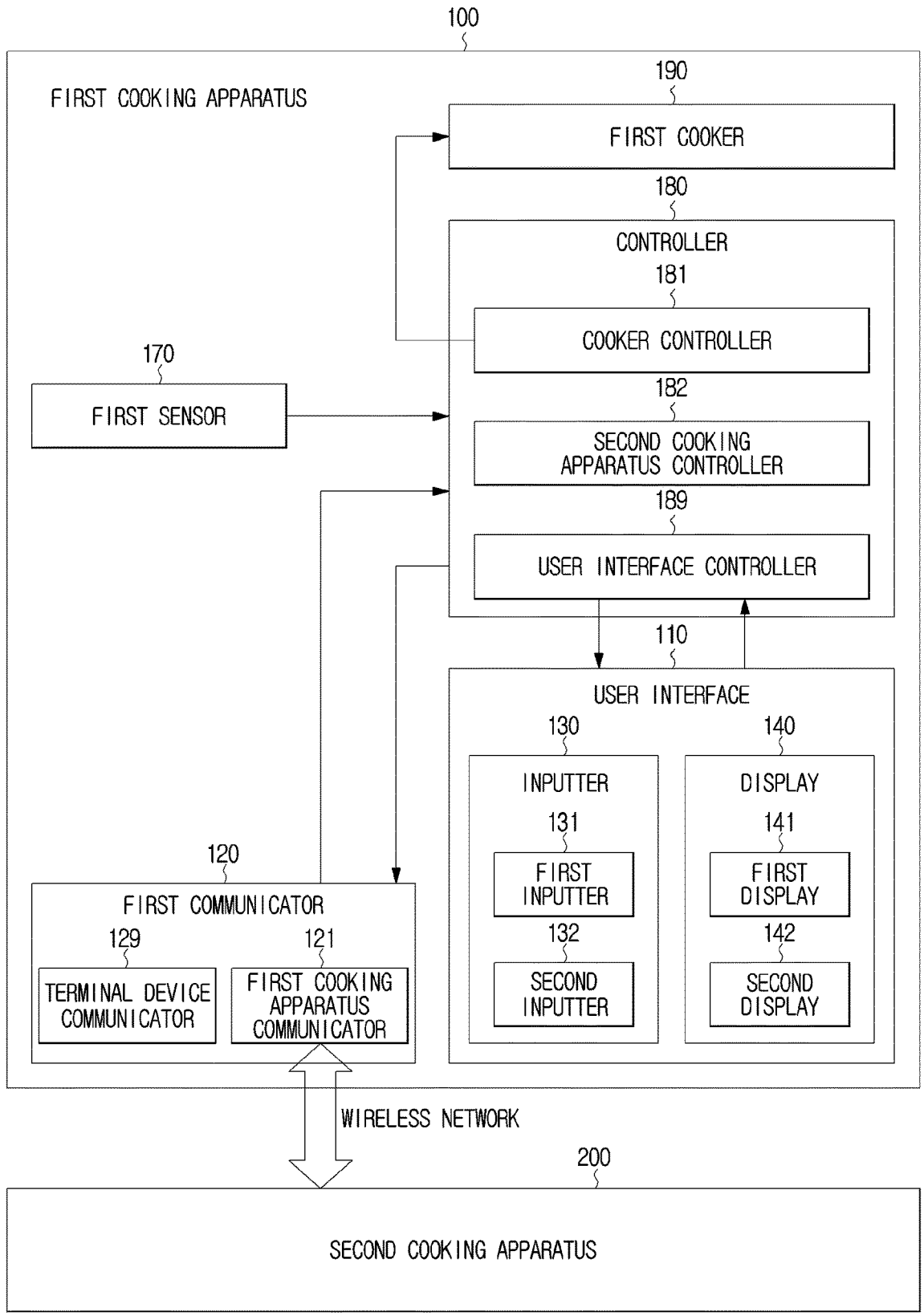
FIG. 2 is a block diagram of a first cooking apparatus according to an embodiment of the present disclosure.

FIG. 2 is a block diagram of a first cooking apparatus according to an embodiment of the present disclosure.

Figure 3:
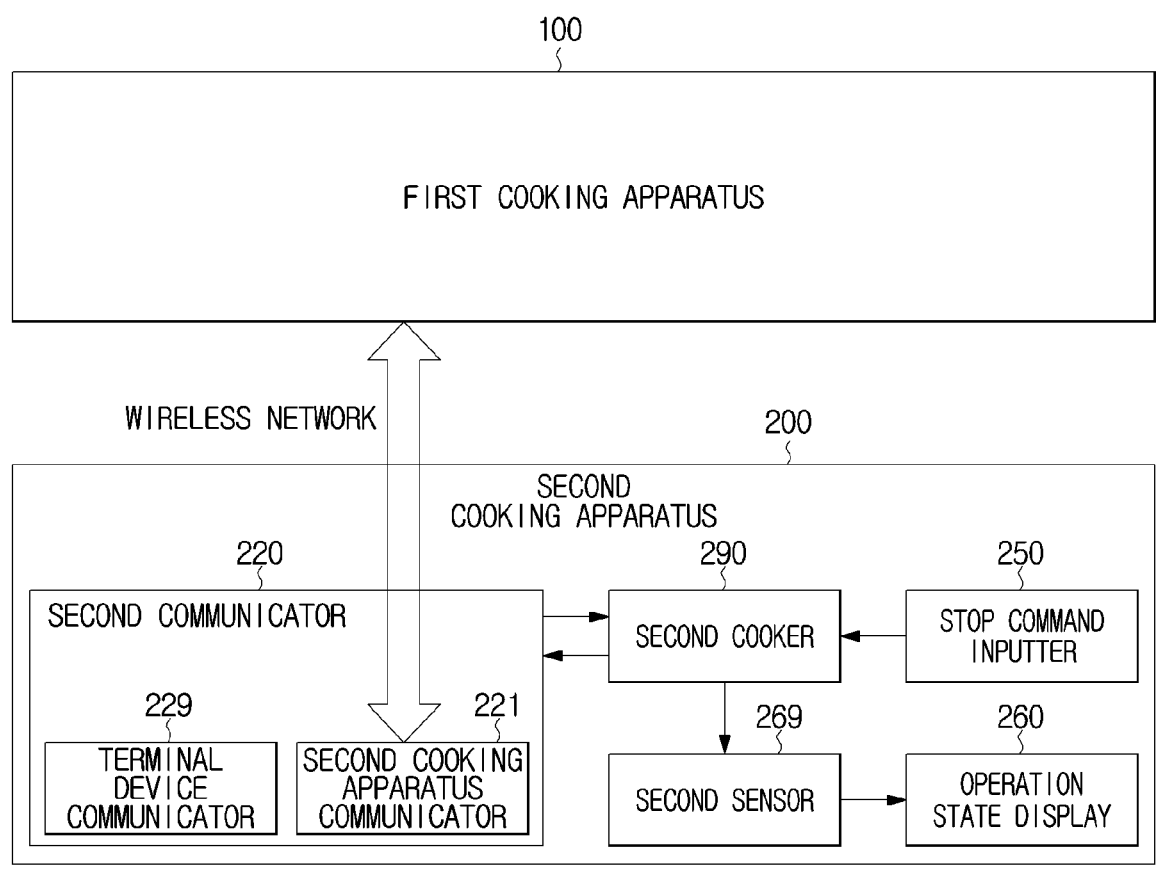
FIG. 3 is a block diagram of a second cooking apparatus according to an embodiment of the present disclosure.

FIG. 3 is a block diagram of a second cooking apparatus according to an embodiment of the present disclosure.

Referring to FIG. 1, a cooking apparatus controlling system 1 may include a first cooking apparatus 100 and a second cooking apparatus 200.

Each of the first cooking apparatus 100 and the second cooking apparatus 200 is provided to cook a cooking target such as food. The first cooking apparatus 100 may be one or more of an electric oven, a gas oven, a microwave oven, a gas stove, and an electric stove, and the second cooking apparatus 200 may also be one or more of an electric oven, a gas oven, a microwave oven, a gas stove, and an electric stove. The first cooking apparatus 100 and the second cooking apparatus 200 may be the same type of cooking apparatus or may be different types of cooking apparatuses. For example, both of the first cooking apparatus 100 and the second cooking apparatus 200 may be an oven or a microwave oven. In another example, the first cooking apparatus 100 may be a microwave oven and the second cooking apparatus 200 may be an electric oven or a gas oven.

The first cooking apparatus 100 and the second cooking apparatus 200 are provided to be able to communicate through a wired communication network or a wireless communication network.

The wired communication network may be constructed using a cable connected to each of the apparatuses, and the cable may include a pair cable, a coaxial cable, an optical fiber cable, or an Ethernet cable.

The wireless communication network may be realized using a short-distance communication network or a mobile communication network. The short-distance communication network may be constructed using a wireless local area network (LAN), Wi-Fi, Bluetooth (BT), ZigBee, controller area network (CAN) communication, Wi-Fi direct (WFD), ultra-wideband (UWB) communication, infrared data association (IrDA) communication, Bluetooth low energy communication, and near field communication (NFC). The mobile communication network may be constructed using various types of mobile communication standards based on third generation partnership project (3GPP), 3GPP2, and worldwide interoperability for microwave access (Wi-Max).

The first cooking apparatus 100 may include a user interface 110 that may receive a command from a user or provide various types of information. A user of the first cooking apparatus 100 may input various types of commands for one or more of the first cooking apparatus 100 and the second cooking apparatus 200 through the user interface 110, and may receive information on one or more of the first cooking apparatus 100 and the second cooking apparatus 200.

When the user inputs a command related to the first cooking apparatus 100 using the user interface 110 of the first cooking apparatus 100, the first cooking apparatus 100 may perform an operation corresponding to the input command. In addition, when the user inputs a command related to the second cooking apparatus 200 using the user interface 110 of the first cooking apparatus 100, the first cooking apparatus 100 may generate a control signal corresponding to the input command and transmit the generated control signal to the second cooking apparatus 200 through a wired communication network or a wireless communication network.

The second cooking apparatus 200 may receive a control signal from the first cooking apparatus 100 and may operate according to the received control signal. In this case, the second cooking apparatus 200 may not be equipped with a user interface for receiving a command from the user or a control device for generating a control signal, and may operate only by the control signal transmitted from the first cooking apparatus 100. When a control device or a user interface is not required for the second cooking apparatus 200 as in the case above, necessity of installing various types of parts related to the controller or the user interface such as a substrate having a micro controller unit (MCU) installed thereon at the second cooking apparatus 200 decreases or disappears. Thus, an inner structure of the second cooking apparatus 200 may be relatively simplified, and the second cooking apparatus 200 may be designed in a simpler way, thereby improving convenience of manufacture. Furthermore, the cost for manufacturing the second cooking apparatus 200 may also be decreased.

The second cooking apparatus 200 may also transmit information on an operation or a state of the second cooking apparatus 200 to the first cooking apparatus 100 through a wired communication network or a wireless communication network. The first cooking apparatus 100 may receive the information on the second cooking apparatus 200 and may display the received information on the second cooking apparatus to the user through the user interface 110.

According to an embodiment, the second cooking apparatus 200 may abut the first cooking apparatus 100 or may be spaced a predetermined distance apart from the first cooking apparatus 100. For example, the second cooking apparatus 200 may be disposed below the first cooking apparatus 100. In this case, the second cooking apparatus 200 may abut a bottom surface of the first cooking apparatus 100 or may be spaced a distance apart from the bottom surface of the first cooking apparatus 100. In addition, in another example, the second cooking apparatus 200 may be disposed at a side surface of the first cooking apparatus 100. In this case, the first cooking apparatus 100 and the second cooking apparatus 200 may be disposed parallel to each other. Moreover, the first cooking apparatus 100 and the second cooking apparatus 200 may be disposed in various ways.

Hereinafter, the first cooking apparatus 100 and the second cooking apparatus 200 will be described in more detail.

FIG. 2 is a block diagram of the first cooking apparatus according to an embodiment of the present disclosure.

Referring to FIG. 2, the first cooking apparatus 100 according to an embodiment may include the user interface 110, a first communicator 120, a controller 180, and a first cooker 190.

The user interface 110 may receive a command from a user or provide the user with various types of information.

The user interface 110 includes an inputter 130 configured to receive a command related to one or more of the first cooking apparatus 100 and the second cooking apparatus 200, and a display 140 configured to display information on one or more of the first cooking apparatus 100 and the second cooking apparatus 200 using one or more of a symbol, a letter, a number, and an image. Here, the image incudes one or more of a still image and a moving image.

The inputter 130 is provided to receive one or more of a command related to the first cooking apparatus 100 and a command related to the second cooking apparatus 200.

According to an embodiment, the inputter 130 may include a first inputter 131 configured to receive a user command related to the first cooking apparatus 100 and a second inputter 132 configured to receive a user command related to the second cooking apparatus 200.

The first inputter 131 outputs an electrical signal corresponding to a user manipulation and transmits the output electrical signal to the controller 180, and the controller 180 controls operation of the first cooker 190 according to the electrical signal output by the first inputter 131. In this case, the electrical signal may be transmitted to a cooker controller 181 via a user interface controller 189 of the controller 180 or may be transmitted to the cooker controller 181 without passing through the user interface controller 189.

The second inputter 132 may output an electrical signal corresponding to a user manipulation and transmit the output electrical signal to the controller 180, and the controller 180 may transmit the electrical signal output by the second inputter 132 or a control signal corresponding to the electrical signal to the second cooking apparatus 200 through the first communicator 120 to control the second cooking apparatus 200 to operate depending on the user manipulation. The second inputter 132 may be provided to receive one or more of commands related to starting cooking, stopping cooking, finishing cooking, scheduling cooking, setting a cooking time, selecting an operation mode of the second cooking apparatus, and cleaning the second cooking apparatus.

Each of the first inputter 131 and the second inputter 132 may abut the first cooking apparatus 100 or may be spaced apart from the first cooking apparatus 100. The first inputter 131 and the second inputter 132 may be realized using an inputter such as a physical button, a keyboard, a touch pad, a touch screen, a touch sensor, a knob, a jog shuttle, a joystick, a track ball, a track pad, a motion sensor, and/or a mouse device. Moreover, various types of inputters that may be considered by a designer and are capable of receiving various types of commands may be used to realize the first inputter 131 and the second inputter 132. In this case, the first inputter 131 and the second inputter 132 may be realized using the same inputter or may also be realized using different inputters.

The first inputter 131 and the second inputter 132 may also be physically separated from each other. For example, the first inputter 131 and the second inputter 132 may be separately realized using a physical inputting device such as a physical button. In addition, the first inputter 131 and the second inputter 132 may be logically separated from each other. For example, the first inputter 131 and the second inputter 132 may be realized using an inputting device such as a touch screen that selectively serves as the first inputter 131 or the second inputter 132 depending on a user manipulation.

The display 140 is provided to display various types of information. According to an embodiment, the display 140 is provided to display information on an operation or a state of the first cooking apparatus 100 and information on an operation or a state of the second cooking apparatus 200. In this case, the display 140 may, for example, emit light of a predetermined color or output a symbol, a letter, a number, or an image depending on control by the user interface controller 189 to display one or more of information related to the first cooking apparatus 100 and information related to the second cooking apparatus 200. In addition, the display 140 may further display various pieces of information required by the user such as a current time, various types of information related to cooking, living information, news, and weather or may also display various messages related to the cooking apparatuses 100 and 200. The pieces of information or messages provided through the display 140 may be randomly decided by a designer or may be selected by the user.

According to an embodiment, the display 140 may be realized using various types of lighting devices capable of emitting light such as a light emitting diode (LED) lamp, a fluorescent lamp, an ultraviolet (UV) lamp, a halogen lamp, a mercury lamp, a sodium lamp, and an incandescent lamp.

In addition, according to an embodiment, the display 140 may be realized using a cathode ray tube (CRT) or using various types of display panels capable of displaying a predetermined letter, symbol, or image such as a liquid crystal display (LCD) panel, an LED display panel, an organic LED (OLED) display panel, an active-matrix OLED display panel, and a cold cathode fluorescent lamp.

According to an embodiment, the display 140 may include a first display 141 configured to display information on the first cooking apparatus 100 and a second display 142 configured to display information on the second cooking apparatus 200. The first display 141 and the second display 142 may be set to independently display the information on the first cooking apparatus 100 and the information on the second cooking apparatus 200, respectively. However, according to an embodiment, a single display 140 may also be configured to display both of the information on the first cooking apparatus 100 and the information on the second cooking apparatus 200. In this case, the single display 140 may simultaneously display the information on the first cooking apparatus 100 and the information on the second cooking apparatus 200 or may display the information on the first cooking apparatus 100 and the information on the second cooking apparatus 200 at different times.

Moreover, the user interface 110 may further include various elements capable of communicating with the user such as a sound outputter (not illustrated) including a speaker, an earphone, and a headset capable of outputting a voice or a sound.

The first communicator 120 is provided to enable the first cooking apparatus 100 to communicate with an external device, e.g., the second cooking apparatus 200 or a terminal device (not illustrated).

The first communicator 120 may be realized using one or more communication modules including one or more communication chips, a substrate on which the one or more communication chips are installed, and an antenna. Here, the one or more communication chips may be set to serve as a multiplexer or a modulator. The first communicator 120 may be realized with a separate module by being installed on a substrate separate from a substrate on which various types of semiconductor chips which are operated by the controller 180 are installed.

According to an embodiment, the first communicator 120 may include a first cooking apparatus communicator 121 and a terminal device communicator 129.

The first cooking apparatus communicator 121 may be connected to a second cooking apparatus communicator 221 of the second cooking apparatus 200 to be able to communicate therewith through wired and wireless communication networks, may transmit information or a control command output by the first cooking apparatus 100 to the second cooking apparatus 200, and may receive information and the like transmitted from the second cooking apparatus 200.

The terminal device communicator 129 may be connected to a terminal device provided separately from the first cooking apparatus 100 to be able to communicate therewith through wired and wireless communication networks to transmit information on the first cooking apparatus 100 to the terminal device or receive various types of commands or information input by the user through the terminal device. Here, the terminal device may communicate with an external device, and the terminal device refers to a device capable of providing the user with information or receiving a command or information from the user. Examples of the terminal device may include a desktop computer, a laptop computer, a smartphone, a cellular phone, a tablet personal computer (PC), a navigation device, a portable game player, a personal digital assistant (PDA), and an electronic organizer. The terminal device communicator 129 may be omitted according to an embodiment.

The first cooking apparatus communicator 121 and the terminal device communicator 129 may be realized using the same communicator or using different communicators. For example, the first cooking apparatus communicator 121 may be realized using a communication module using Bluetooth technology, and the terminal device communicator 129 may be realized using a communication module using Wi-Fi technology. According to an embodiment, the first cooking apparatus communicator 121 and the terminal device communicator 129 may be physically differentiated or logically differentiated. When the first cooking apparatus communicator 121 and the terminal device communicator 129 are physically differentiated, the first cooking apparatus communicator 121 and the terminal device communicator 129 may be realized using separate communication modules which are physically separated. When the first cooking apparatus communicator 121 and the terminal device communicator 129 are logically differentiated, the first cooking apparatus communicator 121 and the terminal device communicator 129 may be realized using a single communication module capable of simultaneously communicating with the second cooking apparatus 200 and the terminal device or capable of selectively communicating with the second cooking apparatus 200 and the terminal device at different times.

The controller 180 is provided to control overall operation of the first cooking apparatus 100. The controller 180 may be electrically connected to each part in the first cooking apparatus 100, e.g., each part of the first cooker 190 or the user interface 110, to transmit a control signal in the form of an electrical signal to each of the parts in the first cooking apparatus 100 or receive an electrical signal transmitted from each of the parts. In this case, the controller 180 may be electrically connected to each of the parts using one or more of various communicators such as a circuit, a conducting wire, and a wireless communication network constructed inside the first cooking apparatus 100.

According to an embodiment, the controller 180 may include the cooker controller 181, a second cooking apparatus controller 182, and the user interface controller 189 as illustrated in FIG. 2.

The cooker controller 181 may generate a first control signal corresponding to a user command input through the user interface 110 and transmit the generated first control signal to the first cooker 190 to control the first cooker 190 such that the first cooker 190 may operate depending on the user command. According to an embodiment, the cooker controller 181 may generate the first control signal according to a user command input through the first inputter 131 to control the first cooker 190. In addition, the cooker controller 181 may also receive an electrical signal transmitted from a first sensor 170 or an electrical signal transmitted through the first communicator 120, e.g., a signal corresponding to a control command transmitted from a terminal device, generate the first control signal in response to the received signal, and transmit the first control signal to control the first cooker 190 as necessary.

The second cooking apparatus controller 182 may be designed to generate a second control signal corresponding to the user command input through the user interface 110 and transmit the second control signal to the first communicator 120, e.g., the first cooking apparatus communicator 121. The first communicator 120 may transmit the second control signal to the second cooking apparatus 200 through the wired and wireless communication networks, and the second cooking apparatus 200 may perform an operation corresponding to the second control signal. In this case, the second cooking apparatus controller 182 may generate the second control signal according to a user command input through the second inputter 132. Like the cooker controller 181, the second cooking apparatus controller 182 may generate the second control signal in response to an electrical signal transmitted from the first sensor 170 or an electrical signal transmitted through the first communicator 120 to control the second cooking apparatus 200 as necessary.

The user interface controller 189 is provided to control various types of operations of the user interface 110. For example, the user interface controller 189 may amplify, convert, or switch a signal input through the inputter 130, and transmit the signal to the cooker controller 181 or the second cooking apparatus controller 182.

In addition, the user interface controller 189 may determine which cooking apparatus a user command input through the user interface 110 is related to and may transmit an electrical signal corresponding to the user command to any one of the cooker controller 181 and the second cooking apparatus controller 182 according to a determined result to enable any one of the first cooking apparatus 100 or the second cooking apparatus 200 to operate according to the user manipulation. In this case, the user interface controller 189 may determine whether the user has input a command related to the first cooking apparatus 100 or has input a command related to the second cooking apparatus 200 depending on, for example, which of the first inputter 131 and the second inputter 132 of the inputter 130 has been manipulated.

In addition, in another example, the user interface controller 189 may control the display 140 of the user interface 110 based on various types of information or signals such as information on operation of the first cooker 190, information transmitted from the first sensor 170 or the first communicator 120, and an electrical signal output from the cooker controller 181 or the second cooking apparatus controller 182. Depending on the control by the user interface controller 189, the display 140 may emit light of a predetermined color or display one or more of a letter, a symbol, and a predetermined image. When the display 140 includes the first display 141 and the second display 142, the user interface controller 189 may separately transmit a control signal to each of the first display 141 and the second display 142, and accordingly, the first display 141 and the second display 142 may be controlled to independently display information on the first cooking apparatus 100 and information on the second cooking apparatus 200, respectively.

According to an embodiment, when the user interface controller 189 determines that there is an error in a user command input through the inputter 130, the user interface controller 189 may control an outputter such as the display 140 to display an error signal. For example, when a manipulation of the inputter 130 does not match a preset setting, the user interface controller 189 may control the display 140 to display an error message that requests that a command related to the cooking apparatuses 100 and 200 be input again. For example, when a signal output according to the manipulation of the inputter 130 is neither an electrical signal corresponding to a user command related to the first cooking apparatus 100 nor an electrical signal corresponding to a command related to the second cooking apparatus 200, the user interface controller 189 may check whether the signal corresponds to a command related to another cooking apparatus and, when the signal does not correspond thereto, control the display 140 to display an error message.

The controller 180 may be realized using one or more semiconductor chips and related parts, and the one or more semiconductor chips and the related parts are installed on a printed circuit board to control an overall operation of the first cooking apparatus 100. One or more of the cooker controller 181, the second cooking apparatus controller 182, and the user interface controller 189 described above may be realized by different semiconductor chips and related parts or may be realized by the same semiconductor chips and related parts. When the cooker controller 181, the second cooking apparatus controller 182, and the user interface controller 189 are realized by different semiconductor chips and related parts, the semiconductor chips and the related parts may be installed on different substrates inside the first cooking apparatus 100.

The first cooker 190 is provided to perform a cooking operation according to control by the controller 180, e.g., the cooker controller 181. The first cooker 190 may be realized by employing various parts depending on the type of the first cooking apparatus 100. For example, when the first cooking apparatus 100 is a microwave oven, the first cooker 190 may be realized using an electric heater, a magnetron, a power supplier, and the like. Moreover, the first cooker 190 may be realized by employing various parts that may be generally considered by a designer to realize a cooking function of a specific type of the first cooking apparatus 100.

According to an embodiment, the first cooking apparatus 100 may further include one or more first sensors 170. The first sensor 170 may sense an operation of the first cooking apparatus 100, output an electrical signal corresponding to the sensed operation, and transmit the electrical signal to the controller 180 through a circuit or a cable. The first sensor 170 may include one or more of a UV sensor, an infrared sensor, a visible light sensor, a heat sensor, a gas sensor, a magnetic sensor, and a pressure sensor. For example, the first sensor 170 may sense heat or smoke emitted from the first cooking apparatus 100, output an electrical signal corresponding to a sensed result, and transmit the electrical signal to the controller 180.

The first sensor 170 may be installed at one position of the first cooking apparatus 100 capable of suitably sensing an operation of the second cooking apparatus 200. For example, when the second cooking apparatus 200 is installed below the first cooking apparatus 100 and the first sensor 170 is a heat sensor, the first sensor 170 may be installed at the bottom surface of the first cooking apparatus 100 in a lower end direction to sense an operation of the second cooking apparatus 200. The first sensor 170 may be omitted according to an embodiment.

FIG. 3 is a block diagram of the second cooking apparatus according to an embodiment of the present disclosure.

Referring to FIG. 3, the second cooking apparatus 200 may include a second communicator 220 and a second cooker 290.

The second communicator 220 enables the second cooking apparatus 200 to communicate with an external device, e.g., the first cooking apparatus 100 or a terminal device (not illustrated).

Like the first communicator 120, the second communicator 220 may be realized using one or more communication modules including one or more communication chips, a substrate on which the one or more communication chips are installed, and an antenna. The second communicator 220 may be realized with a separate module.

According to an embodiment, the second communicator 220 may include the second cooking apparatus communicator 221 and a terminal device communicator 229.

The second cooking apparatus communicator 221 may be connected to the first cooking apparatus communicator 121 of the first cooking apparatus 100 to be able to communicate therewith through wired and wireless communication networks, may receive information or a control command output by the first cooking apparatus 100, and may transmit various types of information acquired by the second cooking apparatus 200 to the first cooking apparatus 100. The second cooking apparatus communicator 221 may be provided to correspond to the first cooking apparatus communicator 121 to be connected to the first cooking apparatus communicator 121. For example, when the first cooking apparatus communicator 121 is realized using a communication module using Bluetooth technology, the second cooking apparatus communicator 221 may also be realized using the communication module using Bluetooth technology.

The terminal device communicator 229 may be connected to a terminal device provided separately from the second cooking apparatus 200 to be able to communicate therewith through wired and wireless communication networks to transmit information on the second cooking apparatus 200 to the terminal device or receive various types of user commands or information transmitted from the terminal device.

Here, the terminal device may be the same terminal device as the terminal device capable of communicating with the terminal device communicator 129 of the first cooking apparatus 100. The terminal device communicator 229 of the second cooking apparatus 200 may be omitted according to an embodiment.

Like the first cooking apparatus communicator 121 and the terminal device communicator 129 described above, the second cooking apparatus communicator 221 and the terminal device communicator 229 may be realized using the same communicator or using different communicators. According to an embodiment, the second cooking apparatus communicator 221 and the terminal device communicator 229 may be physically differentiated or logically differentiated. When the second cooking apparatus communicator 221 and the terminal device communicator 229 are physically differentiated, the second cooking apparatus communicator 221 and the terminal device communicator 229 may be realized using separate communication modules. When the second cooking apparatus communicator 221 and the terminal device communicator 229 are logically differentiated, the second cooking apparatus communicator 221 and the terminal device communicator 229 may be realized using a single communication module capable of simultaneously communicating with the first cooking apparatus 100 and the terminal device or capable of communicating with the first cooking apparatus 100 and the terminal device at different times.

A signal received by the second communicator 220, e.g., the second cooking apparatus communicator 221, for example, a control signal transmitted from the second cooking apparatus controller 182, may be transmitted to the second cooker 290 using one or more of a circuit, a conducting wire, and a wireless communication network constructed inside the second cooking apparatus 200.

The second cooker 290 may perform a cooking operation according to a control signal generated by the first cooking apparatus 100 and transmitted through the second communicator 220. The second cooker 290 may be realized by employing various parts depending on the type of the second cooking apparatus 200. For example, when the second cooking apparatus 200 is an oven, the second cooker 290 may be realized using an electric heater and the like. Moreover, the second cooker 290 may be realized by employing various parts that may be considered by a designer to realize a cooking function depending on the type of the second cooking apparatus 200.

According to an embodiment, the second cooking apparatus 200 may further include one or more of a stop command inputter 250, an operation state display 260, and a second sensor 269.

The stop command inputter 250 is designed to stop an operation of the second cooker 290 according to a user manipulation. When an emergency has occurred due to overheating and the like during an operation of the second cooking apparatus 200, the user may manipulate the stop command inputter 250 to immediately stop the second cooking apparatus 200. For example, the stop command inputter 250 may cut off power supplied to the second cooker 290 or stop operations of some of the parts of the second cooker 290 to stop operation of the second cooker 290 according to manipulation. According to an embodiment, the stop command inputter 250 may be realized using a physical button, a keyboard, a touch pad, a touch screen, a touch sensor, a knob, a joystick, a track ball, or a track pad.

The second sensor 269 may sense an operation of the second cooker 290, output an electrical signal corresponding to a sensed result, and transmit the electrical signal to the operation state display 260. The second sensor 269 may sense a magnitude of a current entering the second cooker 290, a magnitude of a current output from the second cooker 290, a temperature inside a cooking compartment of the second cooker 290, a temperature of a heater configured to apply heat to the cooking compartment, or whether gas for combustion is provided to the second cooker 290, and may output an electrical signal corresponding to a sensed result. According to an embodiment, the second sensor 269 may sense manipulation of an input button and the like for manipulating the second cooking apparatus 200, output an electrical signal corresponding to a sensed result, and transmit the electrical signal to the operation state display 260. The second sensor 269 may be realized using, for example, one or more of a UV sensor, an infrared sensor, a visible light sensor, a heat sensor, a gas sensor, a magnetic sensor, and a pressure sensor.

The operation state display 260 may display an operation state of the second cooking apparatus 200. For example, the operation state display 260 may output light of a predetermined color to inform the user that the second cooker 290 of the second cooking apparatus 200 is operating. The operation state display 260 may be designed to emit light according to an electrical signal transmitted from the second sensor 269. Specifically, the operation state display 260 may include a predetermined lighting device, the lighting device and a power source may be electrically connected to each other according to the electrical signal transmitted from the second sensor 269, and light may be emitted from the lighting device by a current applied from the power source to the lighting device. Accordingly, the operation state display 260 is able to display the operation state of the second cooking apparatus 200. According to an embodiment, the operation state display 260 may be realized using various types of lighting devices capable of emitting light of a predetermined color such as an LED lamp, a fluorescent lamp, a UV lamp, a halogen lamp, a mercury lamp, a sodium lamp, and an incandescent lamp. In addition, according to an embodiment, the operation state display 260 may also be realized using a display panel.

The stop command inputter 250, the operation state display 260, and the second sensor 269 may be omitted according to an embodiment.

Unlike the first cooking apparatus 100, the second cooking apparatus 200 may not include a separate controller as illustrated in FIG. 3. In this case, a control signal for controlling an operation of the second cooking apparatus 200 may be transmitted from the first cooking apparatus 100. In addition, the second cooking apparatus 200 may not include a user interface other than the stop command inputter 250 configured to receive the stop command in case of emergency. As described above, when the second cooking apparatus 200 does not include a separate controller or user interface, a structure of the second cooking apparatus 200 is simplified such that convenience of manufacture is improved and costs may be decreased.

Hereinafter, an embodiment of a cooking apparatus controlling system including three cooking apparatuses will be described with reference to FIGS. 4 to 7.

Figure 4:
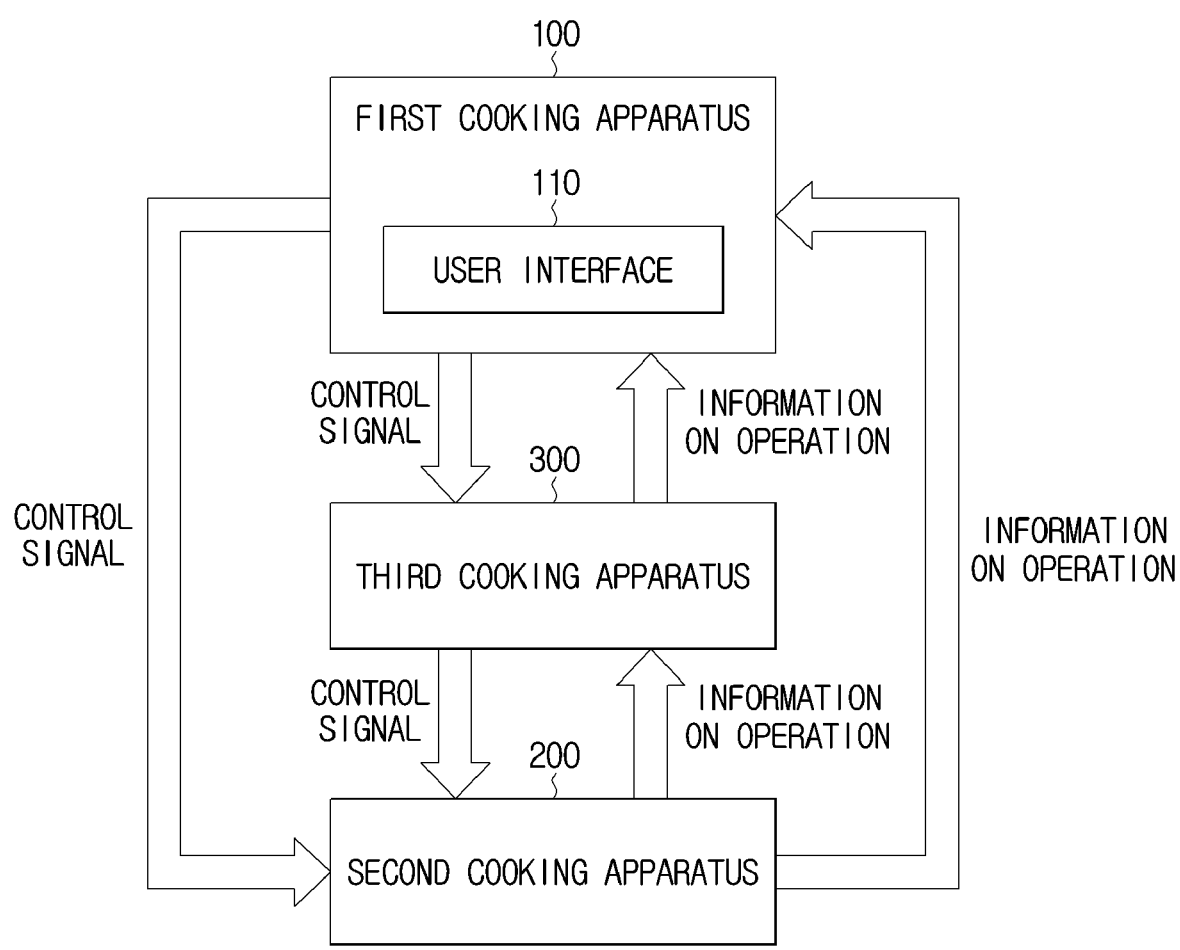
FIG. 4 is a view illustrating a cooking apparatus controlling system according to an embodiment of the present disclosure.

FIG. 4 is a view illustrating a cooking apparatus controlling system according to an embodiment of the present disclosure.

Referring to FIG. 4, a cooking apparatus controlling system 2 according to an embodiment may include the first cooking apparatus 100, the second cooking apparatus 200, and a third cooking apparatus 300.

Each of the first cooking apparatus 100, the second cooking apparatus 200, and the third cooking apparatus 300 is provided to independently cook a cooking target. The first cooking apparatus 100, the second cooking apparatus 200, and the third cooking apparatus 300 may be one or more of an electric oven, a gas oven, a microwave oven, a gas stove, and an electric stove. The first cooking apparatus 100, the second cooking apparatus 200, and the third cooking apparatus 300 may be the same type of cooking apparatus or may be different types of cooking apparatuses. For example, all of the first cooking apparatus 100, the second cooking apparatus 200, and the third cooking apparatus 300 may be an oven or a microwave oven. In addition, in another example, the first cooking apparatus 100 may be a microwave oven, the second cooking apparatus may be an electric oven or a gas oven, and the third cooking apparatus 300 may be a gas stove.

The first cooking apparatus 100, the second cooking apparatus 200, and the third cooking apparatus 300 may be provided to be able to communicate with one another through a wired communication network or a wireless communication network. Here, the wired communication network may be constructed using a cable connected to each of the apparatuses, and the cable may include a pair cable, a coaxial cable, an optical fiber cable, or an Ethernet cable. In addition, the wireless communication network may be realized using a short-distance communication network or a mobile communication network. The short-distance communication network may be constructed using a wireless LAN, a Wi-Fi, Bluetooth, ZigBee, CAN communication, WFD, UWB communication, IrDA communication, Bluetooth low energy communication, and NFC. The mobile communication network may be constructed using various types of mobile communication standards based on 3GPP, 3GPP2, and Wi-Max.

As described above, the first cooking apparatus 100 may include the user interface 110, and the user interface 110 may receive various types of commands related to one or more of the first cooking apparatus 100 and the second cooking apparatus 200 from the user and provide the user with information on one or more of the first cooking apparatus 100 and the second cooking apparatus 200. In addition, according to an embodiment, the user interface 110 may also receive a user command related to the third cooking apparatus 300 or provide the user with information on the third cooking apparatus 300.

The second cooking apparatus 200 may receive a control signal directly from the first cooking apparatus 100 or receive a control signal via the third cooking apparatus 300. The second cooking apparatus 200 operates according to the received control signal. In this case, the second cooking apparatus 200 may not be equipped with a user interface for receiving a command from the user or a control device for generating a control signal, and may operate only by the control signal transmitted from the first cooking apparatus 100. In addition, the second cooking apparatus 200 may transmit information on an operation or a state of the second cooking apparatus 200 directly to the first cooking apparatus 100 or via the third cooking apparatus 300. The user interface 110 of the first cooking apparatus 100 may display information on the second cooking apparatus 200 based on the received information related to the operation or the state of the second cooking apparatus 200.

According to an embodiment, the third cooking apparatus 300 may receive a control signal from the first cooking apparatus 100 and operate according to the received control signal.

In addition, according to an embodiment, the third cooking apparatus 300 may also transmit information on an operation of the third cooking apparatus 300 to the first cooking apparatus 100. In this case, the first cooking apparatus 100 may perform a predetermined operation in response to the operation of the third cooking apparatus 300. For example, when the third cooking apparatus 300 is a gas stove or an electric stove and the gas stove or the electric stove starts operating, the first cooking apparatus 100 may start an operation of a suctioning fan provided below the first cooking apparatus 100 to suction smoke generated from a container being heated by the gas stove or the electric stove.

In addition, according to an embodiment, the third cooking apparatus 300 may also mediate transmission of information or commands between the first cooking apparatus 100 and the second cooking apparatus 200.

According to an embodiment, the second cooking apparatus 200 and the third cooking apparatus 300 may abut the first cooking apparatus 100 or may be disposed to be spaced apart from the first cooking apparatus 100 by a predetermined distance. For example, the third cooking apparatus 300 may be disposed below the first cooking apparatus 100 and above the second cooking apparatus 200. In this case, the third cooking apparatus 300 may be installed at an upper end of the second cooking apparatus 200 to be spaced the predetermined distance apart from the first cooking apparatus 100 and abut the second cooking apparatus 200. In addition, in another example, the first cooking apparatus 100 to the third cooking apparatus 300 may also be disposed next to each other and be disposed parallel to one another. Moreover, the first cooking apparatus 100 to the third cooking apparatus 300 may also be disposed in various ways.

Hereinafter, the first cooking apparatus 100 to the third cooking apparatus 300 will be described in more detail.

Figure 5:
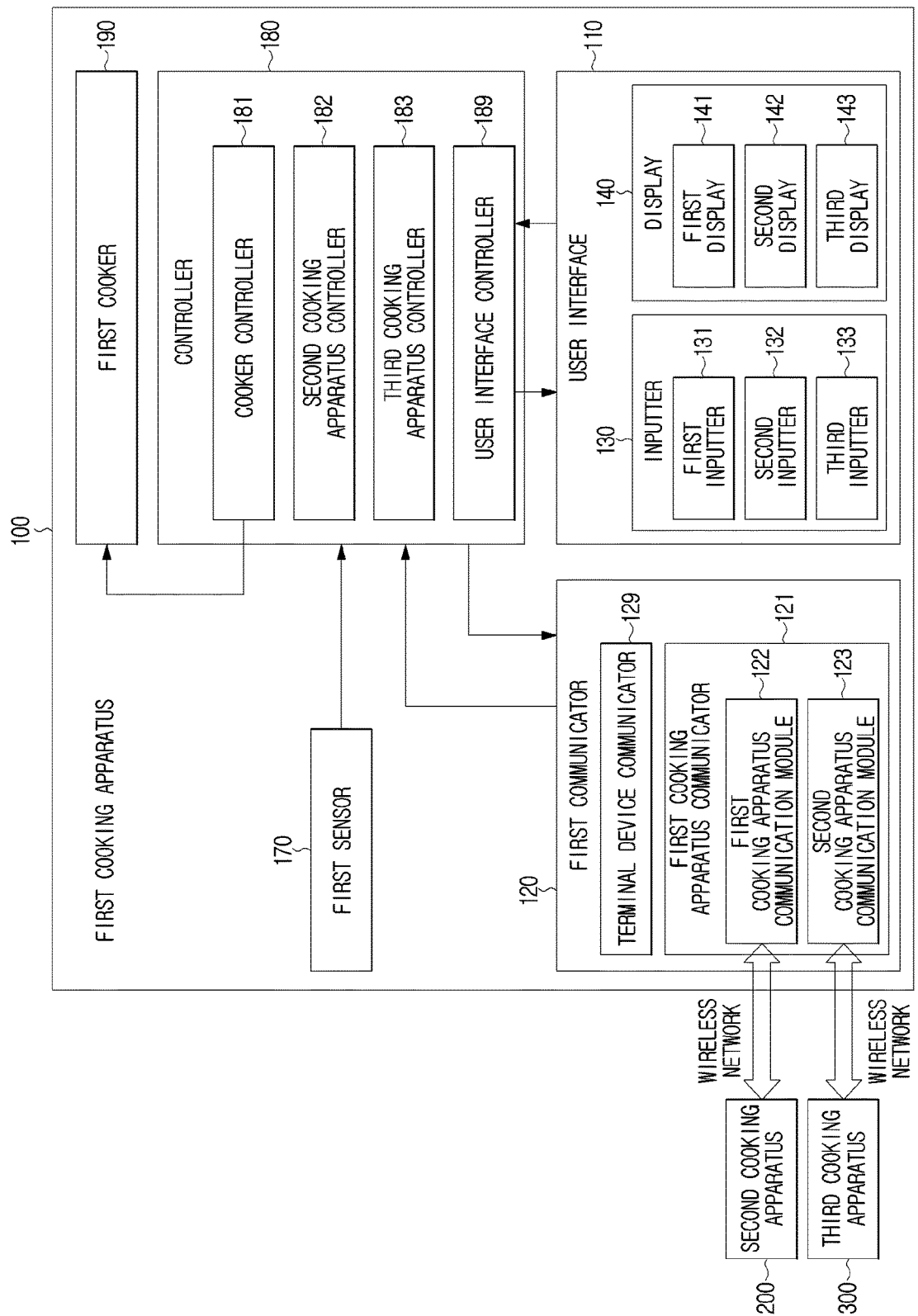
FIG. 5 is a block diagram of the first cooking apparatus according to an embodiment of the present disclosure.

FIG. 5 is a block diagram of the first cooking apparatus according to an embodiment of the present disclosure.

Referring to FIG. 5, the first cooking apparatus 100 may include the user interface 110, the first communicator 120, the first sensor 170, the controller 180, and the first cooker 190.

The user interface 110 may include the inputter 130 configured to receive a command related to an operation of the first cooking apparatus 100 and the second cooking apparatus 200 from the user. In this case, according to an embodiment, the inputter 130 may further receive a command related to an operation of the third cooking apparatus 300.

According to an embodiment, the inputter 130 may include the first inputter 131 configured to receive a command related to the first cooking apparatus 100 and the second inputter 132 configured to receive a command related to the second cooking apparatus 200. Since the first inputter 131 and the second inputter 132 have been described above, detailed descriptions thereof will be omitted.

In addition, the inputter 130 may further include a third inputter 133 configured to receive a command related to the third cooking apparatus 300. The third inputter 133 may output an electrical signal corresponding to a user manipulation and transmit the electrical signal to the controller 180, and the controller 180 may transmit the electrical signal output by the third inputter 133 or a control signal corresponding to the electrical signal to the third cooking apparatus 300 through the first communicator 120. The third cooking apparatus 300 may operate according to the received electrical signal or control signal. The third inputter

133 may be realized using an inputter such as a physical button, a keyboard, a touch pad, a touch screen, a touch sensor, a knob, a jog shuttle, a joystick, a track ball, a track pad, a motion sensor, and/or a mouse device. The third inputter 133 may be omitted according to an embodiment.

The first inputter 130 to the third inputter 133 may be physically separated or logically differentiated. When the first inputter 130 to the third inputter 133 are logically differentiated, the first inputter 130 to the third inputter 133 may be realized using an inputter such as a touch screen capable of selectively serving as any one of the first inputter 130 to the third inputter 133.

The user interface 110 may include the display 140 configured to display information on one or more of the first cooking apparatus 100 and the second cooking apparatus 200. According to an embodiment, the display 140 may further display information on the third cooking apparatus 300.

The display 140 may include the first display 141 configured to display information on the first cooking apparatus 100 and the second display 142 configured to display information on the second cooking apparatus 200. Since the first display 141 and the second display 142 have been described in detail above, the descriptions thereof will be omitted.

According to an embodiment, the display 140 may further include a third display 143. The third display 143 may be provided to display information related to an operation of the third cooking apparatus 300. The third display 143 may be realized using an image outputter such as a CRT, an LCD panel, an LED display panel, an OLED display panel, an active-matrix OLED display panel, and a cold cathode fluorescent lamp. According to an embodiment, the third display 143 may also be omitted. In addition, according to an embodiment, a single display 140 may display information on all of the first cooking apparatus 100 to the third cooking apparatus 300 simultaneously or at different times.

As described above, the user interface 110 may further include various elements other than those stated above such as a sound outputter capable of receiving information from the user or providing the user with information.

The first communicator 120 is provided to enable the first cooking apparatus 100 to communicate with an external device, e.g., one or more of the second cooking apparatus 200, the third cooking apparatus 300, and a terminal device. The first communicator 120 may include the first cooking apparatus communicator 121 and the terminal device communicator 129. The first cooking apparatus communicator 121 communicates with the other cooking apparatuses 200 and 300, and the terminal device communicator 129 communicates with a separately provided terminal device. The first cooking apparatus communicator 121 may also communicate with each of a plurality of cooking apparatuses 200 and 300 through a single communication module. In addition, the first cooking apparatus communicator 121 may include a plurality of communication modules, e.g., a first cooking apparatus communication module 122 and a second cooking apparatus communication module 123 configured to respectively communicate with the cooking apparatuses 200 and 300. The first cooking apparatus communication module 122 may communicate with the second cooking apparatus 200, and the second cooking apparatus communication module 123 may communicate with the third cooking apparatus 300. The first cooking apparatus communication module 122 and the second cooking apparatus communication module 123 may respectively communicate with the second cooking apparatus 200 and the third cooking apparatus 300 using the same communication technology, e.g., Bluetooth technology or Wi-Fi technology, or using different communication technologies. Since the description of the first communicator 120 aside from the above description has been given above with reference to FIG. 2, a detailed description thereof will be omitted.

The controller 180 may control an overall operation of the first cooking apparatus 100 and may include, for example, the cooker controller 181, the second cooking apparatus controller 182, a third cooking apparatus controller 183, and the user interface controller 189.

The cooker controller 181 may control various types of operations of the first cooker 190.

According to an embodiment, the second cooking apparatus controller 182 may generate a control signal related to the second cooking apparatus 200 in response to a user command input through the inputter 130, e.g., the second inputter 132, and may transmit the generated control signal to the first cooking apparatus communicator 121, e.g., the first cooking apparatus communication module 122. The first cooking apparatus communication module 122 transmits the control signal corresponding to the user command to the second cooking apparatus 200 to enable the second cooking apparatus 200 to operate corresponding to the user command input through the first cooking apparatus 100.

According to an embodiment, the third cooking apparatus controller 183 may generate a control signal related to the third cooking apparatus 300 in response to a user command input through the inputter 130, e.g., the third inputter 133, and transmit the generated control signal to the first cooking apparatus communicator 121, e.g., the second cooking apparatus communication module 123, to enable the third cooking apparatus 300 to operate according to the user command. The third cooking apparatus controller 183 may also be omitted.

The user interface controller 189 may control an overall operation of the user interface 110.

The cooker controller 181, the second cooking apparatus controller 182, the third cooking apparatus controller 183, and the user interface controller 189 may be physically separated or logically differentiated. When all of the cooker controller 181, the second cooking apparatus controller 182, the third cooking apparatus controller 183, and the user interface controller 189 are physically separated, the cooker controller 181, the second cooking apparatus controller 182, the third cooking apparatus controller 183, and the user interface controller 189 may be realized by different semiconductor chips and related parts. When all of the cooker controller 181, the second cooking apparatus controller 182, the third cooking apparatus controller 183, and the user interface controller 189 are logically differentiated, the cooker controller 181, the second cooking apparatus controller 182, the third cooking apparatus controller 183, and the user interface controller 189 may be realized using one or more semiconductor chips and related parts.

The first cooker 190 is provided to cook a cooking target using a specific method.

Since the cooker controller 181, the second cooking apparatus controller 182, the user interface controller 189, and the first cooker 190 of the first cooking apparatus 100 have been described above, detailed descriptions thereof will be omitted.

The first cooking apparatus 100 may further include the first sensor 170 configured to sense an operation of one or more of the second cooking apparatus 200 and the third cooking apparatus 300. The first sensor 170 transmits an electrical signal according to a sensed result to the controller 180 and enables the first cooking apparatus 100 to operate according to the sensed result. For example, when the third cooking apparatus 300 is a gas stove or an electric stove, the first sensor 170 may sense smoke generated in a cooking container according to cooking by the gas stove or the electric stove and transmit a sensed result to the controller 180 to enable a suctioning fan provided below the first cooking apparatus 100 to operate. Accordingly, smoke generated in the cooking container may be suctioned and discharged to the outside.

Figure 6:
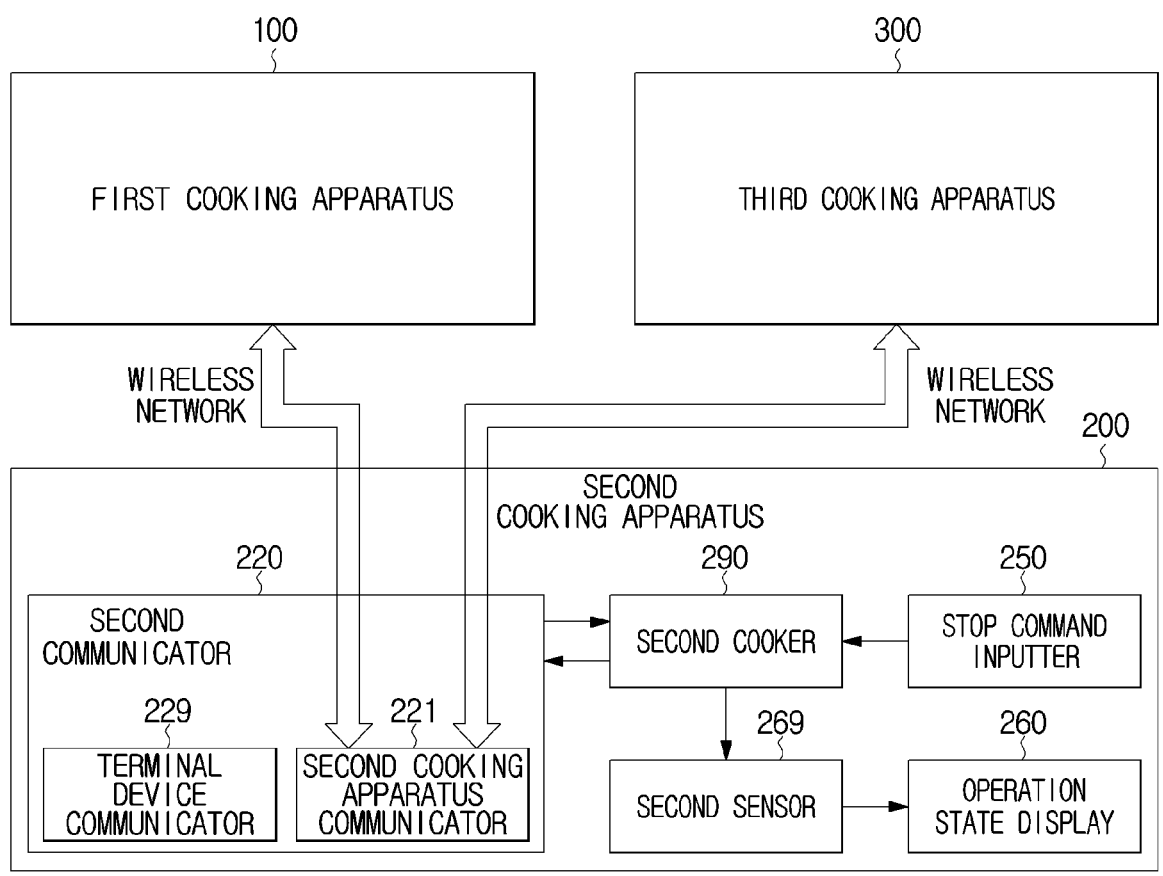
FIG. 6 is a block diagram of the first cooking apparatus according to an embodiment of the present disclosure.

FIG. 6 is a block diagram of the second cooking apparatus according to an embodiment of the present disclosure.

Referring to FIG. 6, the second cooking apparatus 200 may include the second communicator 220 and the second cooker 290, and may further include one or more of the stop command inputter 250, the operation state display 260, and the second sensor 269 as necessary.

The second communicator 220 is provided to enable the second cooking apparatus 200 to communicate with an external device, e.g., one or more of the first cooking apparatus 100, the third cooking apparatus 300, and a terminal device (not illustrated).

According to an embodiment, the second communicator 220 may be designed to include the second cooking apparatus communicator 221 configured to communicate with one or more of the first cooking apparatus 100 and the third cooking apparatus 300 and the terminal device communicator 229 configured to communicate with the terminal device (not illustrated).

As described above, the second cooking apparatus communicator 221 may be connected to the first cooking apparatus communicator 121 of the first cooking apparatus 100 to be able to communicate therewith through wired and wireless communication networks to receive information or control commands output from the first cooking apparatus 10 and transmit various types of information acquired by the second cooking apparatus 200 to the first cooking apparatus 100.

In addition, the second cooking apparatus communicator 221 may be connected to a third cooking apparatus communicator 321 of the third cooking apparatus 300 to be able to communicate therewith through wired and wireless communication networks to transmit various types of information or control signals to the third cooking apparatus 300 or receive various types of information or control signals from the third cooking apparatus 300. For example, the second cooking apparatus communicator 221 may receive an electrical signal generated according to manipulation of a stop command inputter 350 provided at the third cooking apparatus 300. In this case, the second cooker 290 may stop operating according to the received electrical signal.

The terminal device communicator 229 may be connected to a terminal device provided separately from the second cooking apparatus 200 to be able to communicate therewith through wired and wireless communication networks to transmit information on the second cooking apparatus 200 to the terminal device or receive various types of user commands or information transmitted from the terminal device.

As described above, the second cooking apparatus communicator 221 and the terminal device communicator 229 may be realized using the same communicator or using different communicators. According to an embodiment, the second cooking apparatus communicator 221 and the terminal device communicator 229 may be physically differentiated or logically differentiated.

A signal received by the second communicator 220, e.g., the second cooking apparatus communicator 221, for example, a control signal transmitted from the second cooking apparatus controller 182, may be transmitted to the second cooker 290 using one or more of a circuit, a conducting wire, and a wireless communication network constructed inside the second cooking apparatus 200, and the second cooker 290 may perform a cooking operation according to the received control signal.

The stop command inputter 250 may be designed to stop an operation of one or more of the second cooker 290 and a third cooker 390 according to a user manipulation. For example, when the stop command inputter 250 is manipulated, the stop command inputter 250 may output an electrical signal according to the user manipulation, and the output electrical signal may be transmitted to the third cooking apparatus 300 via the second cooking apparatus communicator 221. The third cooker 390 of the third cooking apparatus 300 may stop operating according to the received electrical signal.

The second sensor 269 may sense an operation of the second cooker 290, output an electrical signal corresponding to a sensed result, and transmit the electrical signal to the operation state display 260. The second sensor 269 may be realized using, for example, one or more of a UV sensor, an infrared sensor, a visible light sensor, a heat sensor, a gas sensor, a magnetic sensor, and a pressure sensor.

The operation state display 260 may display the operation state of the second cooking apparatus 200 or the third cooking apparatus 300. For example, the operation state display 260 may emit predetermined light according to a state of the third cooking apparatus 300 transmitted through the second cooking apparatus communicator 221 or display a predetermined symbol, letter, or image to display the state of the third cooking apparatus 300.

The stop command inputter 250, the operation state display 260, and the second sensor 269 may be omitted according to an embodiment.

Since the detailed descriptions of the stop command inputter 250, the operation state display 260, and the second sensor 269 of the second cooking apparatus 200 aside from the above descriptions have been given above with reference to FIG. 3, the detailed descriptions thereof will be omitted.

Furthermore, as described above, the second cooking apparatus 200 may not be equipped with a controller for controlling the second cooking apparatus 200. Accordingly, the second cooking apparatus 200 may be designed with a simpler structure.

Figure 7:
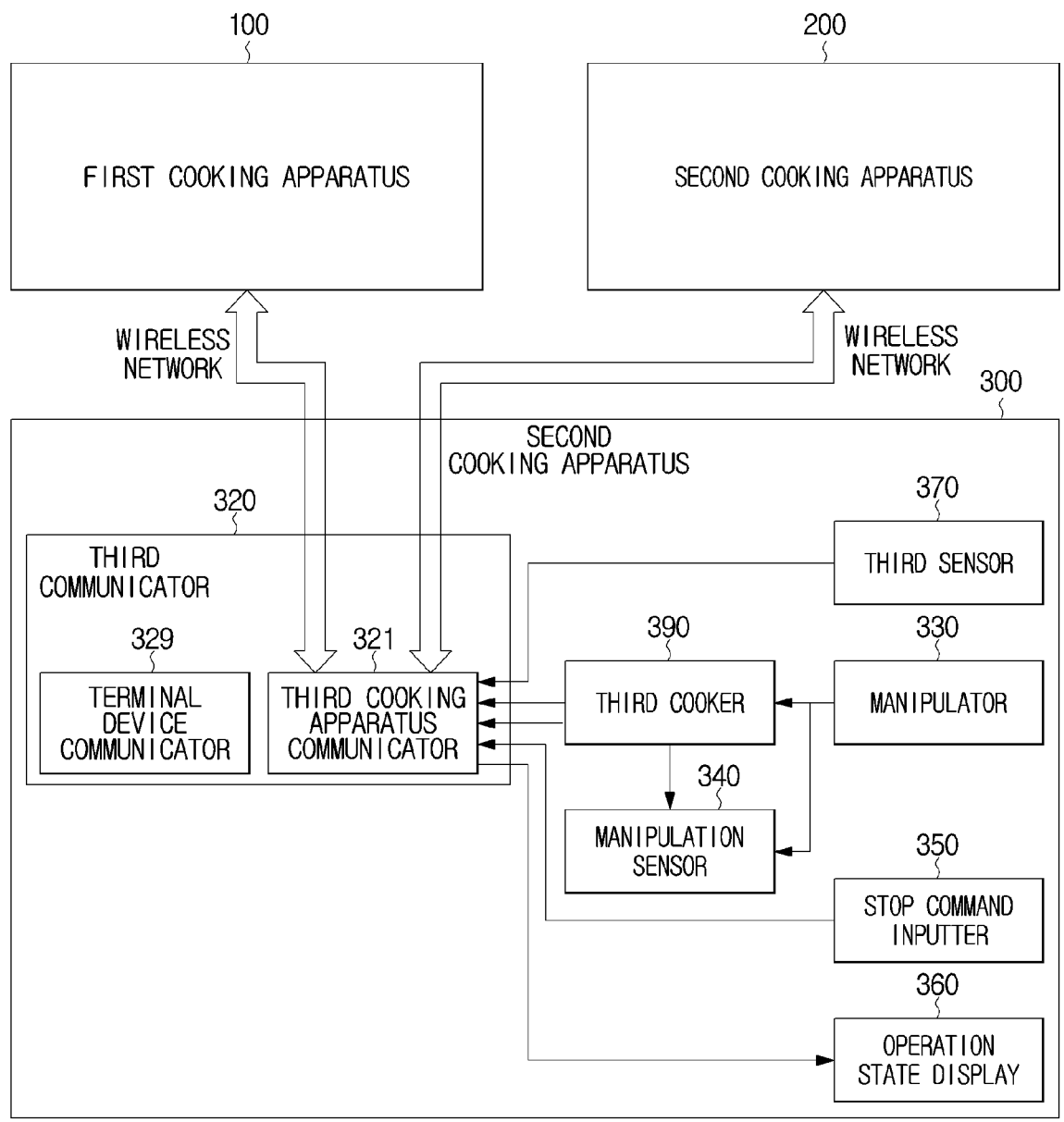
FIG. 7 is a block diagram of a third cooking apparatus according to an embodiment of the present disclosure.

FIG. 7 is a block diagram of a third cooking apparatus according to an embodiment of the present disclosure.

Referring to FIG. 7, the third cooking apparatus 300 may include a third communicator 320 and the third cooker 390.

The third communicator 320 is provided to enable the third cooking apparatus 300 to communicate with an external device, e.g., the first cooking apparatus 100, the second cooking apparatus 200, and the terminal device communicators 129 and 229 of terminal devices (not illustrated).

Like the first communicator 120 and the second communicator 220, the third communicator 320 may be realized using one or more communication modules, and a separate communication module may include one or more semiconductor chips, a substrate, an antenna, etc.

Referring to FIG. 7, the third communicator 320 may include the third cooking apparatus communicator 321 and a terminal device communicator 329.

The third cooking apparatus communicator 321 may be connected to one or more of the first cooking apparatus 100 and the second cooking apparatus 200 to be able to communicate therewith through wired and wireless communication networks. By such communication, the third cooking apparatus 300 may receive information or a command from one or more of the first cooking apparatus 100 and the second cooking apparatus 200 or may transmit information or a command to the first cooking apparatus 100 and the second cooking apparatus 200. In this case, the third cooking apparatus 300 may receive information or a control command output by the first cooking apparatus 100 directly from the first cooking apparatus 100 or via the second cooking apparatus 200.

The terminal device communicator 329 may be connected to a terminal device to be able to communicate therewith through wired and wireless communication networks to transmit information on the third cooking apparatus 300 to the terminal device or receive various types of user commands or information transmitted from the terminal device. Here, the terminal device may be the same terminal device as the terminal device capable of communicating with the terminal device communicator 129 of the first cooking apparatus 100 and the terminal device communicator 229 of the second cooking apparatus 200. The terminal device communicator 329 of the third cooking apparatus 300 may be omitted according to an embodiment.

Like the first cooking apparatus communicator 121, the terminal device communicator 129, the second cooking apparatus communicator 221, and the terminal device communicator 229 described above, the third cooking apparatus communicator 321 and the terminal device communicator 329 may be realized using the same communicator or using different communicators. The third cooking apparatus communicator 321 and the terminal device communicator 329 may also be physically differentiated or logically differentiated.

The third cooker 390 may perform a cooking operation according to a control signal transmitted from the first cooking apparatus 100 or manipulation of a manipulator 330. Like the first cooker 190 and the second cooker 290, the third cooker 390 may be realized by employing various parts depending on the type of the third cooking apparatus 300. For example, when the third cooking apparatus 300 is a gas stove, the third cooker 390 may include a burner, a gas pipe connected to the burner, an ignition system, etc. Moreover, the third cooker 390 may be realized by employing various parts that may be considered by a designer to realize a cooking function depending on the type of the third cooking apparatus 300.

According to an embodiment, the third cooking apparatus 300 may further include the manipulator 330, a manipulation sensor 340, the stop command inputter 350, an operation state display 360, and a third sensor 370. One or more of the manipulator 330, the manipulation sensor 340, the stop command inputter 350, the operation state display 360, and the third sensor 370 may be omitted depending on a designer's choice.

The manipulator 330 may receive a user command for operating the third cooker 390. For example, the manipulator 330 may be realized using a physical button, a keyboard, a touch pad, a touch screen, a touch sensor, a knob, a joystick, a track ball, or a track pad. When the user presses or rotates the manipulator 330 or applies a predetermined gesture to the manipulator 330, the third cooker 390 may perform an operation according to the manipulation of the manipulator 330. In this case, the manipulator 330 may output an electrical signal, open or close a gas pipe provided at the third cooker 390, or perform various other operations required to operate the third cooker 390 to enable the third cooker 390 to perform a cooking operation.

The manipulation sensor 340 may sense whether the user has manipulated the manipulator 330, output an electrical signal according to a sensed result, and transmit the electrical signal to the third cooking apparatus communicator 321. For example, when the manipulator 330 is a knob, the manipulation sensor 340 may sense whether the knob has been rotated and output an electrical signal according to a sensed result. In addition, in another example, when the manipulator is a physical button, the manipulation sensor 340 may sense whether the physical button has been moved or pressed and output an electrical signal according to a sensed result.

Figure 26:
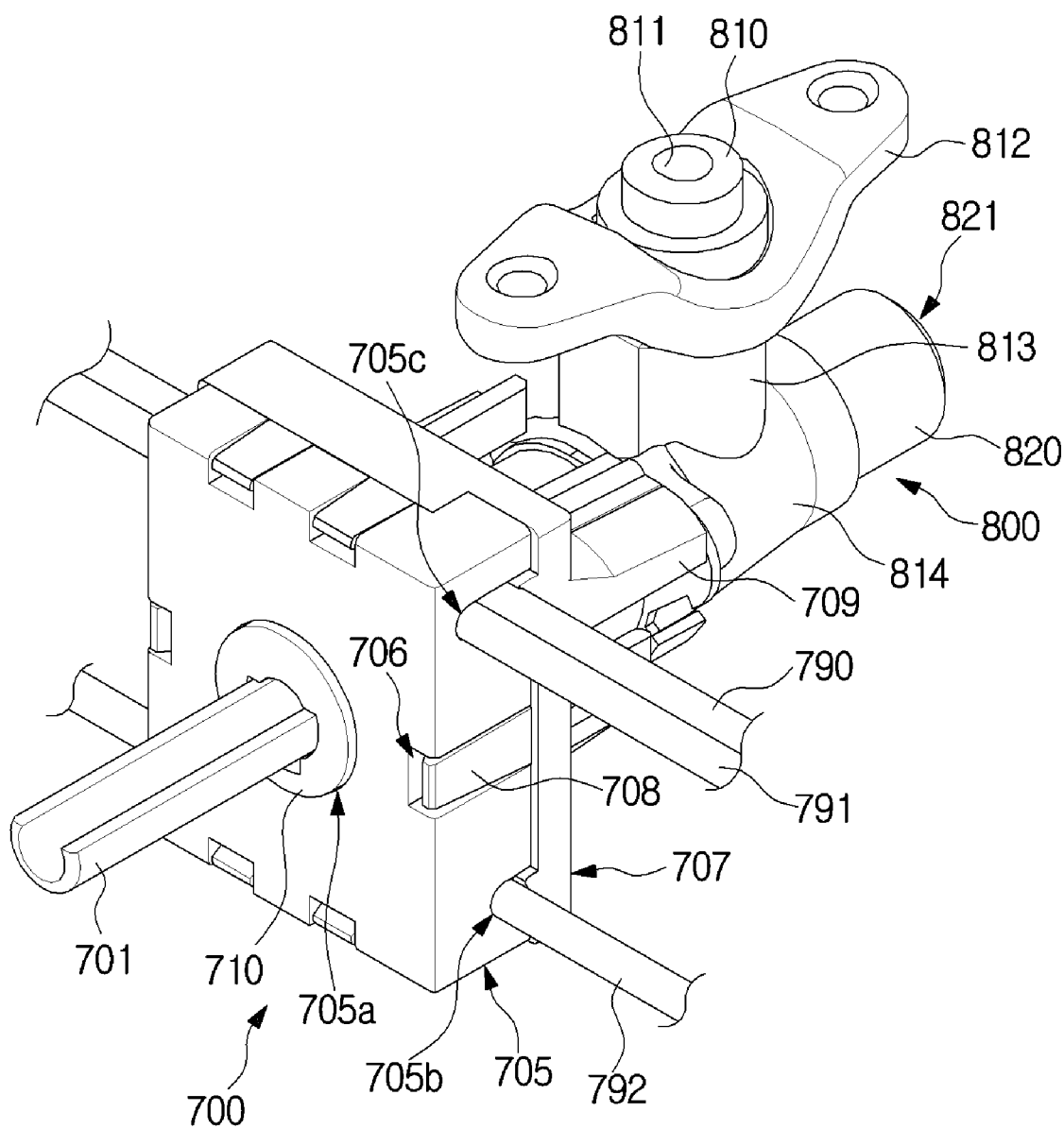
FIG. 26 is a view illustrating an example in which the ignition switch assembly and the gas supply assembly are coupled according to an embodiment of the present disclosure.

When the third cooking apparatus 300 is a microwave oven, the manipulation sensor 340 may sense whether an ignition switch 630 (refer to FIG. 24) has been manipulated using an ignition switch manipulation sensor 730 (refer to FIG. 27) provided in an ignition switch assembly 700 (refer to FIG. 26).

An electrical signal output by the manipulation sensor 340 may be transmitted to the first cooking apparatus 100 through the third cooking apparatus communicator 321, and the first cooking apparatus 100 may start a predetermined operation such as a rotating operation of a suctioning fan based on the electrical signal output by the manipulation sensor 340.

The stop command inputter 350 is designed to be able to stop an operation of the second cooker 290 of the second cooking apparatus 200 according to a user manipulation. Like the stop command inputter 250 provided at the second cooking apparatus 200, the stop command inputter 350 may immediately stop the second cooking apparatus 200 by being manipulated by the user. According to an embodiment, the stop command inputter 350 may be realized using a physical button, a keyboard, a touch pad, a touch screen, a touch sensor, a knob, a joystick, a track ball, or a track pad.

The operation state display 360 may display the operation state of the second cooking apparatus 200. For example, the operation state display 360 may include a lighting device capable of outputting light, and the lighting device may emit light of the predetermined color to inform the user that the second cooker 290 of the second cooking apparatus 200 is operating. In this case, the operation state display 360 may be designed to display whether the second cooking apparatus 200 is operating by emitting light according to an electrical signal transmitted from the second cooking apparatus 200 through wired and wireless communication networks.

In addition, the operation state display 360 may also display the state of the third cooking apparatus 300. For example, the operation state display 360 may emit light of a predetermined color to inform the user that the third cooker 390 of the third cooking apparatus 300 is operating.

When the operation state display 360 is able to display operation states of both of the second cooking apparatus 200 and the third cooking apparatus 300, the operation state display 360 may output different colors of light every time each of the second cooking apparatus 200 and the third cooking apparatus 300 operates to separately display whether the second cooking apparatus 200 is operating and whether the third cooking apparatus 300 is operating.

According to an embodiment, the operation state display 360 may be realized using various types of lighting devices capable of emitting light of a predetermined color such as an LED lamp, a fluorescent lamp, a UV lamp, a halogen lamp, a mercury lamp, a sodium lamp, and an incandescent lamp.

In addition, according to an embodiment, the operation state display 360 may also be realized using the display panel described above.

The third sensor 370 may sense an operation of the third cooker 390, output an electrical signal corresponding to a sensed result, and transmit the electrical signal to the first cooking apparatus 100 or the second cooking apparatus 200. The third sensor 370 may sense a current applied to the third cooker 390, heat or smoke generated in the third cooker 390, or whether gas has been introduced into the third cooker 390, and output an electrical signal corresponding to a sensed result. The third sensor 370 may be realized using, for example, one or more of a UV sensor, an infrared sensor, a visible light sensor, a heat sensor, a gas sensor, a magnetic sensor, and a pressure sensor.

Like the second cooking apparatus 200, the third cooking apparatus 300 may not include a separate controller as illustrated in FIG. 7. As described above, when the third cooking apparatus 300 does not include a separate controller, a semiconductor chip for realizing the controller, related parts, or a substrate do not have to be embedded in the third cooking apparatus 300, thereby improving convenience of manufacturing the third cooking apparatus 300 and saving costs.

Hereinafter, a cooking apparatus controlling system according to various embodiments will be described with reference to FIGS. 8-15, 16A-16B, 17A-17C, 18-28, 29A-29B, and 30-42.

Figure 8:
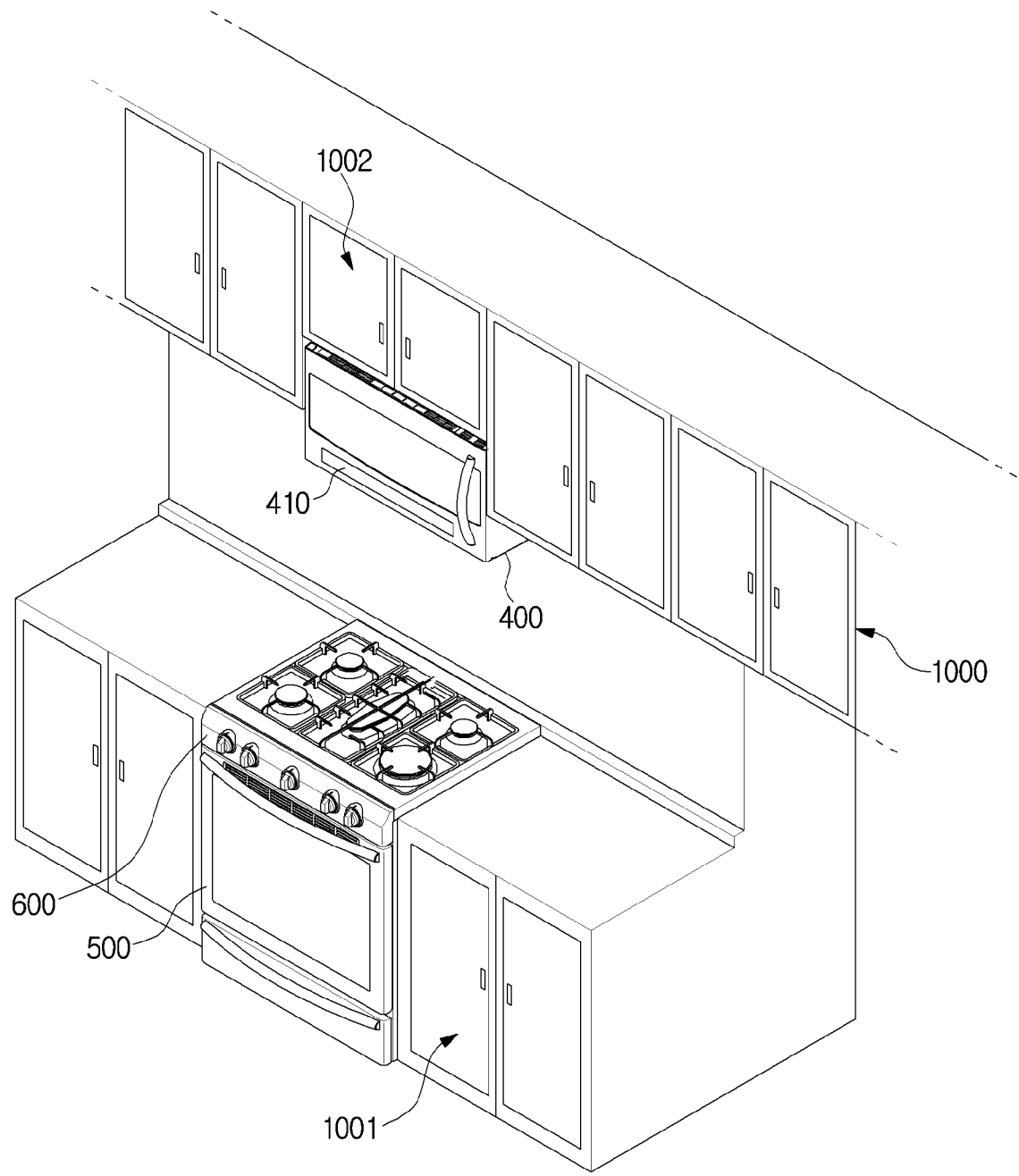
FIG. 8 is a first view illustrating an example in which a first cooking apparatus to a third cooking apparatus are installed indoors according to an embodiment of the present disclosure.

FIG. 8 is a first view illustrating an example in which a first cooking apparatus to a third cooking apparatus are installed indoors according to an embodiment of the present disclosure.

Figure 9:
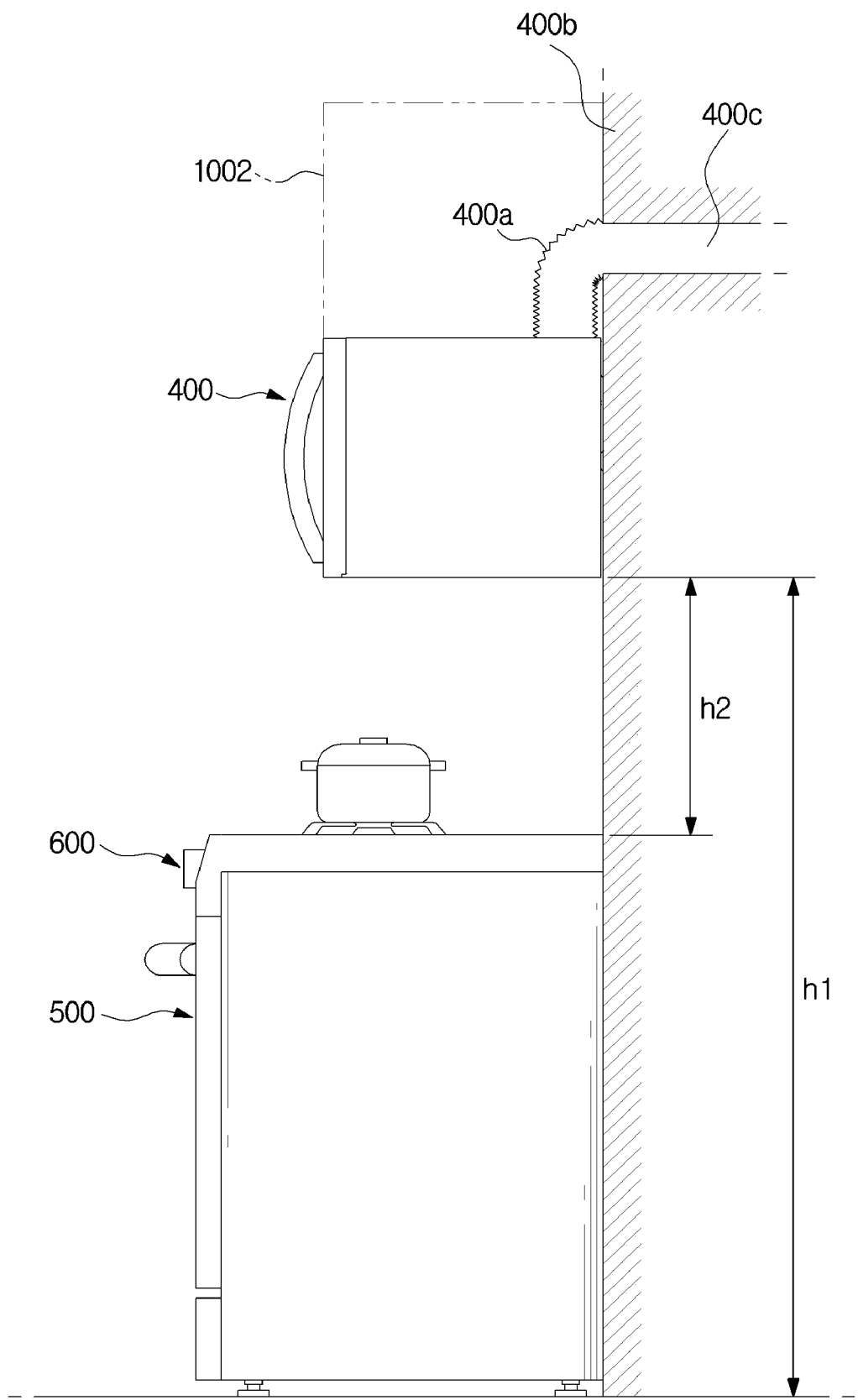
FIG. 9 is a second view illustrating the example in which the first cooking apparatus to the third cooking apparatus are installed indoors according to an embodiment of the present disclosure.

FIG. 9 is a second view illustrating the example in which the first cooking apparatus to the third cooking apparatus are installed indoors according to an embodiment of the present disclosure.

Referring to FIGS. 8 and 9, a first cooking apparatus 400, a second cooking apparatus 500, and a third cooking apparatus 600 may be installed indoors, e.g., in a kitchen. In this case, the first cooking apparatus 400 may be disposed at a highest position, and the second cooking apparatus 500 and the third cooking apparatus 600 may be installed below the first cooking apparatus 400 by being spaced apart from the first cooking apparatus 400 by a predetermined distance h2.

The first cooking apparatus 400 may be installed between upper cabinets 1000 and may be disposed below a first cabinet 1002 of the upper cabinets 1000. In other words, the first cabinet 1002 may be disposed above the first cooking apparatus 400. In this case, an exhaust duct 400a may be installed inside the first cabinet 1002. One end of the exhaust duct 400a is connected to exhaust ports 403a and 403b (refer to FIG. 10) of the first cooking apparatus 400, and the other end of the exhaust duct 400a is connected to an exhaust passage 400c formed at an outer wall 400b to form a flow channel between the exhaust ports 403a and 403b and the exhaust passage 400c. Accordingly, air that has passed through the first cooking apparatus 400 may be discharged to the outside.

The first cooking apparatus 400 may be installed at a position at a predetermined height h1 from a floor surface. In this case, the first cooking apparatus 400 may be installed at the suitable height h1 corresponding to an eye level or height of a user to enable the user to easily manipulate the first cooking apparatus 400. When the first cooking apparatus 400 is a microwave oven, the first cooking apparatus 400 may be an over-the-range (OTR) microwave oven provided with a hood.

The second cooking apparatus 500 and the third cooking apparatus 600 may be installed between lower cabinets 1001 disposed below the upper cabinets 1000. One of the second cooking apparatus 500 and the third cooking apparatus 600 may abut the floor surface, and the other one may be formed above the one of the second cooking apparatus 500 and the third cooking apparatus 600 abutting the floor surface. Hereinafter, for convenience of description, a cooking apparatus abutting the floor surface will be referred to as the second cooking apparatus 500, and a cooking apparatus formed above the second cooking apparatus 500 will be referred to as the third cooking apparatus 600.

According to an embodiment, each of the second cooking apparatus 500 and the third cooking apparatus 600 may be a cooking apparatus that is separately manufactured. In this case, the second cooking apparatus 500 may be installed between the lower cabinets 1001, and the third cooking apparatus 600 may be installed on an upper surface of the second cooking apparatus 500.

According to an embodiment, the second cooking apparatus 500 and the third cooking apparatus 600 may also be integrally manufactured. When the second cooking apparatus 500 and the third cooking apparatus 600 are integrally formed, the two cooking apparatuses 500 and 600 may share one exterior housing, parts related to the second cooking apparatus 500 may be installed or embedded in a lower portion of the exterior housing, and parts related to the third cooking apparatus 600 may be installed or embedded in an upper portion of the exterior housing to enable the third cooking apparatus 600 to be installed above the second cooking apparatus 500.

The third cooking apparatus 600 may be provided so that an upper surface thereof faces a bottom surface of the first cooking apparatus 400. Accordingly, smoke and the like generated due to a cooking operation using the third cooking apparatus 600 may be easily suctioned by an exhaust 450 provided at the bottom surface of the first cooking apparatus 400.

Although an example in which the first cooking apparatus 400, the second cooking apparatus 500, and the third cooking apparatus 600 are installed indoors has been described above, a method of installing the first cooking apparatus 400, the second cooking apparatus 500, and the third cooking apparatus 600 is not limited thereto, and the first cooking apparatus 400, the second cooking apparatus 500, and the third cooking apparatus 600 may be installed using various methods depending on a size or a feature of an installation place, a purpose of installation, etc.

Hereinafter, an example in which the first cooking apparatus 400 is a microwave oven will be described in more detail.

Figure 10:
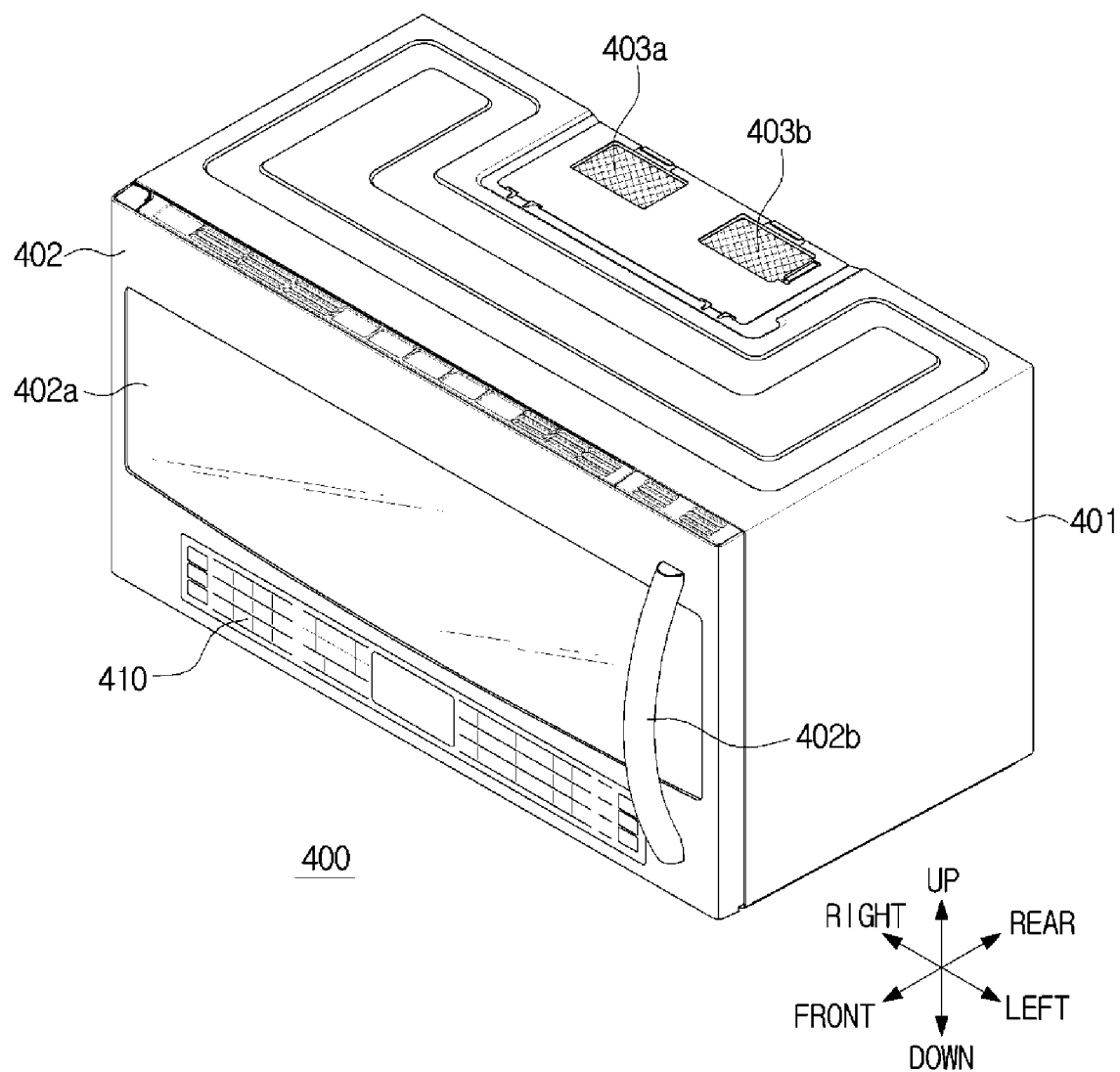
FIG. 10 is a perspective view of the first cooking apparatus according to an embodiment of the present disclosure.

FIG. 10 is a perspective view of the first cooking apparatus according to an embodiment of the present disclosure.

Figure 11:
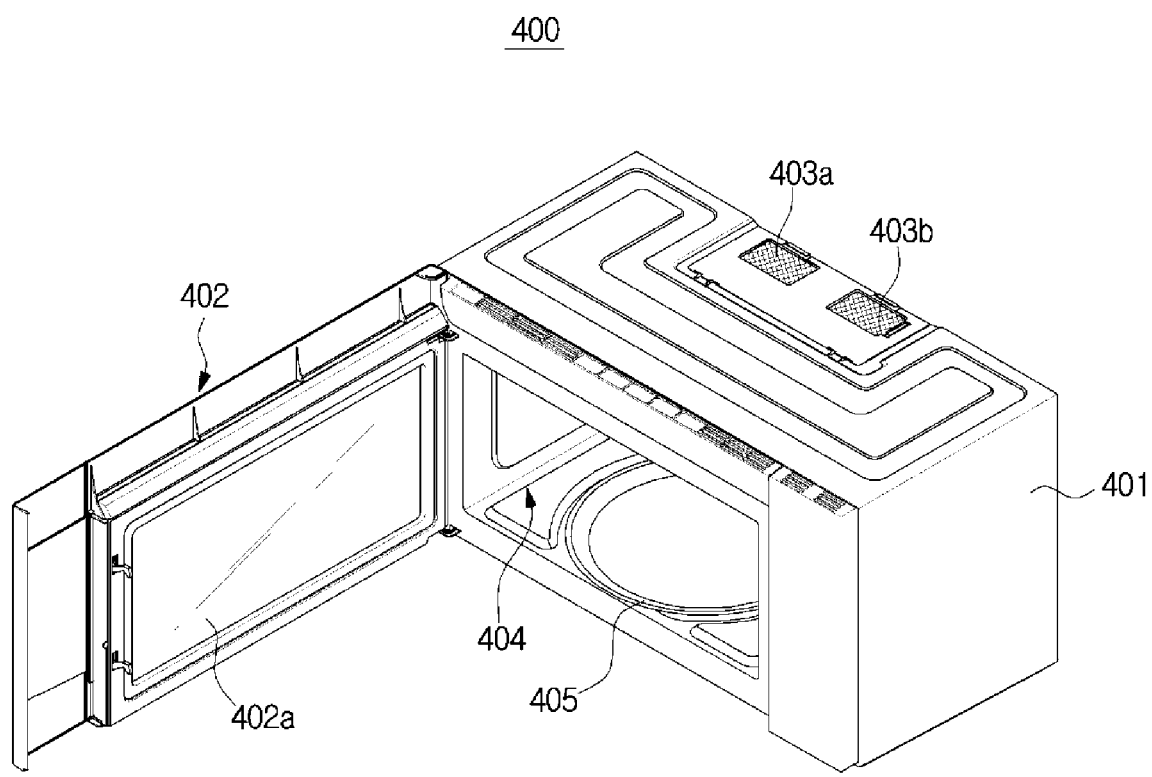
FIG. 11 is a view illustrating a state in which a door of the first cooking apparatus is open according to an embodiment of the present disclosure.

FIG. 11 is a view illustrating a state in which a door of the first cooking apparatus is open according to an embodiment of the present disclosure.

Figure 12:
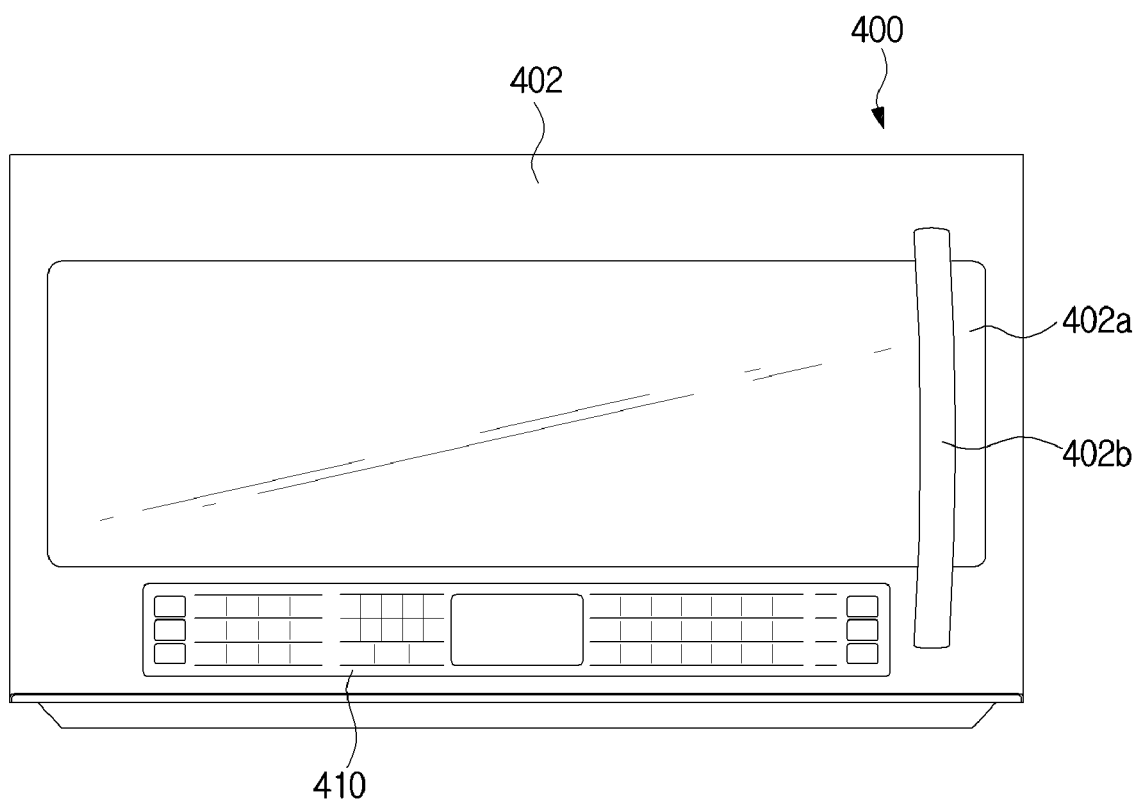
FIG. 12 is a front view of the first cooking apparatus according to an embodiment of the present disclosure.

FIG. 12 is a front view of the first cooking apparatus according to an embodiment of the present disclosure t.

Figure 13:
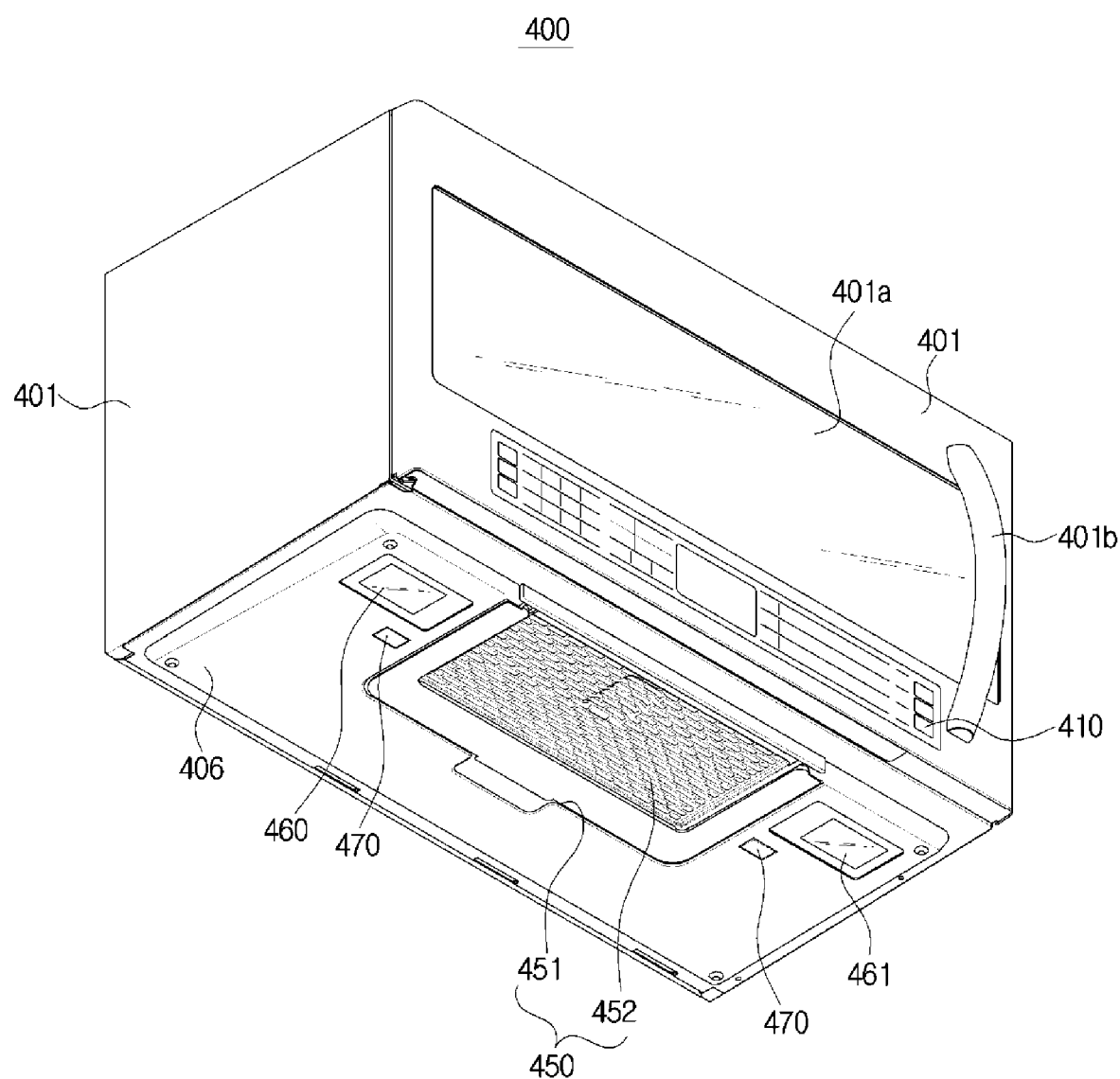
FIG. 13 is a bottom view of the first cooking apparatus according to an embodiment of the present disclosure.

FIG. 13 is a bottom view of the first cooking apparatus according to an embodiment of the present disclosure.

Figure 14:
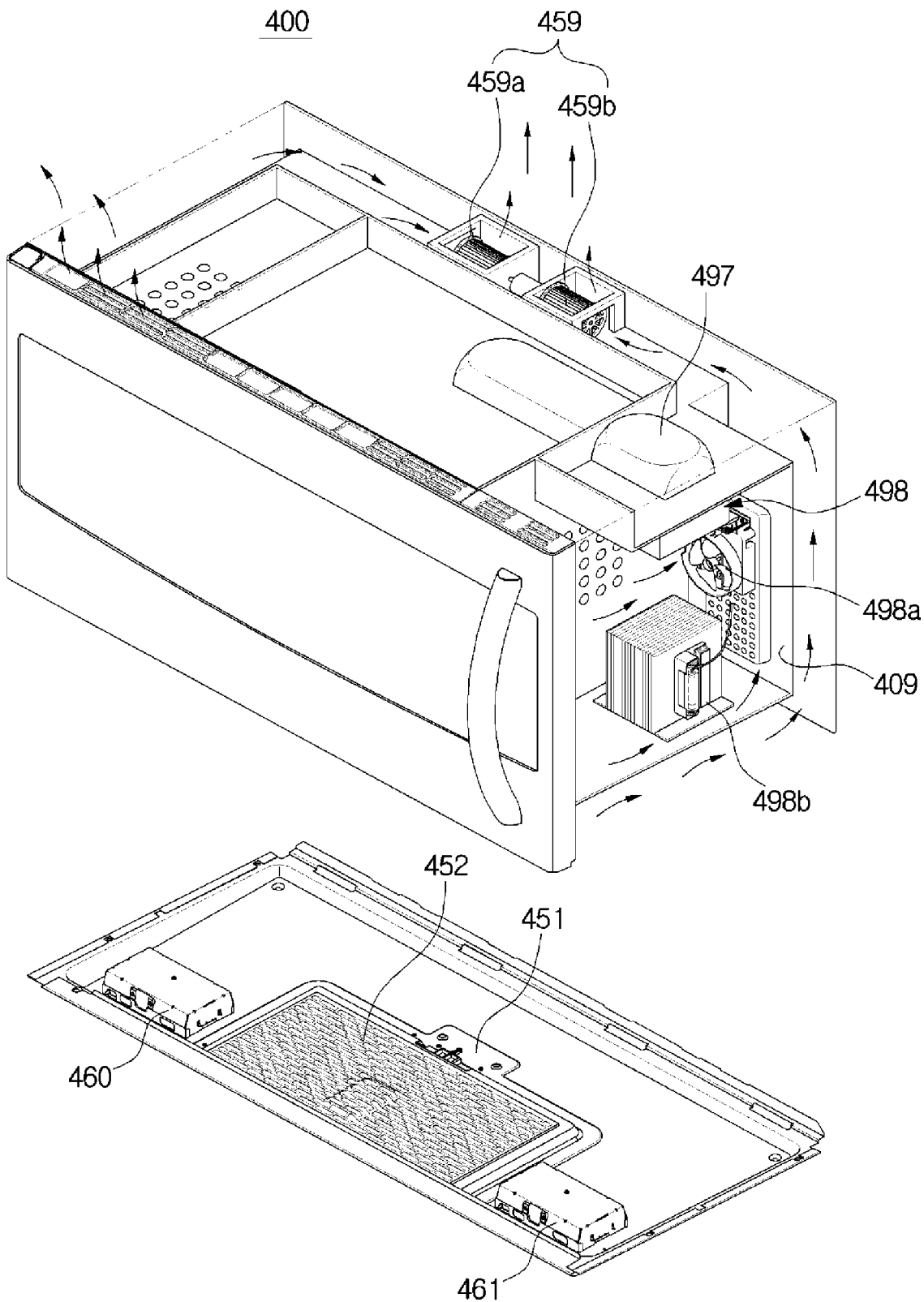
FIG. 14 is an exploded perspective view of the first cooking apparatus according to an embodiment of the present disclosure.

FIG. 14 is an exploded perspective view of the first cooking apparatus according to an embodiment of the present disclosure.

Figure 15:
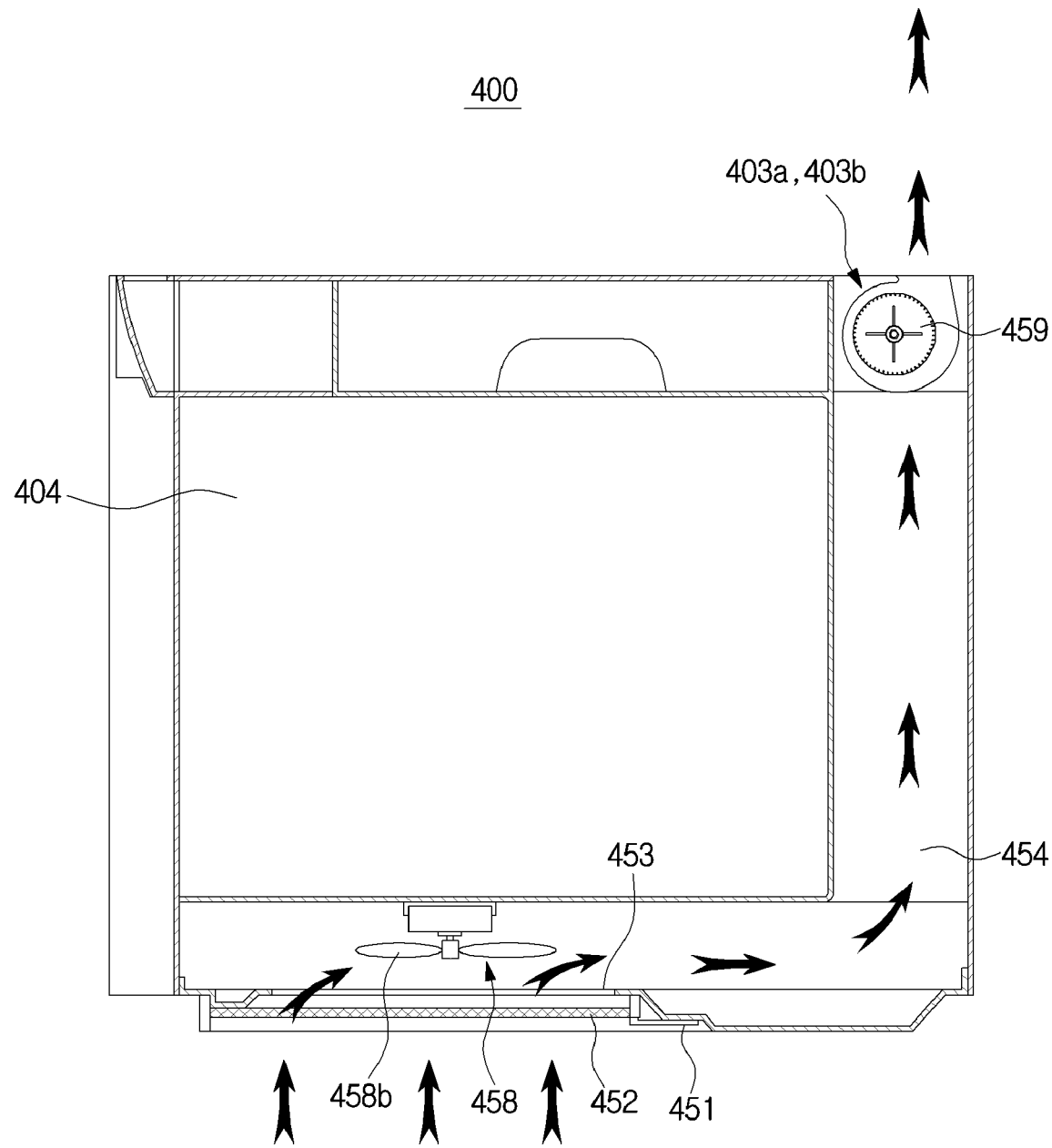
FIG. 15 is a lateral view of the first cooking apparatus according to an embodiment of the present disclosure.

FIG. 15 is a lateral view of the first cooking apparatus according to an embodiment of the present disclosure.

Referring to FIGS. 10 to 12, the first cooking apparatus 400, which is a microwave oven, may include an exterior housing 401, a door 402 provided at a front surface of the exterior housing 401 to be openable and closable, and a heating compartment 404 exposed to the outside according to the opening and closing of the door 402 and configured to heat a heating target therein. Here, the heating target refers to an object that may be heated, defrosted, dried, or sterilized. Generally, the heating target may be food, but is not necessarily limited thereto. Any object that may be put in the heating compartment 404 to be heated, defrosted, dried, or sterilized may be used as the heating target.

The exterior housing 401 forms an exterior of the first cooking apparatus 400, has a space required for cooking, including the heating compartment 404 or an electrical component compartment 409, formed therein, and also has various types of parts required for cooking embedded therein. The exterior housing 401 may have various shapes depending on a designer's choice.

The door 402 is connected to the exterior housing 401 to be openable and closable. For example, the door 402 may be coupled to the exterior housing 401 to be rotatable about a predetermined axis using a hinge and the like. In addition, the door 402 may be coupled to the exterior housing 401 by sliding to be movable in a vertical direction or a horizontal direction with respect to the heating compartment 404. According to an embodiment, the door 402 may include a transmission window 402a configured to transmit all light or some light to make an inside of the heating compartment 404 visible, a handle 402b configured to be gripped by a user when opening and closing the door 402, and a user interface 410 configured to receive various types of commands from the user or provide various types of information to the user. The transmission window 402a may be formed of materials such as glass and synthetic resin. The handle 402b may protrude in front of the door 402 or may also be recessed toward an inside of the door 402. The user interface 410 will be described below. In addition, various types of parts may be additionally installed inside the door 402. For example, parts related to an MCU for controlling the user interface 410, e.g., a semiconductor chip and a substrate, may be installed inside the door 402. In addition, a communication module that may be realized using a communication chip, an antenna, a substrate, etc., may also be installed inside the door 402.

The heating compartment 404 has an open front surface, and surfaces other than the front surface are closed, and the open front surface is provided to be opened and closed by the door 402. When the door 402 is open, a heating target may be placed inside the heating compartment 404 through the open front surface. A tray 405 configured to have the heating target placed thereon may be provided inside the heating compartment 404. According to an embodiment, the tray 405 may include a rotary plate configured to have the heating target placed thereon and rotate the heating target about a predetermined axis. The heating compartment 404 may prevent microwaves emitted by a microwave emitter from being emitted to the outside and enable microwaves that have reached an inner wall and the like to be reflected and reach the heating target. The inner wall, a floor surface, and an upper surface of the heating compartment 404 may be formed with a metal material such as a metal and stainless steel to prevent the microwaves from being emitted outside the heating compartment 404.

The first cooking apparatus 400 may include the exhaust 450 capable of suctioning smoke or odor that may be generated during cooking using the second cooking apparatus 500 or the third cooking apparatus 600. The exhaust 450 may include a suctioning mesh frame 451, a suctioning mesh 452, a suction port 453, an exhaust flow channel 454, a suctioning fan assembly 458, an exhaust fan 459, and the exhaust ports 403a and 403b.

Referring to FIGS. 13, 14, and 15, the suction port 453 is formed at a bottom surface 404 of the exterior housing 401 to face the second cooking apparatus 500 and the third cooking apparatus 600.

The suctioning mesh frame 451 and the suctioning mesh 452 may be installed below the suction port 453. A through-hole through which air may pass is formed at the suctioning mesh frame 451, and the suctioning mesh 452 is formed at the through-hole of the suctioning mesh frame 451 to prevent foreign substances from entering the exhaust flow channel 454. The suctioning mesh frame 451 may be detachably provided at the bottom surface 406 of the exterior housing 401 to be repaired or cleaned.

The suctioning fan assembly 458 configured to assist introduction of air through the suction port 453 may be provided above the suction port 453. The suctioning fan assembly 458 generates a suctioning force according to rotation to enable air flowing in the upper portion of the third cooking apparatus 600 to flow to the suction port 453. The first cooking apparatus 400 may include one or more suctioning fan assemblies 458, and each of the suctioning fan assemblies 458 may include one or more suctioning fans 458b and a fan driver 458a (refer to FIG. 18) configured to rotate the one or more fans. Here, the fan driver 458a may be realized using a motor and the like.

Air introduced through the suction port 453 enters the exhaust flow channel 454 provided inside the exterior housing 401 of the first cooking apparatus 400 and flows toward the exhaust ports 403a and 403b through the exhaust flow channel 454. The exhaust flow channel 454 may be realized using, for example, a space formed between the heating compartment 404 and the electrical component compartment 409 and between the heating compartment 404 and the exterior housing 401, or may also be realized using a separate duct or a pipe. Specifically, as illustrated in FIG. 15, the air that has entered the exhaust flow channel 454 may flow through a space provided at outer portions of a lower surface and a back surface of the heating compartment 404 and may ultimately reach the exhaust ports 403a and 403b provided at an upper portion of a back surface of the exterior housing 401.

The exhaust ports 403a and 403b may be formed at one end of the exhaust flow channel 454 to enable air introduced through the suction port 453 to flow to the exhaust duct 400a. The exhaust ports 403a and 403b may be provided at a portion of an upper surface 403 of the exterior housing 401 and may be provided to be connected to one end of the exhaust duct 400a. For example, a coupling member such as a hook or an insertion groove to which the exhaust duct 400a may be coupled may be provided near the exhaust ports 403a and 403b. One or a plurality of the exhaust ports 403a and 403b may be provided at the upper surface 403 of the exterior housing 401.

In addition, the exhaust fan 459 configured to discharge air flowing through the exhaust flow channel 454 to an outdoor space or to an inner portion of the exhaust duct 400a may be provided at the exhaust ports 403a and 403b. The exhaust fan 459 may be connected to a driving device for rotating the exhaust fan 459, and the driving device may be realized using a motor. According to rotation of the exhaust fan 459, the air flowing through the exhaust flow channel 454 is discharged to the outside of the first cooking apparatus 400 by forcibly flowing to the outdoor space or to the inner portion of the exhaust duct 400a. As illustrated in FIG. 14, the exhaust fan 459 may be provided in plurality (459a and 459b).

Referring to FIG. 14, various types of parts for driving the first cooking apparatus 400, e.g., a microwave oven, may be provided inside the electrical component compartment 409. For example, a wave guide 497, a microwave emitter housing 498, a heat-emitting fan 498a, a power supply 498b, and various types of substrates are provided inside the electrical component compartment 409.

Figure 18:
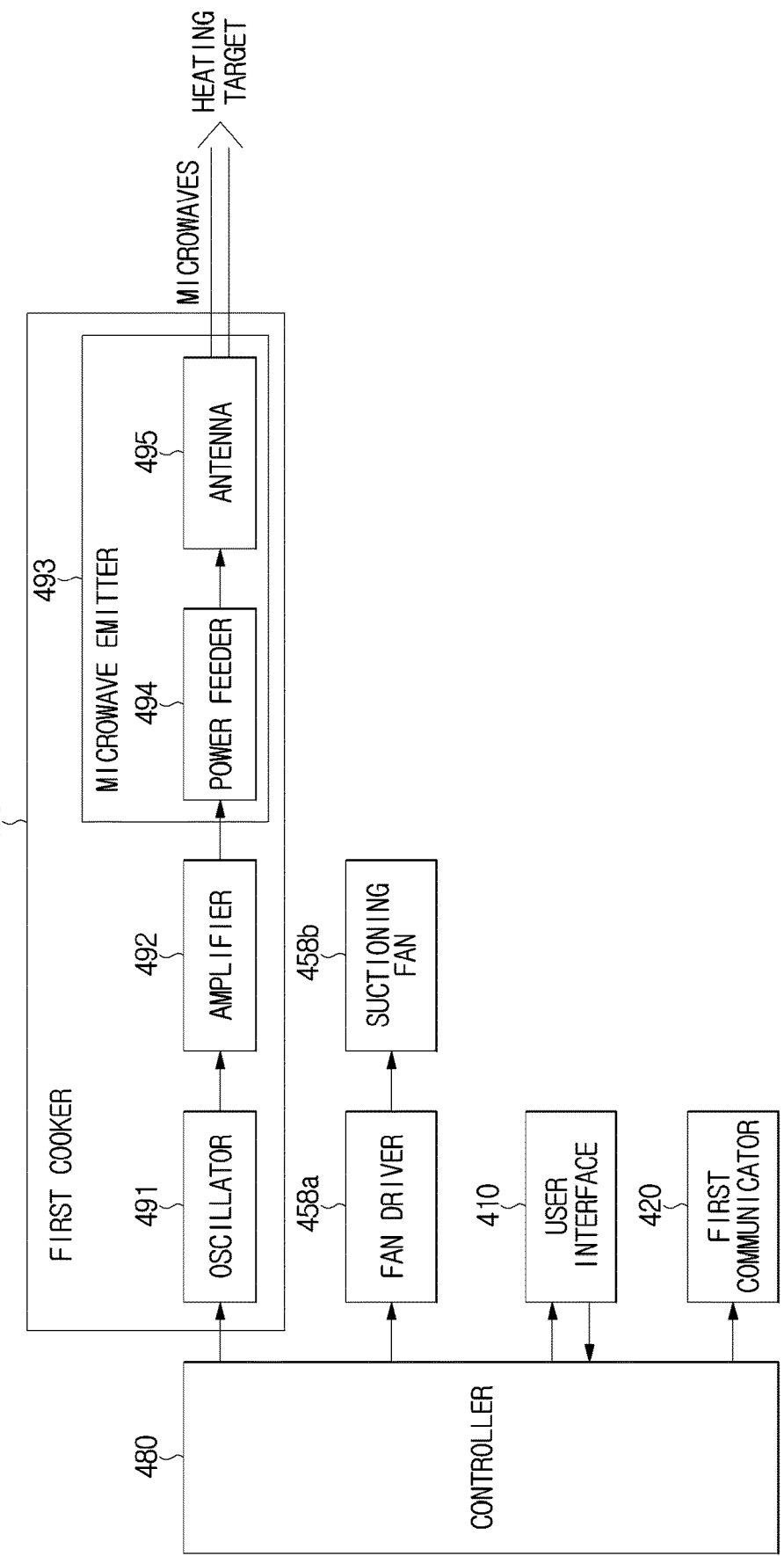
FIG. 18 is a view for describing a flow of controlling the first cooking apparatus according to an embodiment of the present disclosure.

The wave guide 497 serves as a propagation passage of microwaves generated by a microwave emitter 493 (refer to FIG. 18). After moving along the wave guide 497, the microwaves are emitted to an inner portion of the heating compartment 404. Although an example in which a single wave guide 497 is formed at an upper portion of the heating compartment 404 is illustrated in FIG. 14, the number of installation places of the wave guide 497 may be designed in various ways depending on a designer's choice.

Various types of parts related to emitting microwaves, e.g., a power feeder 494 and an antenna 495, may be embedded in the microwave emitter housing 498. A portion of the microwave emitter housing 498 is open, and the open portion is connected to the wave guide 497 to enable microwaves emitted from the antenna 495 to be transmitted to the heating compartment 404 through the wave guide 497.

The heat-emitting fan 498a serves to emit heat generated inside the electrical component compartment 409 to the outside. The generated heat may be transmitted to the exhaust ports 403a and 403b through the exhaust flow channel 454.

The power supply 498b serves to supply power to each part of the first cooking apparatus 400, and may also supply power to the microwave emitter 493.

Moreover, a substrate having a semiconductor chip and related parts for performing a function of a controller 480 (refer to FIG. 18) formed thereon may be installed inside the electrical component compartment 409, and an MCU for controlling the user interface 410 may also be installed therein. The MCU may be installed at the substrate described above or at a separate substrate. In addition, according to an embodiment, a communication module may also be installed inside the electrical component compartment 409.

According to an embodiment, the first cooking apparatus 400 may include lights 460 and 461 and a first sensor 470. As illustrated in FIG. 13, the lights 460 and 461 and the first sensor 470 may be formed at the bottom surface 404 of the exterior housing 401.

The lights 460 and 461 may emit light toward the third cooking apparatus 600 to brighten an upper end of the third cooking apparatus 600. The lights 460 and 461 may be realized using various types of lighting devices capable of emitting light such as an LED lamp, a fluorescent lamp, a UV lamp, a halogen lamp, a mercury lamp, a sodium lamp, and an incandescent lamp. According to an embodiment, the lights 460 and 461 may emit light according to a user manipulation or according to a control signal transmitted from the controller 480 in response to an operation of the third cooking apparatus 600.

The first sensor 470 may sense smoke or heat generated from the third cooking apparatus 600, output an electrical signal according to a sensed result, and transmit the electrical signal to the controller 480. The controller 480 may drive the one or more suctioning fans 458b of the suctioning fan assembly 458 according to the result sensed by the first sensor 470. Accordingly, the one or more suctioning fans 458b of the first cooking apparatus 400 may automatically operate in response to a cooking operation of the third cooking apparatus 600.

Hereinafter, an example of the user interface 410 will be described.

The user interface 410 may be provided at a front surface of the first cooking apparatus 400, e.g., a front surface of the door 402, for convenience of user manipulation. In this case, the user interface 410 may be provided at an upper portion, a lower portion, or a side portion of the door 402. The user interface 410 may be installed at various other positions depending on a designer's choice.

Figure 16A:
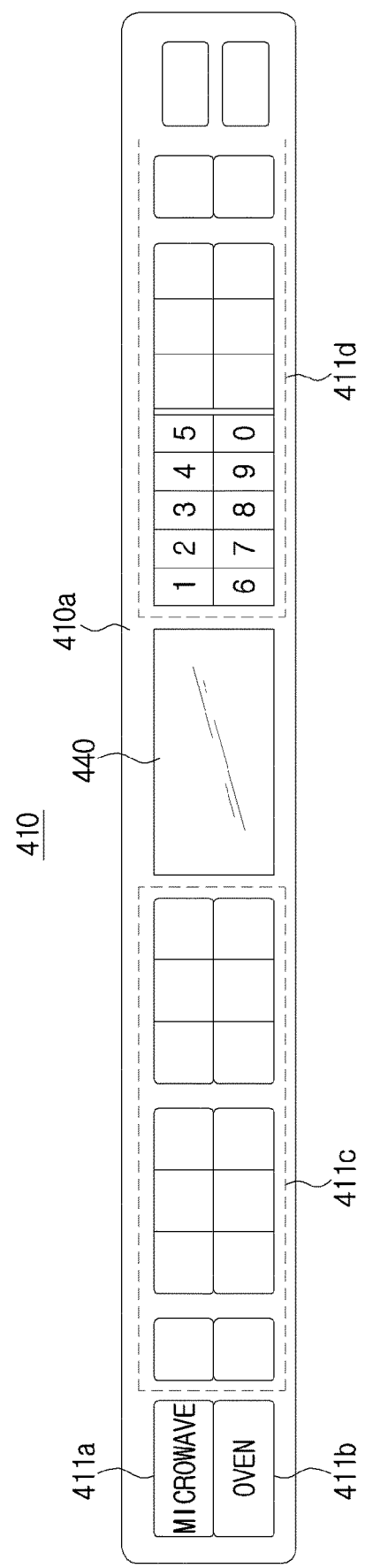
FIG. 16A is a view illustrating the user interface according to an embodiment of the present disclosure.

FIG. 16A is a view illustrating the user interface according to an embodiment of the present disclosure.

Referring to FIG. 16A, the user interface 410 may include a manipulation panel 410a having an inputter 411 including a plurality of input buttons 411a to 411d configured to receive various types of commands and a display 440 configured to display various types of information provided.

The plurality of input buttons 411a to 411d of the inputter 411 may include object selection buttons 411a and 411b for selecting an object to be controlled and command input buttons 411c and 411d for inputting various types of commands.

The object selection buttons 411a and 411b enable the command input buttons 411c and 411d to receive a command related to a specific object, e.g., one or more of the first cooking apparatus 400 and the second cooking apparatus 500, according to user manipulation. Consequently, the user interface 410 may be set to receive a command related to a particular cooking apparatus among the first cooking apparatus 400 and the second cooking apparatus 500 according to a user's choice. Specifically, the user interface 410 may be set to selectively receive a command related to the first cooking apparatus 400 or a command related to the second cooking apparatus 500.

According to an embodiment, the object selection buttons 411a and 411b may include a first cooking apparatus selection button 411a and a second cooking apparatus selection button 411b. When the command input buttons 411c and 411d are manipulated while the first cooking apparatus selection button 411a is selected, a command related to the first cooking apparatus 400 is input. Conversely, when the command input buttons 411c and 411d are manipulated while the second cooking apparatus selection button 411b is selected, a command related to the second cooking apparatus 500 may be input. Types, arrangement places, shapes, etc., of the object selection buttons 411a and 411b may be determined in various ways depending on a designer's choice.

The command input buttons 411c and 411d are provided to receive various types of commands related to one or more of the first cooking apparatus 400 and the second cooking apparatus 500 from the user. The command input buttons 411c and 411d are provided to receive various commands to start cooking, cancel cooking, stop cooking, and register or change a cooking time, a cooking mode, or various types of settings required for the first cooking apparatus 400 and the second cooking apparatus 500, for example. Here, the cooking mode refers to an operation of the first cooking apparatus 400 and the second cooking apparatus 500 programmed and defined in advance. A target temperature of a cooking compartment, a cooking time, an order of a plurality of operations, or the like may be defined in a single cooking mode. A plurality of command input buttons 411c and 411d may be provided at the manipulation panel 410a. Types, installation places, or shapes of the command input buttons 411c and 411d may be designed in various ways depending on a designer's choice.

Figure 16B:
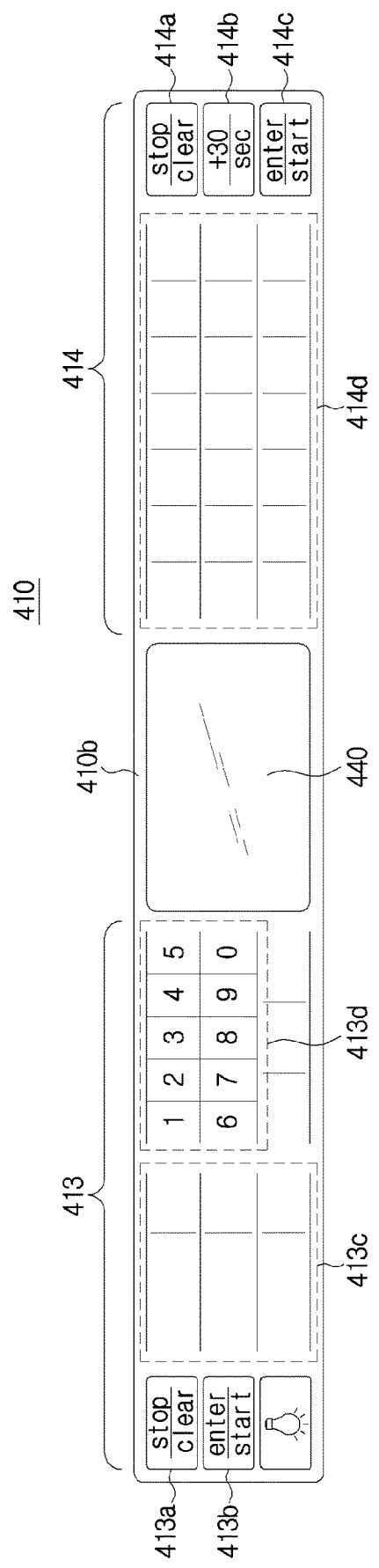
FIG. 16B is a view illustrating a user interface of the first cooking apparatus according to an embodiment of the present disclosure.

FIG. 16B is a view illustrating a user interface of the first cooking apparatus according to an embodiment of the present disclosure.

Referring to FIG. 16B, the user interface 410 may be realized using a manipulation panel 410b having a plurality of inputters 413 and 414 configured to receive various types of commands and the display 440 configured to display various types of information.

Among the plurality of inputters 413 and 414, a first inputter 413 includes a plurality of first input buttons 413a and 413b configured to receive a command related to the first cooking apparatus 400, and a second inputter 414 includes a plurality of second input buttons 414a and 414b configured to receive a command related to the second cooking apparatus 500.

The first inputter 413 is provided at a portion of the manipulation panel 410b to be able to receive a command related to the first cooking apparatus 400. The second inputter 414 is provided at another portion of the manipulation panel 410b to be able to receive a command related to the second cooking apparatus 500. The first inputter 413 and the second inputter 414 may be disposed at the manipulation panel 410b in various ways depending on a designer's choice. For example, the first inputter 413 and the second inputter 414 may be formed at the manipulation panel 410b to be disposed next to each other. In this case, the display 440 may be provided between the first inputter 413 and the second inputter 414. In addition, in another example, the first inputter 413 and the second inputter 414 may be disposed to be vertically parallel to each other. The first inputter 413 and the second inputter 414 may be disposed in various other forms that may be considered by a designer.

The first inputter 413 may include various buttons. For example, the first inputter 413 may include a start/stop button 413a configured to start or stop an operation of the first cooking apparatus 400, an enter button 413b configured to fix various types of input settings, a mode selection button 413c configured to select various types of operation modes that may be performed by the first cooking apparatus 400, and a number input button 413d configured to receive a number to input or change a cooking time of the first cooking apparatus 400. Some of the buttons may be omitted. The first inputter 413 may include various other types of buttons depending on a designer's choice.

The second inputter 414 may also include various buttons. For example, the second inputter 414 may be designed to include a start/stop button 414a configured to start or stop an operation of the second cooking apparatus 500, a time changing button 414b configured to increase a cooking time according to predefined settings, an enter button 414c configured to fix various types of input settings, and a mode selection button 414d configured to select various types of operation modes that may be performed by the second cooking apparatus 500. Some of the buttons may be omitted. The second inputter 414 may include various other types of buttons depending on a designer's choice.

The display 440 may be installed at the manipulation panels 410a and 410b together with the inputters 411 to 414. For example, the display 440 may be installed between the command input buttons 411c and 411d or between the first inputter 413 and the second inputter 414. The display 440 may also be installed at various other positions that may be considered by a designer.

The display 440 is provided to display a state of one or more of the first cooking apparatus 400 and the second cooking apparatus 500.

Figure 17A:
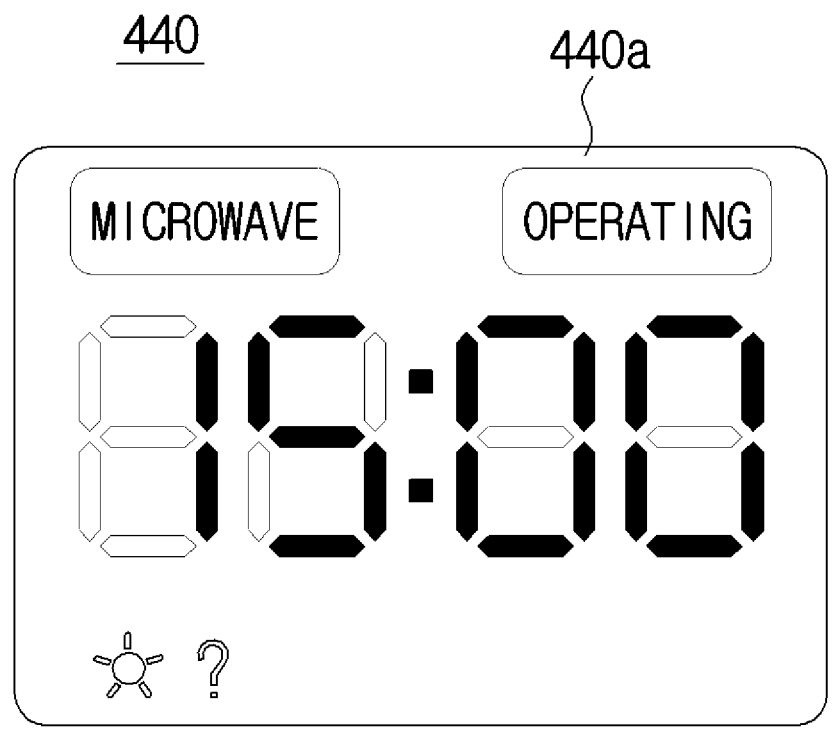
FIG. 17A is a first view illustrating an example of a display according to an embodiment of the present disclosure.
Figure 17B:
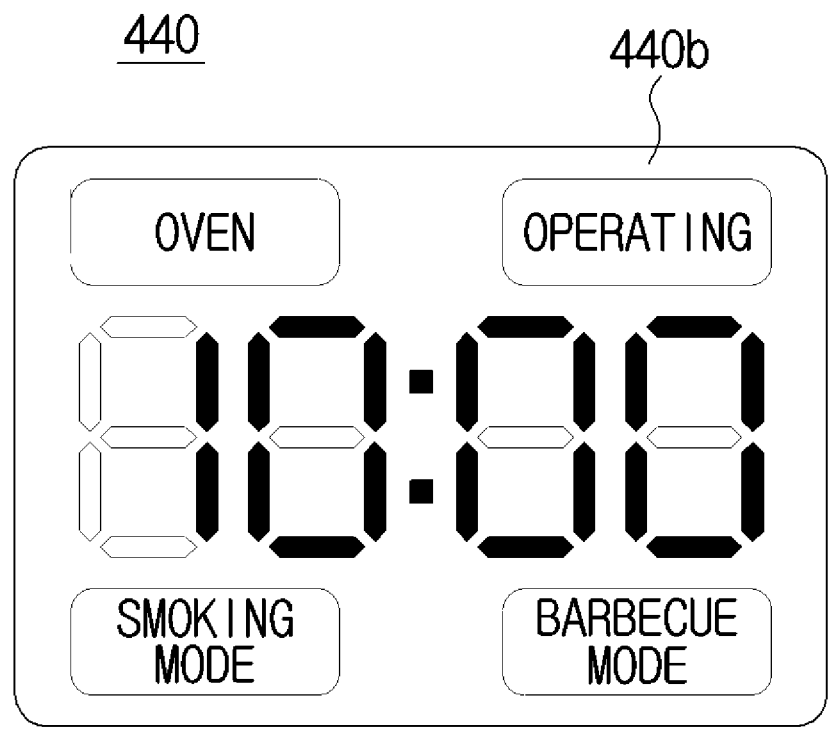
FIG. 17B is a second view illustrating the example of the display according to an embodiment of the present disclosure.

FIG. 17A is a first view illustrating an example of a display, and FIG. 17B is a second view illustrating the example of the display according to an embodiment of the present disclosure.

Referring to FIGS. 17A and 17B, the display 440 may be provided to display an operation of only a particular cooking apparatus among the first cooking apparatus 400 and the second cooking apparatus 500 at a specific time point. For example, the display 440 may display information on an operation or a state of the first cooking apparatus 400, e.g., a microwave oven at a first time point as illustrated in FIG. 17A (440a) and may display information on an operation or a state of the second cooking apparatus 500, e.g., an oven, at a second time point as illustrated in FIG. 17B (440b). Here, the information on an operation or a state of the microwave oven and the information on an operation or a state of the oven may include information such as whether the microwave oven and the oven are operating, an elapsed cooking time, a remaining cooking time, and a cooking mode.

According to an embodiment, the display 440 may display information on the first cooking apparatus 400 or information on the second cooking apparatus 500 according to a user manipulation. For example, when the object selection buttons 411a and 411b illustrated in FIG. 16A are manipulated, the display 440 may display information on the first cooking apparatus 400 or information on the second cooking apparatus 500 according to the manipulated object selection buttons 411a and 411b. In addition, according to an embodiment, the display 440 may display information on the first cooking apparatus 400 and information on the second cooking apparatus 500 according to predefined settings. For example, the display 440 may sequentially alternately display information on the first cooking apparatus 400 and information on the second cooking apparatus 500. In addition, according to an embodiment, the display 440 may also display information on only a currently-operating cooking apparatus among the first cooking apparatus 400 and the second cooking apparatus 500. In this case, when both of the first cooking apparatus 400 and the second cooking apparatus 500 are operating, the display 440 may selectively display information on any one of the first cooking apparatus 400 and the second cooking apparatus 500 according to a user's choice or predefined settings as described above. In addition, the display 440 may further display information on the third cooking apparatus 600.

Figure 17C:
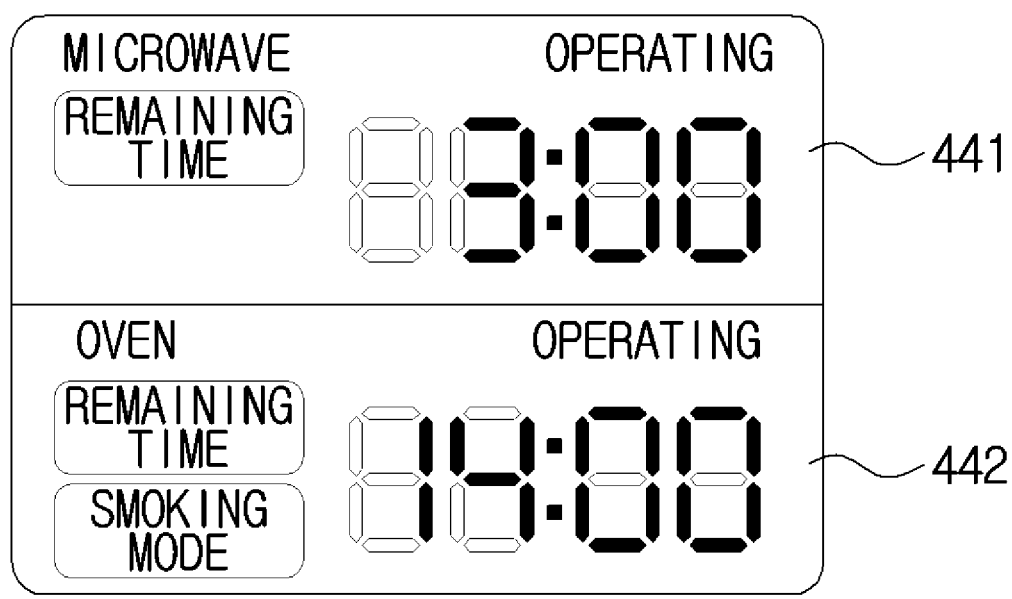
FIG. 17C is a view illustrating another example of the display according to an embodiment of the present disclosure.

FIG. 17C is a view illustrating another example of the display according to an embodiment of the present disclosure.

Referring to FIG. 17C, the display 440 may also simultaneously display information on the first cooking apparatus 400 and information on the second cooking apparatus 500. In this case, the display 440 may include a first display 441 configured to display information on an operation or a state of the first cooking apparatus 400 and a second display 442 configured to display information on an operation or a state of the second cooking apparatus 500, and each of the first display 441 and the second display 442 may independently display information on the first cooking apparatus 400 and information on the second cooking apparatus 500. According to an embodiment, content displayed by the first display 441 and the second display 442 may change according to a designer's choice or a user's choice or may be switched with each other according to a user's choice or predefined settings. In other words, the first display 441 and the second display 442 may be reset according to a user's choice or predefined settings so that the first display 441 displays information on the second cooking apparatus 500 and the second display 442 displays information on the first cooking apparatus 400.

The first display 441 and the second display 442 may be disposed in parallel to each other. In this case, the first display 441 may be disposed at an upper portion, and the second display 442 may be disposed below the first display 441. The first display 441 and the second display 442 may be realized using a single display panel or may be realized using separate display panels. The first display 441 and the second display 442 may be disposed and designed in various other ways that may be considered by a designer.

According to an embodiment, the display 440 may further include a third display (not illustrated) configured to display information on the third cooking apparatus 600. In addition, one or more of the first display 441 and the second display 442 may selectively display information on the third cooking apparatus 600.

Hereinafter, a flow of controlling the first cooking apparatus 400 will be described.

FIG. 18 is a view for describing a flow of controlling the first cooking apparatus according to an embodiment of the present disclosure. In FIG. 18, only elements required to describe controlling the first cooking apparatus are briefly illustrated.

Referring to FIG. 18, the first cooking apparatus 400 may include the controller 480, a first cooker 490, the fan driver 458a, the one or more suctioning fans 458b, the user interface 410, and a first communicator 420.

The controller 480 may be realized using a semiconductor chip and related parts installed at the door 402 or the electrical component compartment 409. The controller 480 may control the first cooker 490, the fan driver 458a, and the first communicator 420 according to a user manipulation using the user interface 410.

According to an embodiment, the first cooker 490 may include an oscillator 491, an amplifier 492, and the microwave emitter 493. The oscillator 491 may generate microwave alternating current (AC) power of a predetermined frequency. The microwave AC power may be transmitted to the amplifier 492 through a transmission line such as a conducting wire. The amplifier 492 amplifies the received microwave AC power and transmits the amplified microwave AC power to the microwave emitter 493. The microwave emitter 493 may include the power feeder 494 and the antenna 495. The power feeder 494 may supply microwave power to the antenna 495. The antenna 495 may emit microwaves of a predetermined frequency to the inner portion of the heating compartment 404 according to the supplied microwave power to heat a heating target.

When information on whether the third cooking apparatus 600 is operating is transmitted to the controller 480 through the first communicator 420, the controller 480 may apply power to the fan driver 458a based on the received information to operate the fan driver 458a. Accordingly, the one or more suctioning fans 458b may start rotating, and smoke generated due to cooking using the third cooking apparatus 600 may be introduced into the exhaust flow channel 454 through the suction port 453. According to an embodiment, the controller 480 may also apply power to the fan driver 458a when information on whether the second cooking apparatus 500 is operating is transmitted thereto.

In addition, when a command related to the second cooking apparatus 500 or a command related to the third cooking apparatus 600 is input through the user interface 410, the controller 480 may apply power to the fan driver 458a to operate the fan driver 458a in response to the input command, thereby enabling smoke generated due to cooking using the third cooking apparatus 600 to be introduced into the exhaust flow channel 454 through the suction port 453. In other words, the controller 480 may predict that the second cooking apparatus 500 or the third cooking apparatus 600 will operate according to manipulation of the user interface 410 and operate the fan driver 458a even when information on an operation of the second cooking apparatus 500 or the third cooking apparatus 600 is not received.

In addition, the controller 480 may also apply power to the fan driver 458a according to a result sensed by the first sensor 470, a result sensed by a second sensor 569 provided in the second cooking apparatus 500, or a result sensed by a third sensor (not illustrated) provided in the third cooking apparatus 600 to operate the fan driver 458a. Accordingly, smoke generated due to cooking using the third cooking apparatus 600 may be introduced into the exhaust flow channel 454 through the suction port 453.

When a user command related to the second cooking apparatus 500 is input through the user interface 410, the controller 480 may generate a control signal corresponding to the input user command and transmit the generated control signal to the first communicator 420. The first communicator 420 may transmit the received control signal to a corresponding cooking apparatus, e.g., the second cooking apparatus 500. When the user interface 410 is able to receive a user command related to the third cooking apparatus 600, the controller 480 may transmit a control signal related to the third cooking apparatus 600 to the third cooking apparatus 600 through the first communicator 420.

In addition, the controller 480 may also control the user interface 410. For example, the controller 480 may control the display 440 of the user interface 410 to display information on the first cooking apparatus 400 or the second cooking apparatus 500. In addition, the controller 480 may also control the display 440 to display information on the third cooking apparatus 600.

In addition, the controller 480 may determine which cooking apparatus a user command input through the user interface 410 corresponds to. For example, when the first cooking apparatus selection button 411a is manipulated, the controller 480 may deem that a user command input through the inputter 411 is a user command related to the first cooking apparatus 400 and control the first cooker 490 as a result. In addition, in another example, when the second cooking apparatus selection button 411b is manipulated, the controller 480 may deem that a user command input through the inputter 411 is a user command related to the second cooking apparatus 500 and transmit a control signal to the second cooking apparatus 500 through the first communicator 420.

Hereinafter, an example in which the second cooking apparatus 500 is an oven will be described. An oven that will be described below may be a gas oven or an electric oven.

Figure 19:
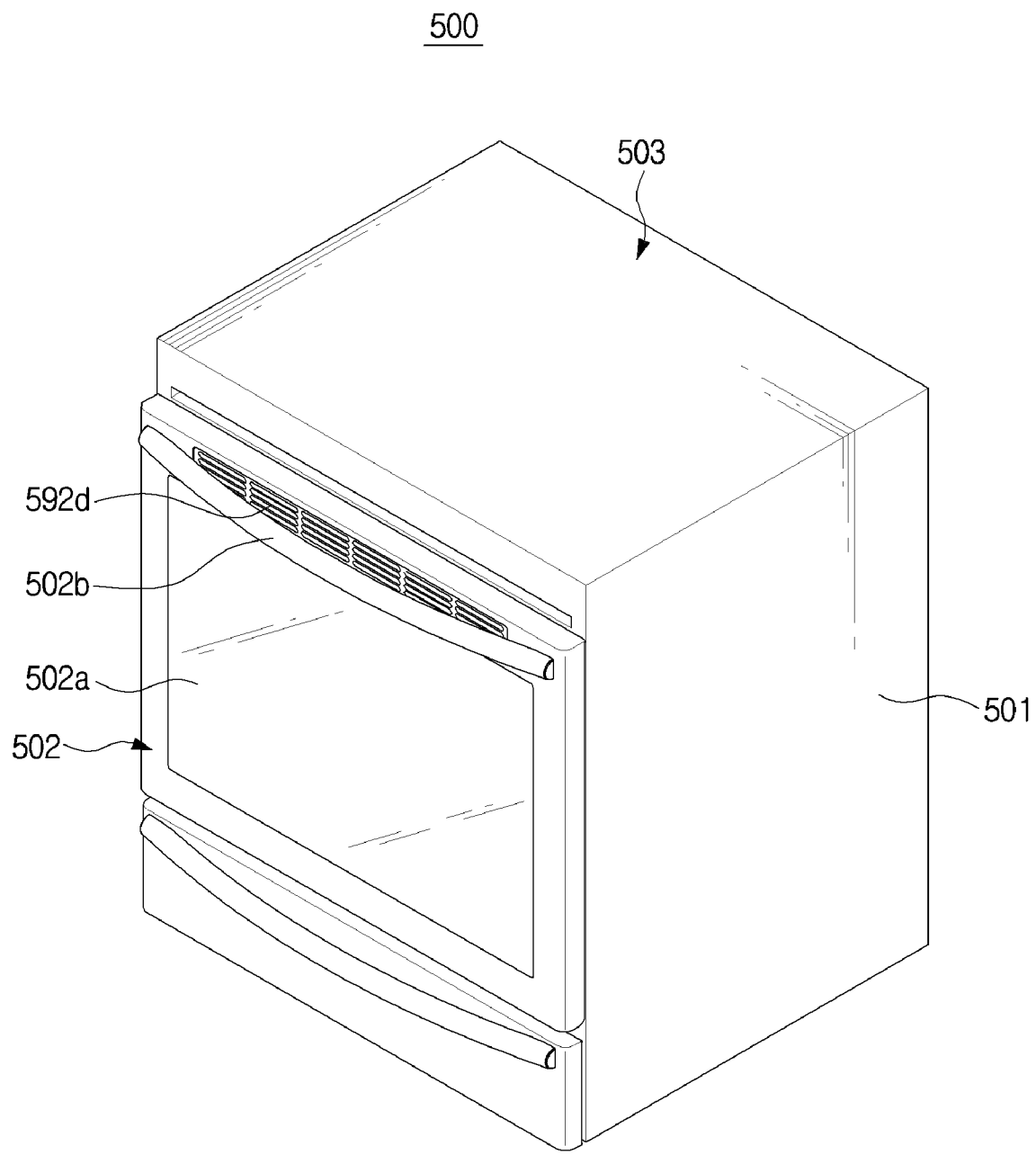
FIG. 19 is a perspective view of the second cooking apparatus according to an embodiment of the present disclosure.

FIG. 19 is a perspective view of the second cooking apparatus according to an embodiment according to an embodiment of the present disclosure.

Figure 20:
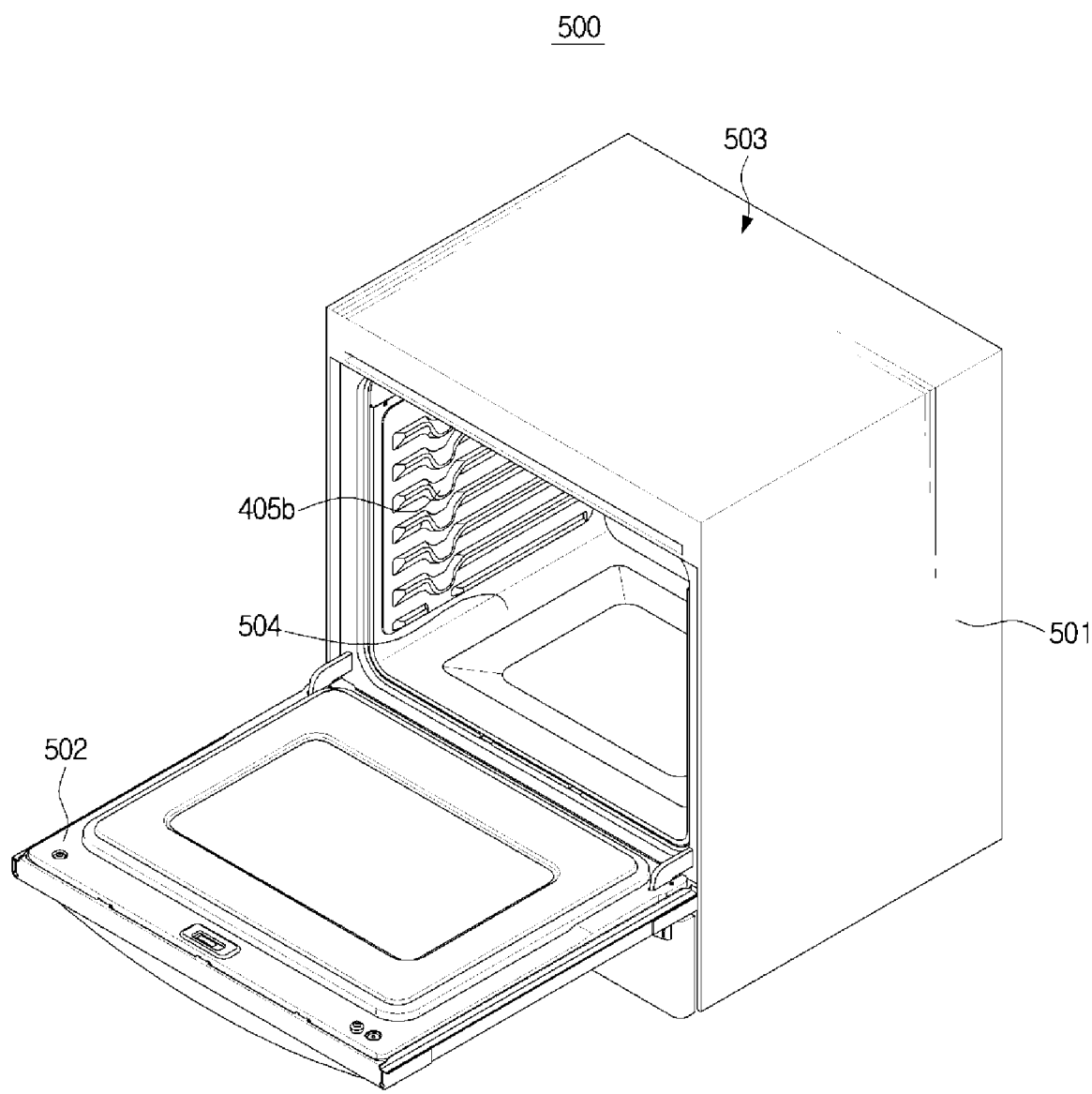
FIG. 20 is a view illustrating a state in which a door of the second cooking apparatus is open according to an embodiment of the present disclosure.

FIG. 20 is a view illustrating a state in which a door of the second cooking apparatus is open according to an embodiment of the present disclosure.

Figure 21:
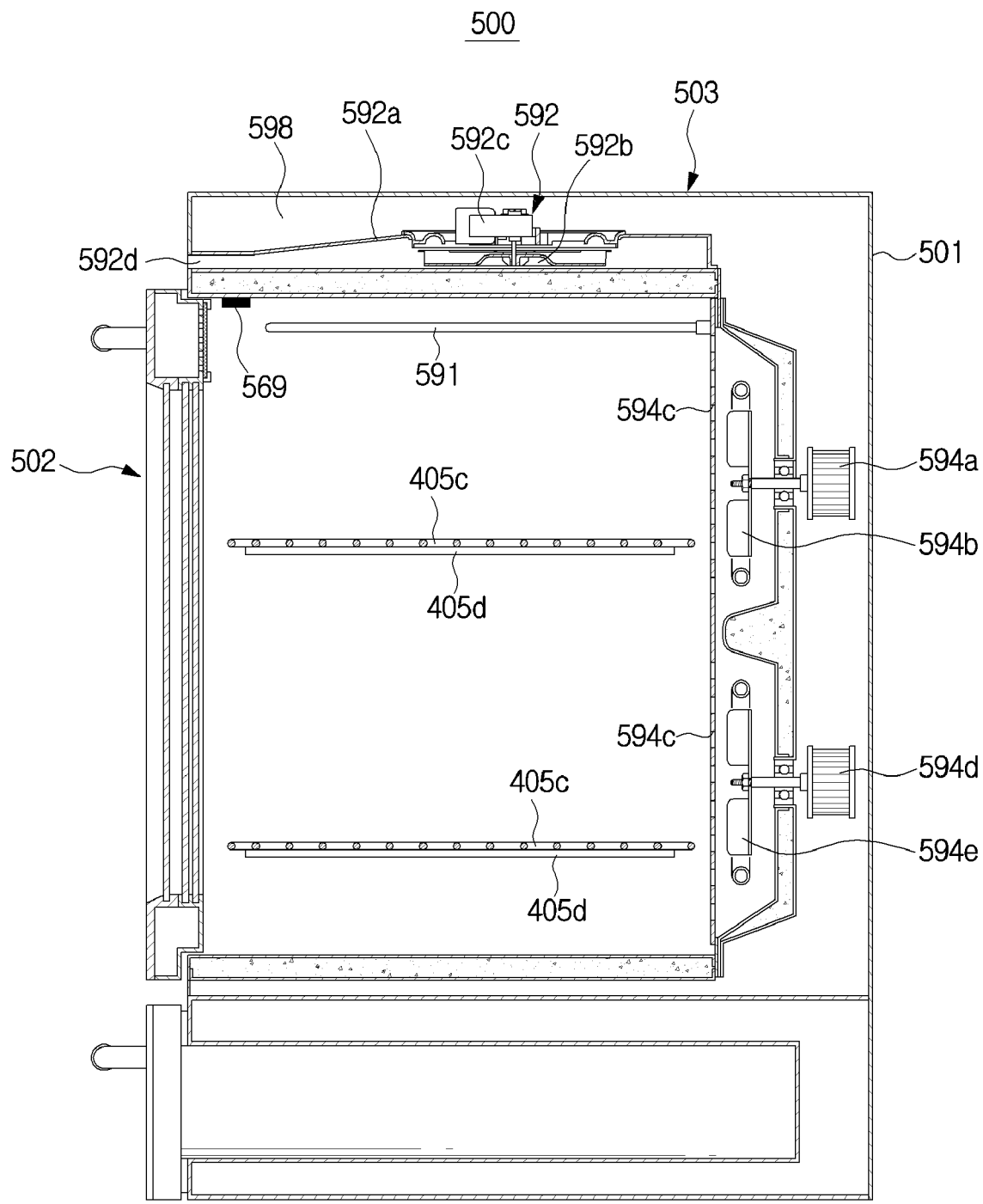
FIG. 21 is a lateral view of the second cooking apparatus according to an embodiment of the present disclosure.

FIG. 21 is a lateral view of the second cooking apparatus according to an embodiment of the present disclosure.

Referring to FIGS. 19, 20, and 21, the second cooking apparatus 500, which is an oven, may include an exterior housing 501, a door 502 provided at a front surface of the exterior housing 501 to be openable and closable, and a heating compartment 504 exposed to the outside according to the opening and closing of the door 502 and configured to heat a heating target according to an embodiment.

The exterior housing 501 forms an exterior of the second cooking apparatus 500, has a space required for cooking such as the heating compartment 504 or an electrical component compartment 598, formed therein, and also has various types of parts required for cooking embedded therein. The exterior housing 501 may have various shapes depending on a designer's choice.

The third cooking apparatus 600 may be installed at an upper surface 503 of the exterior housing 501. For example, a fastening groove at which the third cooking apparatus 600 may be installed may be provided at the upper surface 503 of the exterior housing 501. According to an embodiment, the second cooking apparatus 500 and the third cooking apparatus 600 may be integrally formed. In this case, the exterior housing 501 of the second cooking apparatus 500 and an exterior housing 601 of the third cooking apparatus 600 may be integrally formed as illustrated in FIG. 8.

The door 502 is connected to the exterior housing 501 to be openable and closable. For example, the door 502 may be coupled to the exterior housing 501 to be rotatable about a predetermined axis using an opening-and-closing means such as a hinge. According to an embodiment, the door 502 may include a transmission window 502a configured to transmit all light or some light to make an inside of the heating compartment 504 visible to the user, and a handle 502b configured to be gripped by the user when opening and closing the door 502.

The heating compartment 504 is formed such that an opening is provided at a front surface thereof to put in or take out a heating target therethrough. The door 502 is provided at an open front surface of the heating compartment 504 to be openable and closable. One or more supports 405b and 405d may be provided at sidewalls facing each other inside the heating compartment 504 to correspond to each other to form a pair. Trays 405a and 405c having a heating target placed thereon may be mounted on the one or more supports 405b and 405d forming the pair. A plurality of supports 405b and 405d may be provided at a single sidewall, and a space inside the heating compartment 504 may be divided into a plurality of sections by the trays 405a and 405c mounted on the supports 405b and 405d, respectively.

A heater 591 configured to provide heat to an inner space of the heating compartment 504 may be provided at a top surface or one or more sidewalls of the heating compartment 504. The heater 591 may be heated due to a current being applied thereto and may generate heat to provide the heat to the inner space of the heating compartment 504, or may burn gas provided thereto to provide heat to the inner space of the heating compartment 504. Accordingly, heat is applied to a heating target disposed inside the heating compartment 504.

A circulation passage 594c through which air inside the heating compartment 504 flows may be provided at a sidewall of a rear surface or a side surface of the heating compartment 504, and the circulation passage 594c may include one or more outlet ports through which air is discharged to the inner portion of the heating compartment 504 and one or more inlet ports through which the air inside the heating compartment 504 is introduced into the circulation passage 594c. One or more fans 594b and 594e and one or more motors 594a and 594d configured to rotate the one or more fans 594b and 594e may be provided behind the circulation passage 594c. The one or more fans 594b and 594e rotate according to operation of the motors 594a and 594d, and air introduced through the one or more inlet ports is emitted to the inner portion of the heating compartment 504 again through the one or more outlet ports due to the rotation of the one or more fans 594b and 594e. Accordingly, air inside the heating compartment 504 is able to circulate.

The second cooking apparatus 500 may include the second sensor 569 configured to determine whether the second cooking apparatus 500 is operating or an operation state thereof. For example, the second sensor 569 may be installed inside the heating compartment 504 to sense a temperature of the air inside the heating compartment 504 to sense whether the second cooking apparatus 500 is operating or an operation state thereof. In this case, the second sensor 569 may be a temperature sensor. The second sensor 569 may also sense a current applied to the heater 591 to sense whether the second cooking apparatus 500 is operating.

The electrical component compartment 598 may be formed inside the exterior housing 501. For example, the electrical component compartment 598 may be disposed above, beside, or behind the heating compartment 504. A communication module configured to serve as a second communicator 520, various types of conducting wires, a circuit such as a switch, related substrates, and the like may be installed inside the electrical component compartment 598. Since the second cooking apparatus 500 operates according to a control signal transmitted from the first cooking apparatus 400, parts related to a controller for controlling the second cooking apparatus 500, e.g., a semiconductor chip and a substrate for realizing the controller, may not be installed inside the electrical component compartment 598. In addition, a cooler 592 configured to lower a temperature inside the heating compartment 504 may also be installed inside the electrical component compartment 598. The cooler 592 may enable air inside the electrical component compartment 598 to be discharged to the outside through a discharge port 592d formed at a front portion of the exterior housing 501. The cooler 592 may include an exhaust duct 592a configured to form an air flow channel so that suctioned air is exhausted toward a front of a main body, a cooling fan 592b configured to suction air in the electrical component compartment 598 to exhaust the air toward a front of the exterior housing 501 through the discharge port 592d, and a motor 592c configured to drive the cooling fan.

Hereinafter, a flow of controlling the second cooking apparatus 500 will be described.

Figure 22:
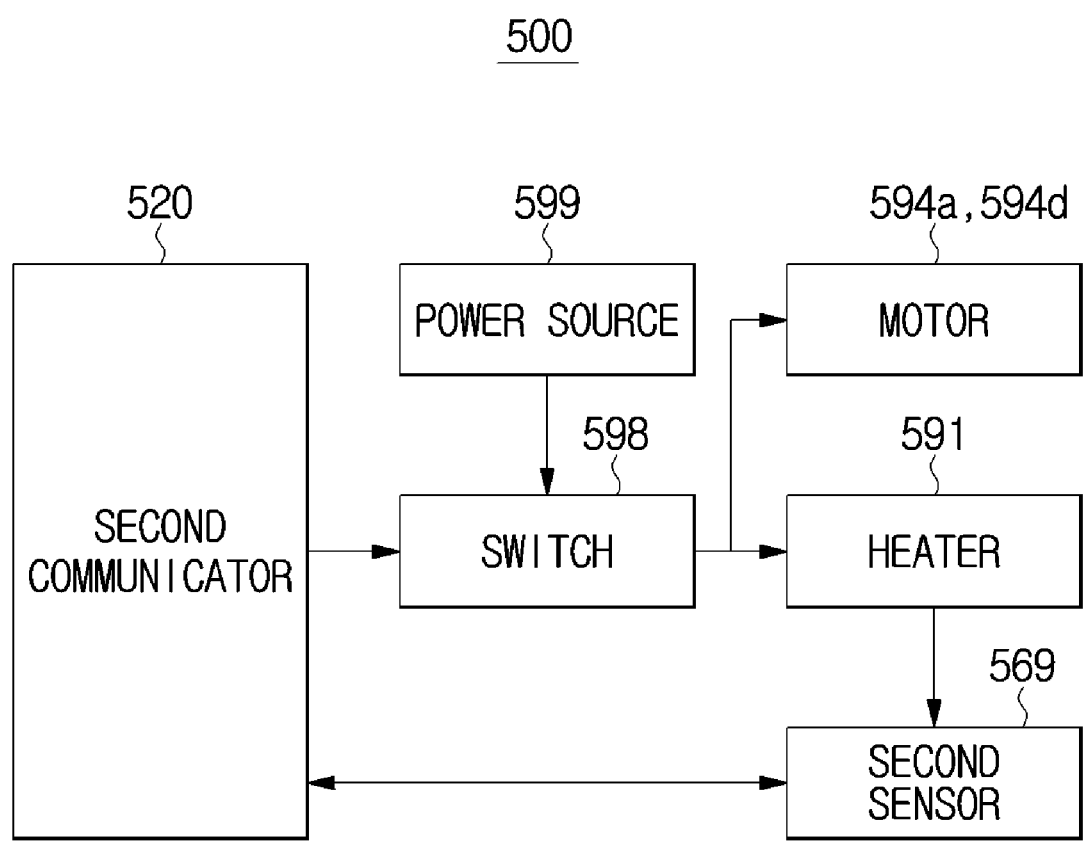
FIG. 22 is a view for describing a flow of controlling the second cooking apparatus of the present disclosure.

FIG. 22 is a view for describing a flow of controlling the second cooking apparatus according to an embodiment of the present disclosure. In FIG. 22, only elements required to describe controlling the second cooking apparatus are briefly illustrated.

Referring to FIG. 22, the second cooking apparatus 500 may include the second communicator 520, the second sensor 569, the heater 591, the motors 594a and 594d, a switch 598, and a power source 599.

The second communicator 520 may transmit a control signal transmitted from the first communicator 420 of the first cooking apparatus 400 to the switch 598 or transmit a signal sensed by the second sensor 569 to the first communicator 420 of the first cooking apparatus 400 through wired and wireless communication networks.

The switch 598 may connect one or more of the power source 599, the heater 591, and the motors 594a and 594d according to the control signal transmitted from the second communicator 520 to enable a current supplied by the power source 599 to be applied to the heater 591 and the motors 594a and 594d. Accordingly, the heater 591 generates heat or the motors 594a and 594d operate such that the inner space of the heating compartment 504 is heated and a heating target is cooked by the heat being applied thereto.

The second sensor 569 senses whether the heater 591 is operating or a temperature inside the heating compartment 504 and outputs an electrical signal related to a sensed result. The output electrical signal is transmitted to the second communicator 520, and the second communicator 520 transmits the received electrical signal to the first communicator 420 of the first cooking apparatus 400. The first cooking apparatus 400 may display a state of the second cooking apparatus 500, e.g., whether the second cooking apparatus 500 is normally operating or the temperature inside the heating compartment 504, on the display 440 based on the received electrical signal.

The second cooking apparatus 500 may not include a controller configured to control an overall operation of the second cooking apparatus 500 as illustrated in FIG. 22, and a function of controlling the second cooking apparatus 500 may be performed by the controller 480 of the first cooking apparatus 400.

Hereinafter, the third cooking apparatus 600 according to various embodiments will be described with reference to FIGS. 23-28, 29A-29B, and 30-40.

Figure 23:
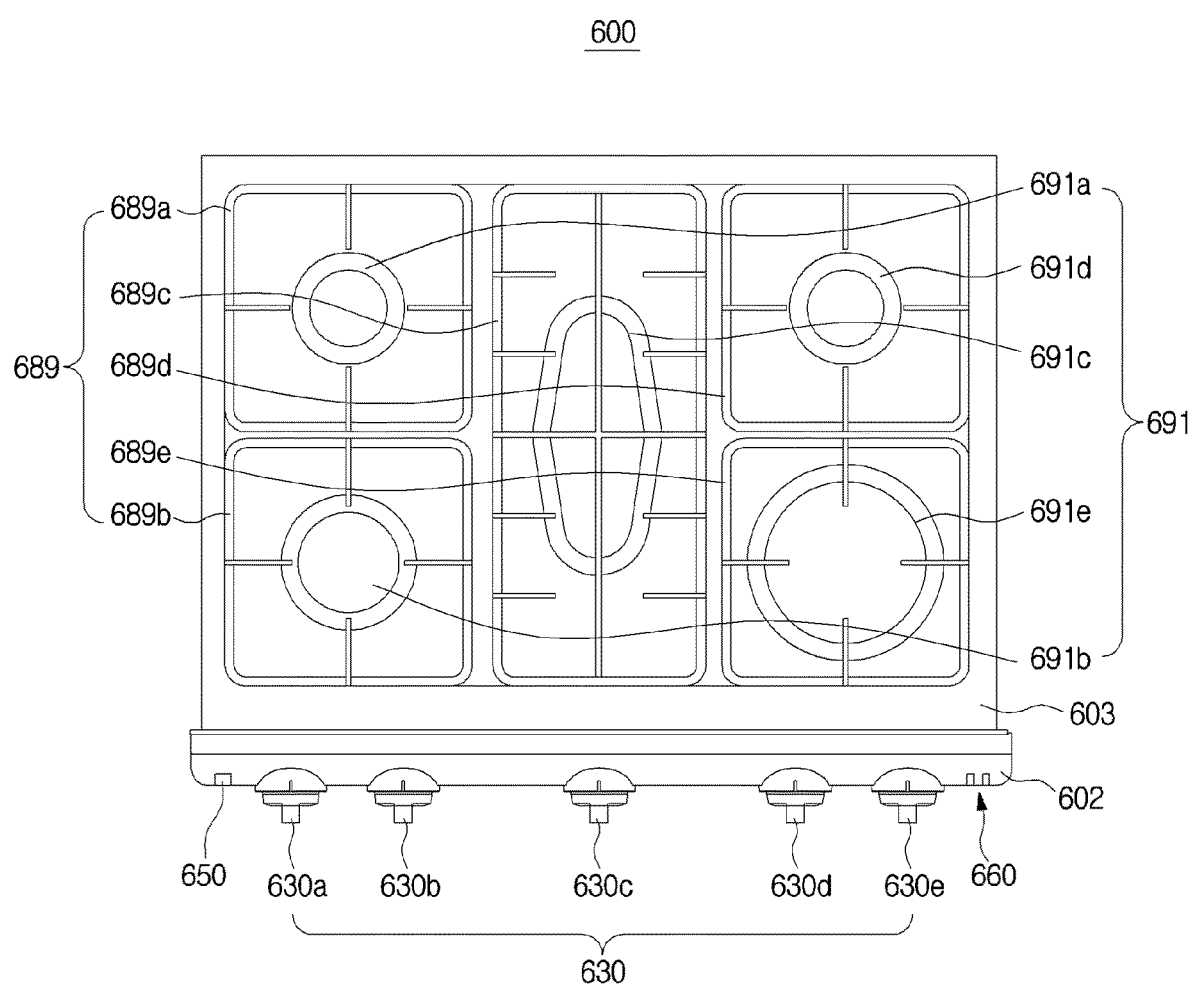
FIG. 23 is a plan view of the third cooking apparatus according to an embodiment of the present disclosure.

FIG. 23 is a plan view of the third cooking apparatus according to an embodiment of the present disclosure.

Figure 24:
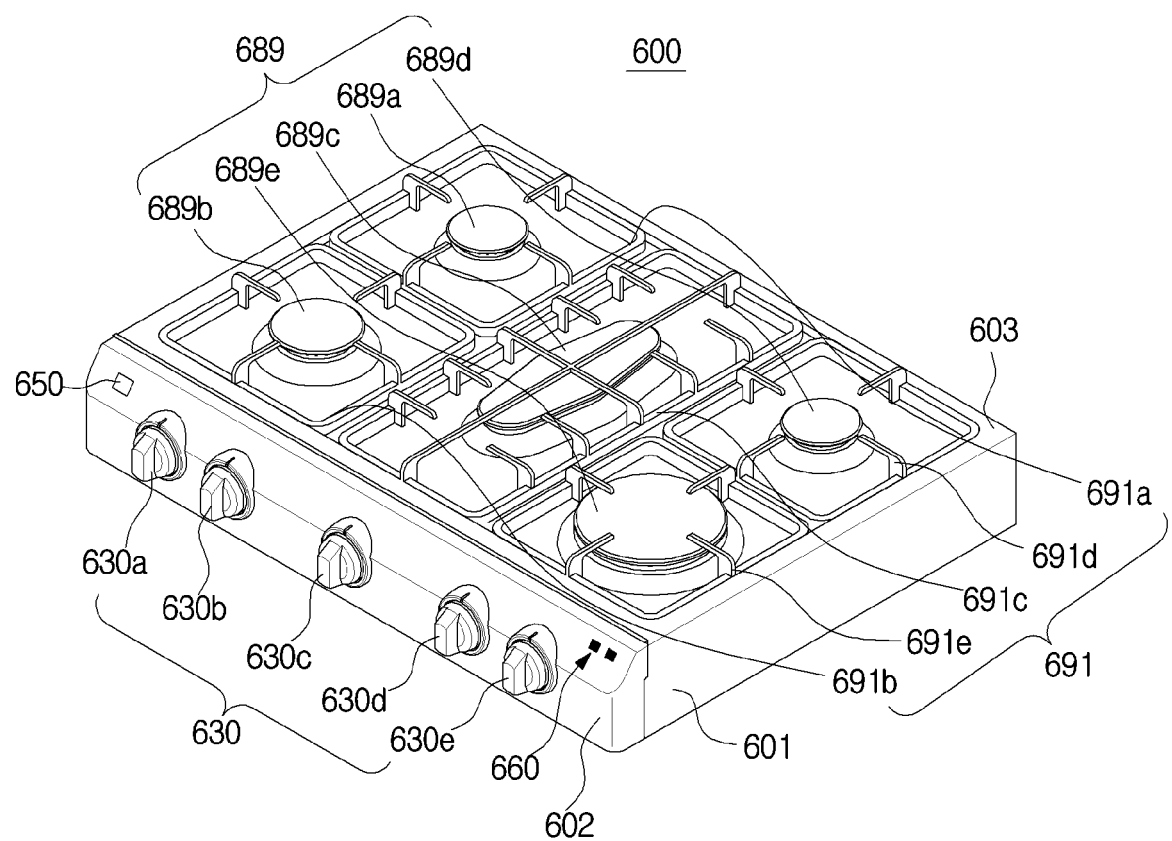
FIG. 24 is a perspective view of the third cooking apparatus according to an embodiment of the present disclosure.

FIG. 24 is a perspective view of the third cooking apparatus according to an embodiment of the present disclosure.

The third cooking apparatus 600 is provided to heat and cook a cooking target using one or more heat sources. In this case, the third cooking apparatus 600 may supply heat generated by the one or more heat sources to a bottom surface of a container holding a cooking target or may directly supply heat to the cooking target to heat and cook the cooking target.

Referring to FIGS. 23 and 24, the third cooking apparatus 600 may be a gas stove, for example. In this case, the third cooking apparatus 600 may include the exterior housing 601 configured to form an exterior, one or more burners 691 formed at an upper surface 603 of the exterior housing 601 to serve as heat sources, and one or more ignition switches 630 configured to ignite the one or more burners 691 which are heat sources.

A plurality of ignition switches 630 may be provided at a single third cooking apparatus 600. For example, a first ignition switch 630a to a fifth ignition switch 630e may be provided at the single third cooking apparatus 600. The ignition switches 630a to 630e are provided to correspond to burners 691a to 691e, respectively. In other words, when a first gripping portion 631 of the first ignition switch 630a is rotated and manipulated, the first burner 691a corresponding to the first ignition switch 630a is ignited and jets flames.

The burner 691 is provided to be able to jet flames, and a container seated on a container mount 689 may be heated from a bottom surface thereof by the flames jetted from the burner 691. When a plurality of burners 691a to 691e are provided, predetermined container mounts 689a to 689e may be respectively formed near the burners 691a to 691e for each of the burners 691a to 691e. Accordingly, the user may more safely perform cooking.

According to an embodiment, a stop command inputter 650 may be provided at a front surface 602 of the exterior housing 601. When the stop command inputter 650 is manipulated, the second cooking apparatus 500 is set to temporarily interrupt or non-temporarily stop an operation, e.g., an operation of providing heat to the inner portion of the heating compartment 504. The stop command inputter 650 may be realized using, for example, various types of input devices such as a physical button and a touch sensor.

In addition, an operation state display 660 may be provided at the front surface 602 of the exterior housing 601. The operation state display 660 may be designed to display an operation state of the second cooking apparatus 500. Specifically, the operation state display 660 may be realized using a lighting device such as an LED lamp and a fluorescent lamp, and the lighting device may not emit any light when the second cooking apparatus 500 is not operating and may emit light when the second cooking apparatus 500 is operating. In this case, when the second cooking apparatus 500 is normally operating, an abnormality has occurred, or any other situation that the user should be notified of has occurred, the lighting device may emit light of a color corresponding to each circumstance.

Hereinafter, the ignition switch assembly 700 and a gas supply assembly 800 provided at the third cooking apparatus 600 will be described in more detail.

Figure 25:
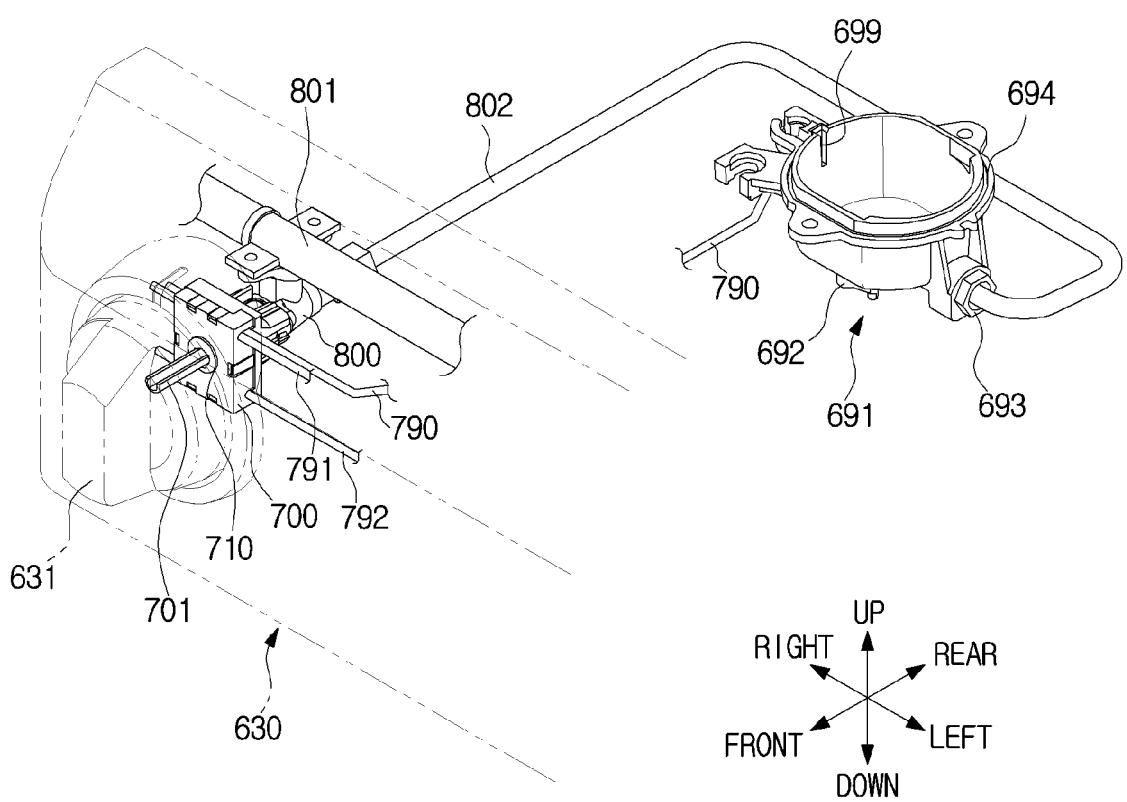
FIG. 25 is a view for describing an ignition switch assembly and a gas supply assembly provided at the third cooking apparatus according to an embodiment of the present disclosure.

FIG. 25 is a view for describing an ignition switch assembly and a gas supply assembly provided at the third cooking apparatus according to an embodiment of the present disclosure.

Referring to FIG. 25, the ignition switch 630 of the third cooking apparatus 600 may include the first gripping portion 631, the ignition switch assembly 700, and the gas supply assembly 800. The burner 691, which is a heat source, is ignited according to an operation of the ignition switch 630.

The first gripping portion 631 is exposed to the front surface 602 of the exterior housing 601 and is formed to be rotatable according to a user manipulation. The first gripping portion 631 may be detachably coupled to a rotating shaft member 701, and the rotating shaft member 701 may rotate due to the rotation of the first gripping portion 631. Accordingly, a cam member 710 (refer to FIG. 27) coupled to the rotating shaft member 701 may rotate.

The ignition switch assembly 700 may output an electrical signal according to the rotation of the first gripping portion 631 and transmit the output electrical signal to an ignition plug 699 provided at the burner 691. The ignition plug 699 generates a spark according to the received electrical signal to ignite the burner 691. The ignition switch manipulation sensor 730 (refer to FIG. 27) may be installed at the ignition switch assembly 700.

One or more conducting wires 790 to 792 may be installed at the ignition switch assembly 700. The one or more conducting wires 790 to 792 may include a first conducting wire 790 connected to the ignition plug 699 to transmit an electrical signal generated by the ignition switch assembly 700 to the ignition plug 699, and a second conducting wire 791 and a third conducting wire 792 configured to transmit an electrical signal related to whether an ignition switch has been manipulated to a third communicator 620 (refer to FIG. 34) of the third cooking apparatus 600. One of the second conducting wire 791 and the third conducting wire 792 may be electrically connected to the third communicator 620 of the third cooking apparatus 600 to transmit an electrical signal output by the ignition switch manipulation sensor 730 installed at the ignition switch assembly 700 to the third communicator 620. The other one of the second conducting wire 791 and the third conducting wire 792 may be connected to a power source configured to supply power and supply a current to the ignition switch manipulation sensor 730.

The gas supply assembly 800 enables combustion gas to flow to a second gas pipe 802 connected to the burner 691 according to the rotation of the first gripping portion 631 to enable the combustion gas to be provided to the burner 691. Specifically, the gas supply assembly 800 connects a first gas pipe 801 through which combustion gas is introduced to the second gas pipe 802, which has one end connected to the burner 691, according to the rotation of the first gripping portion 631 to enable combustion gas provided from the outside to the first gas pipe 801 to flow to the second gas pipe 802.

One or more gas discharge holes (not illustrated) may be installed at a side surface of the first gas pipe 801, and the one or more gas discharge holes may be connected to a gas suction hole 811 (refer to FIG. 26) provided at the top of the gas supply assembly 800 to enable the combustion gas supplied from the first gas pipe 801 to enter the gas supply assembly 800.

The second gas pipe 802 may have one end connected to a gas discharge hole 821 (refer to FIG. 26) of the gas supply assembly 800 to enable combustion gas discharged through the gas discharge hole 821 to flow therethrough and the other end connected to a gas inlet 693 of the burner 691 to enable the flowing combustion gas to be supplied to the burner 691.

The burner 691 may include a body 692, the gas inlet 693 provided at a portion of the body 692 to be coupled to the other end of the second gas pipe 802, a combustor 694 in which gas introduced through the gas inlet 693 is burned, and the ignition plug 699 configured to generate a spark to ignite combustion gas supplied through the gas inlet 693. The combustion gas is provided to the burner 691 according to an operation of the ignition switch 630, and the burner 691 is ignited due to a spark being generated. Accordingly, heat may be applied to the bottom surface of the container seated on the container mount 689 of the third cooking apparatus 600.

Hereinafter, the ignition switch assembly 700 and the gas supply assembly 800 will be described in more detail.

FIG. 26 is a view illustrating an example in which the ignition switch assembly and the gas supply assembly are coupled according to an embodiment of the present disclosure.

Figure 27:
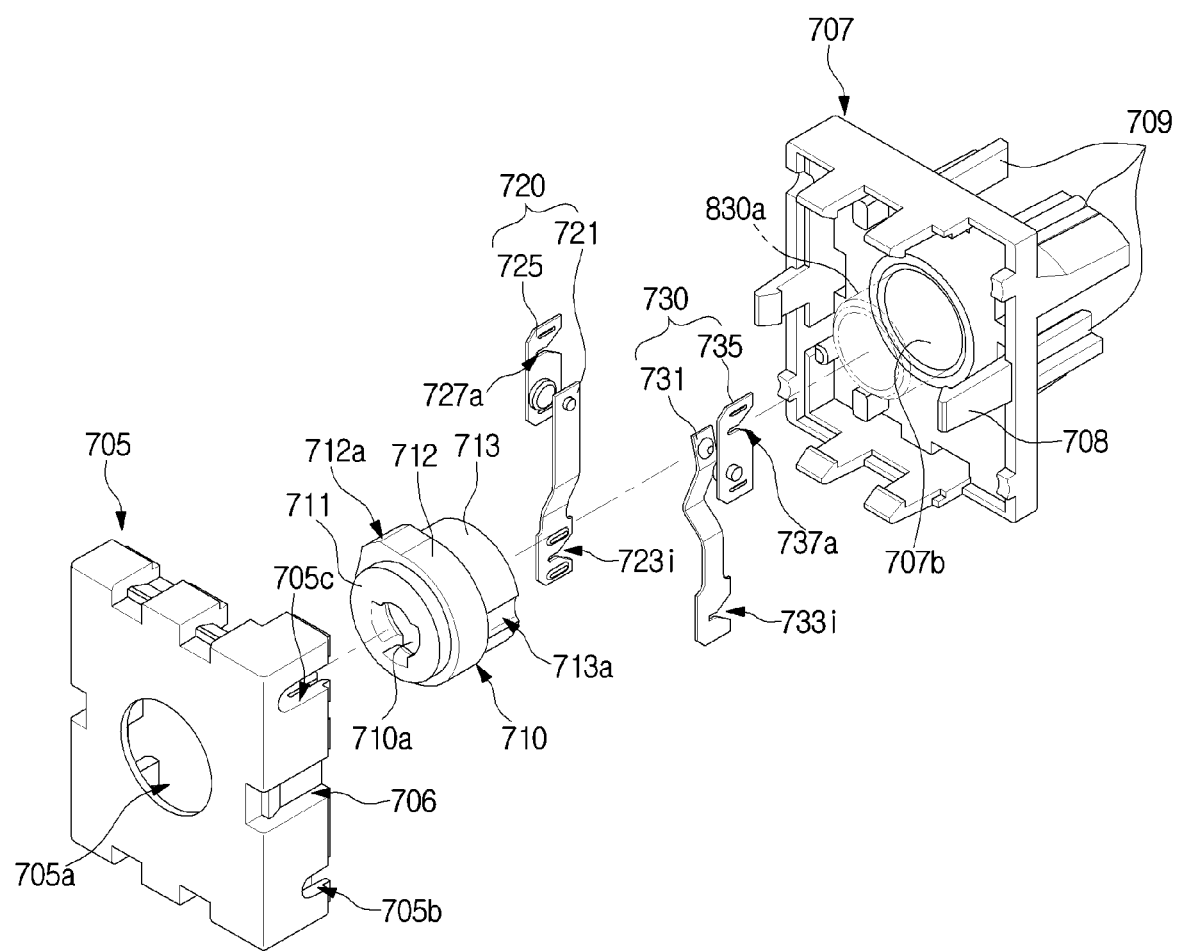
FIG. 27 is an exploded perspective view of the ignition switch assembly including the ignition switch and an ignition switch manipulation sensor of the third cooking apparatus according to an embodiment of the present disclosure.

FIG. 27 is an exploded perspective view of the ignition switch assembly including the ignition switch and an ignition switch manipulation sensor of the third cooking apparatus according to an embodiment of the present disclosure.

Figure 28:
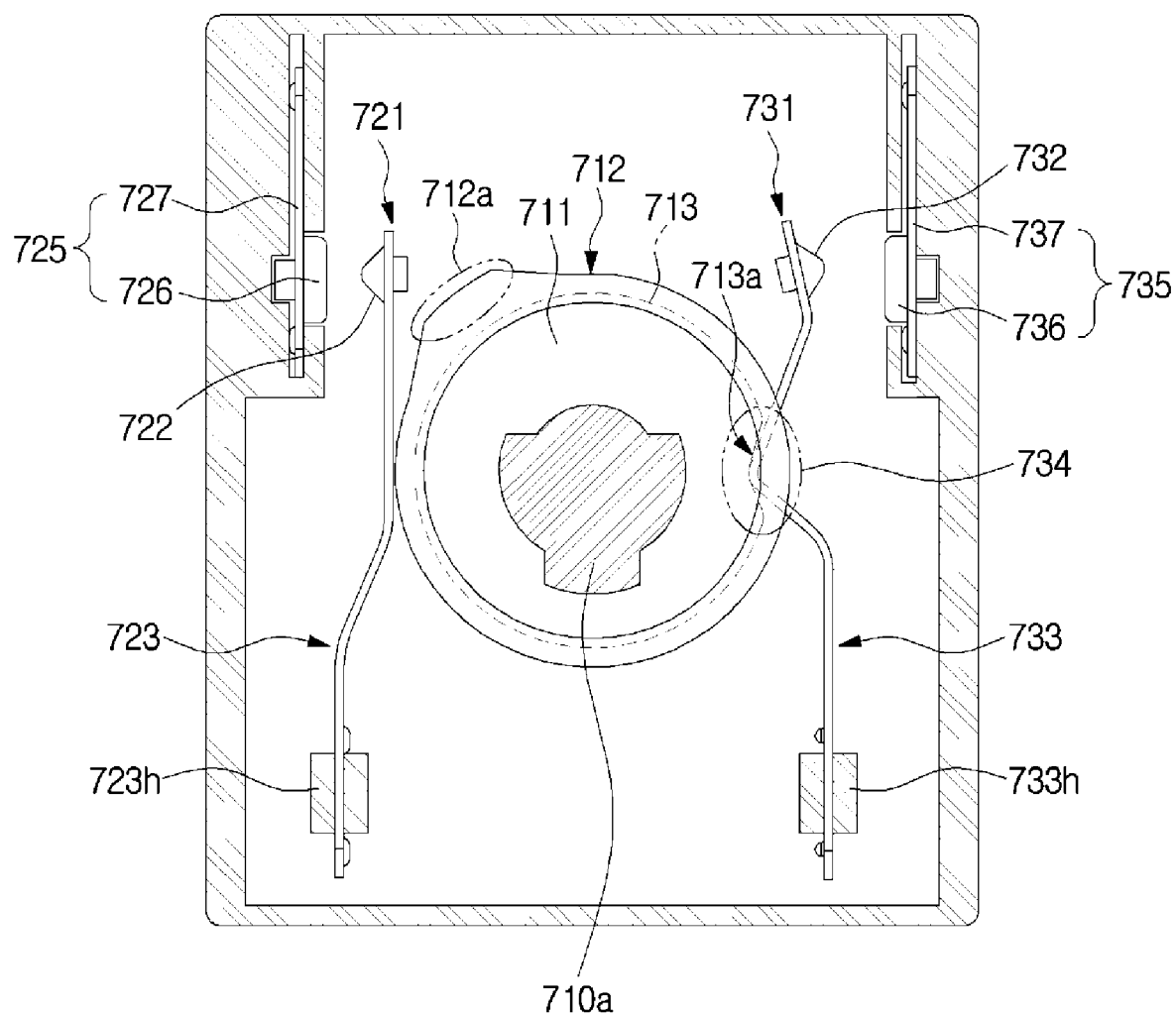
FIG. 28 is a cross-sectional view of the ignition switch assembly according to an embodiment of the present disclosure.

FIG. 28 is a cross-sectional view of the ignition switch assembly according to an embodiment of the present disclosure.

Figure 29A:
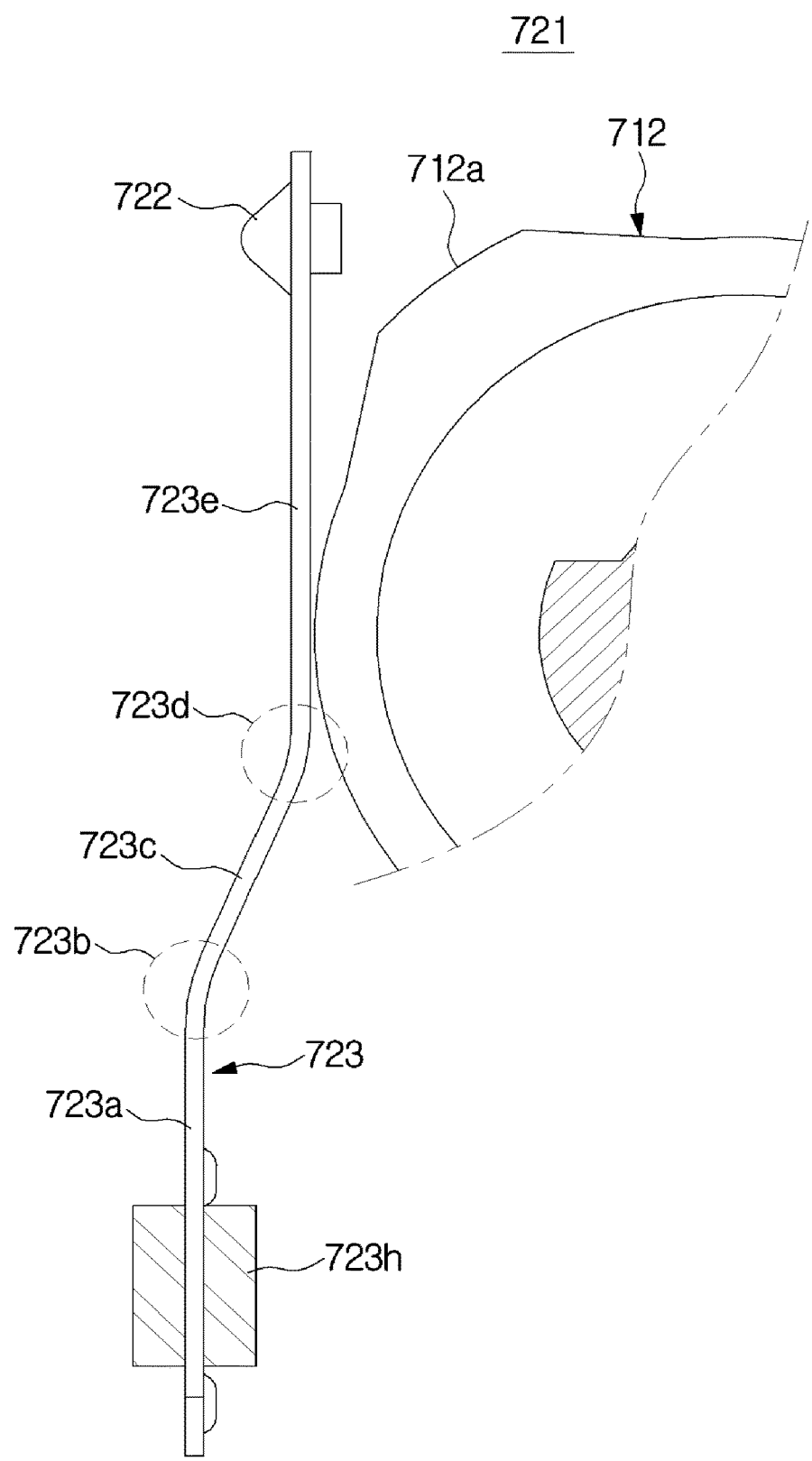
FIG. 29A is a view illustrating an ignition plug signal generator according to an embodiment of the present disclosure.

FIG. 29A is a view illustrating an ignition plug signal generator according to an embodiment of the present disclosure.

Figure 29B:
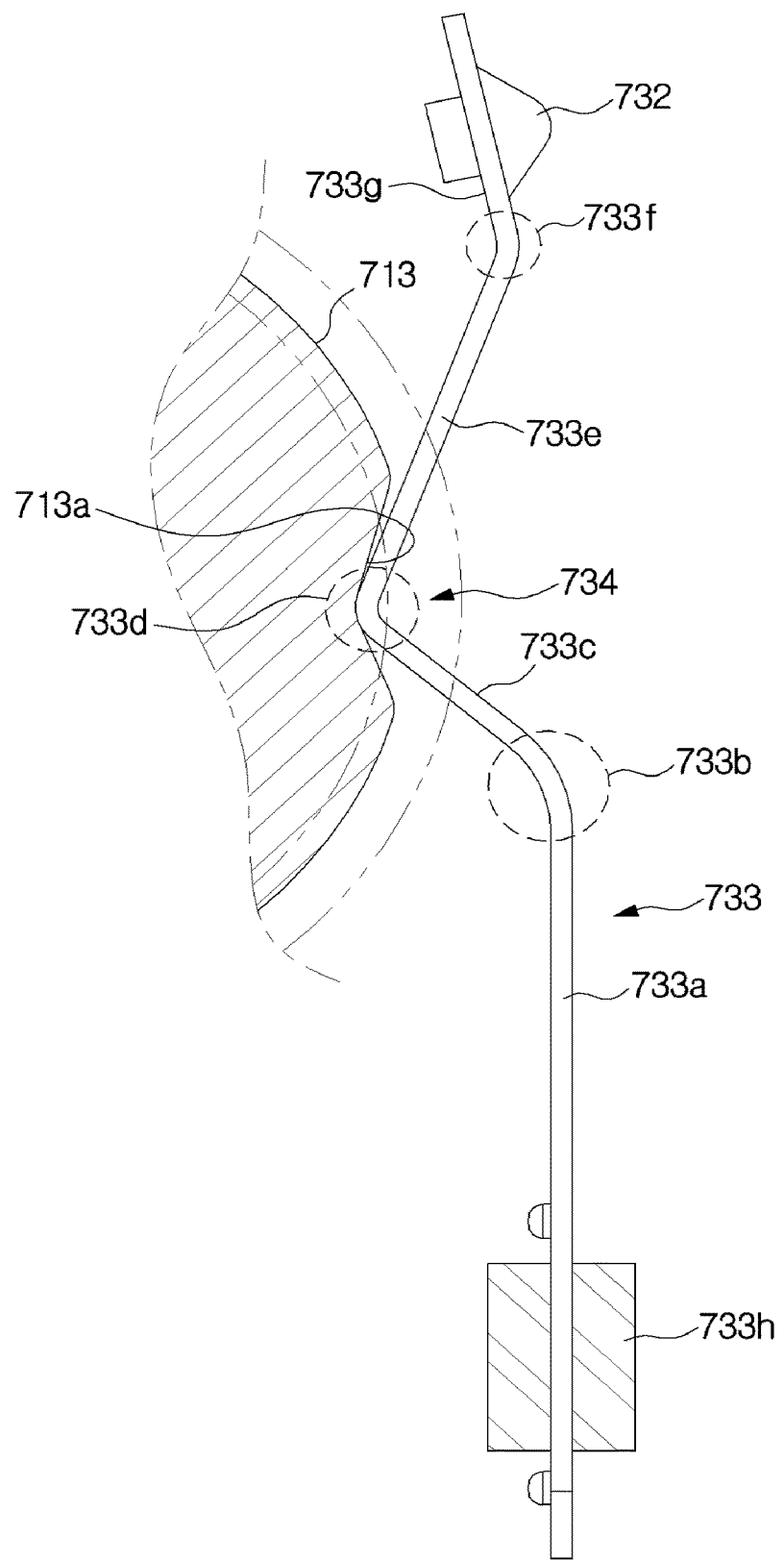
FIG. 29B is a view illustrating the ignition switch manipulation sensor according to an embodiment of the present disclosure.

FIG. 29B is a view illustrating the ignition switch manipulation sensor according to an embodiment of the present disclosure.

Referring to FIGS. 26, 27, 28, 29A, and 29B, the ignition switch assembly 700 may include a front surface housing 705 and a rear surface housing 707 capable of being coupled to the front surface housing 705.

The front surface housing 705 and the rear surface housing 707 may be coupled. For example, a hook coupling groove 706 may be provided at an outer surface of the front surface housing 705, and a hook 708 configured to be coupled to the hook coupling groove 706 may be formed at the rear surface housing 707. The front surface housing 705 and the rear surface housing 707 may be coupled using a fastening member such as a screw, a nut, and various other couplers. When the front surface housing 705 and the rear surface housing 707 are coupled, parts such as the cam member 710, an ignition plug driver 720, and the ignition switch manipulation sensor 730 may be embedded inside the front surface housing 705 and the rear surface housing 707.

A cam member coupling hole 705a to which the cam member 710 is rotatably coupled and conducting wire through-holes 705b and 705c provided to enable the one or more conducting wires 790 to 792 to pass through the front surface housing 705 may be formed at one surface toward a front surface of the front surface housing 705. The cam member 710 may stably rotate about a predetermined rotation axis due to the cam member coupling hole 705a. In addition, the conducting wires 790 to 792 may be electrically connected to the ignition plug driver 720 and the ignition switch manipulation sensor 730 installed inside the front surface housing 705 by the conducting wire through-holes 705b and 705c.

One or more coupling members 709 which are stably coupled to the gas supply assembly 800 may be formed at an outside toward a rear surface of the rear surface housing 707, and the one or more coupling members 709 may be realized in the form of a coupling protrusion into which a body 814 of the gas supply assembly 800 may be inserted to be coupled. An insertion hole 707b into which a portion of a gas opener-and-closer 830 provided inside the body 814 of the gas supply assembly 800 is inserted to protrude toward the inside of the rear surface housing 707 may be formed inside the rear surface housing 707. A portion 830a of the gas opener-and-closer 830 may be coupled to the cam member 710 and may rotate according to the rotation of the cam member 710.

According to an embodiment, the cam member 710 may include a front surface 711, a first driver 712, and a second driver 713.

The cam member 710 may include the front surface 711 exposed to the outside of the front surface housing 705 through the cam member coupling hole 705a and a rotating shaft member insertion hole 710a into which the rotating shaft member 701 is inserted to be coupled provided at a center of the front surface 711. The front surface 711 may be omitted.

The first driver 712 extends from a rear surface of the front surface 711 to be integrally formed with the front surface 711 while a protrusion 712a is formed outward at a portion of an outer surface of the first driver 712. The protrusion 712a is provided to come into contact with or be spaced apart from a first driven portion 721 of the ignition plug driver 720 according to the rotation of the first driver 712. When the protrusion 712a comes into contact with the first driven portion 721, the first driven portion 721 may be moved toward a first contact portion 725 or may be bent to come into contact with the first contact portion 725.

The second driver 713 may extend from a rear surface of the first driver 712 to be integrally formed with the front surface 711 and the first driver 712. A groove 713a recessed toward a center thereof may be formed at a portion of an outer surface of the second driver 713. The groove 713a is provided to enable a second driven portion 731 of the ignition switch manipulation sensor 730 to be moved or be bent according to rotation of the second driver 713, and the second driven portion 731 may come into contact with or be spaced apart from a second contact portion 735 according to the movement or bending.

Positions of the first driver 712 and the second driver 713 may be switched with each other. For example, unlike FIG. 27, the second driver 713 may be disposed at a position of the first driver 712. In this case, the first driven portion 721 and the second driven portion 731 respectively corresponding to the first driver 712 and the second driver 713 may be installed at proper positions inside the front surface housing 705 and the rear surface housing 707.

In addition, according to an embodiment, the protrusion 712a or the groove 713a may be formed at both of the first driver 712 and the second driver 713. In addition, unlike the description above, a groove (not illustrated) may be formed at the first driver 712 and a protrusion may be formed at the second driver 713 according to an embodiment.

The ignition plug driver 720 and the ignition switch manipulation sensor 730 may be provided near the cam member 710. In this case, a portion of the ignition plug driver 720 and a portion of the ignition switch manipulation sensor 730 may be provided to come into contact with a portion of the cam member 710.

The ignition plug driver 720 may drive the ignition plug according to the rotation of the first driver 712, and the ignition switch manipulation sensor 730 may sense an operation of the ignition switch according to an operation of the second driver 713.

The ignition plug driver 720 and the ignition switch manipulation sensor 730 may be designed to correspond to shapes of the first driver 712 and the second driver 713, respectively. Specifically, the ignition plug driver 720 and the ignition switch manipulation sensor 730 may have predetermined structures depending on whether the protrusion 712a or the groove 713a is formed at the ignition plug driver 720 and the ignition switch manipulation sensor 730.

According to an embodiment, the ignition plug driver 720 may include the first driven portion 721 and the first contact portion 725.

The first driven portion 721 is provided to be moved or be bent by the protrusion 712a provided at the first driver 712 according to the rotation of the first driver 712.

Specifically, according to an embodiment, the first driven portion 721 may include a main body 723 and a fixer 723h configured to fix the main body 723. The main body 723 is realized using a material having a predetermined degree of flexibility to be bent by a force applied from the outside and having elasticity to be restored to an original form thereof when the applied force disappears while being realized using a conductor such as a metal through which a current may flow.

According to an embodiment, as illustrated in FIG. 29A, the main body 723 may include a first portion 723a fixed by the fixer 723h and having a mounting groove 723i on which the first conducting wire 790 or a predetermined conducting wire connected to a power source, e.g., the third conducting wire 792, is mounted, a first bent portion 723b bent toward the cam member 710 and configured to connect an end of the first portion 723a to a second portion 723c, the second portion 723c configured to extend from the first bent portion 723b, a second bent portion 723d bent in a direction receding from the cam member 710 and configured to connect the second portion 723c to a third portion 723e, and the third portion 723e having one end connected to the second bent portion 723d. The third portion 723e is provided to come into contact with the outer surface of the first driver 712 by the first bent portion 723b and the second bent portion 723d. In addition, a contact terminal 722 is formed at a portion of the third portion 723e, e.g., the other end thereof. One or more of the first portion 723a to the third portion 723e may be bent or be moved according to the rotation of the first driver 712, and the contact terminal 722 formed at the third portion 723e may be moved toward a contact terminal 726 of the first contact portion 725 to come into contact with the contact terminal 726 of the first contact portion 725. The fixer 723h is provided to be fixed at an inside of the front surface housing 705 or the rear surface housing 707 to fix the main body 723.

The first contact portion 725 is provided to be fixed inside the front surface housing 705 or the rear surface housing 707 and may include the contact terminal 726 and an electrical connector 727.

When the first driven portion 721 is bent by the protrusion 712a of the first driver 712, the contact terminal 726 of the first contact portion 725 is provided to come into contact with the contact terminal 722 of the first driven portion 721. The first contact portion 725 may be realized using a conductor such as a metal through which a current may flow.

The electrical connector 727 may be provided to electrically connect the contact terminal 726 to the first conducting wire 790. A mounter 727a having a predetermined conducting wire mounted thereon may be provided at a portion of the electrical connector 727, and the predetermined conducting wire may include the first conducting wire 790. In this case, a conducting wire connected to the power source to receive a current provided from the power source may be mounted on the mounting groove 723i at the first portion 723a described above. According to an embodiment, the electrical connector 727 may be connected to the power source through the predetermined conducting wire. In this case, the first conducting wire 790 may be mounted on the mounting groove 723i at the first portion 723a. The electrical connector 727 may be realized using a conductor such as a metal through which a current may flow.

According to an embodiment, the ignition switch manipulation sensor 730 may include the second driven portion 731 and the second contact portion 735.

The second driven portion 731 may be moved or be bent by the groove 713a provided at the second driver 713 according to the rotation of the second driver 713.

Specifically, the second driven portion 731 may include a main body 733 and a fixer 733h configured to fix the main body 733. The main body 733 may be realized using a conductor such as a metal through which a current may flow. In this case, the conductor may be realized using a material such as copper having the predetermined degree of flexibility to be bent by a force applied from the outside and having elasticity to be restored to an original form thereof when the applied force disappears.

According to an embodiment, as illustrated in FIG. 29B, the main body 733 may include a fourth portion 733a fixed by the fixer 733h and having a mounting groove 733i on which the second conducting wire 791 or the third conducting wire 792 is mounted, a third bent portion 733b bent toward the cam member 710 and configured to connect an end of the fourth portion 733a to a fifth portion 733c, and the fifth portion 733c configured to extend from the third bent portion 733b. In this case, the third bent portion 733b is bent more sharply than the first bent portion 723b. The fifth portion 733c may include a fourth bent portion 733d bent in the direction receding from the cam member 710 and configured to connect the fifth portion 733c to a sixth portion 733e. In this case, the fourth bent portion 733d may be bent more sharply than the second bent portion 723d in the direction receding from the cam member 710. The fourth bent portion 733d, the fifth portion 733c near the fourth bent portion 733d, and the sixth portion 733e near the fourth bent portion 733d form a groove coupler 734 capable of being inserted into the groove 713a or being spaced apart from the groove 713a. The groove coupler 734 may enter the groove 713a or be detached from an inner portion of the groove 713a while moving along an outer surface of the groove 713a due to the rotation of the second driver 713. Accordingly, the main body 733 may be bent or be moved toward the second contact portion 735. The sixth portion 733e is provided between the fourth bent portion 733d and a fifth bent portion 733f, and the fifth bent portion 733f is bent toward the cam member 710 and is provided to connect the sixth portion 733e to a seventh portion 733g. A contact terminal 732 is formed at a portion of the seventh portion 733g, e.g., one end thereof. One or more of the fourth portion 733a to the seventh portion 733g may be bent or be moved according to the rotation of the second driver 713. Accordingly, the contact terminal 732 formed at the seventh portion 733g moves toward a contact terminal 736 of the second contact portion 735 to come into contact with the contact terminal 736 of the second contact portion 735. The fixer 733h is provided to be fixed at an inside of the front surface housing 705 or the rear surface housing 707 to fix the main body 733.

The second contact portion 735 is provided to be fixed inside the front surface housing 705 or the rear surface housing 707 and may include the contact terminal 736 and an electrical connector 737.

When the groove coupler 734 of the second driven portion 731 is bent by being detached from the groove 713a of the second driver 713, the contact terminal 736 of the second contact portion 735 is designed to come into contact with the contact terminal 732 of the second driven portion 731. The second contact portion 735 may be realized using a conductor such as a metal through which a current may flow.

The electrical connector 737 may be provided to electrically connect the contact terminal 736 to one or more of the second conducting wire 791 and the third conducting wire 792. A mounter 737a having one or more of the second conducting wire 791 and the third conducting wire 792 mounted thereon may be provided at a portion of the electrical connector 737. When the second conducting wire 791 is mounted on the mounting groove 733i at the fourth portion 733a, the third conducting wire 792 may be mounted on the mounter 737a of the electrical connector 727. Conversely, when the third conducting wire 792 is mounted on the mounting groove 733i at the fourth portion 733a, the second conducting wire 791 may be mounted on the mounter 737a of the electrical connector 737. The electrical connector 737 may be realized using a conductor such as a metal through which a current may flow.

Figure 30:
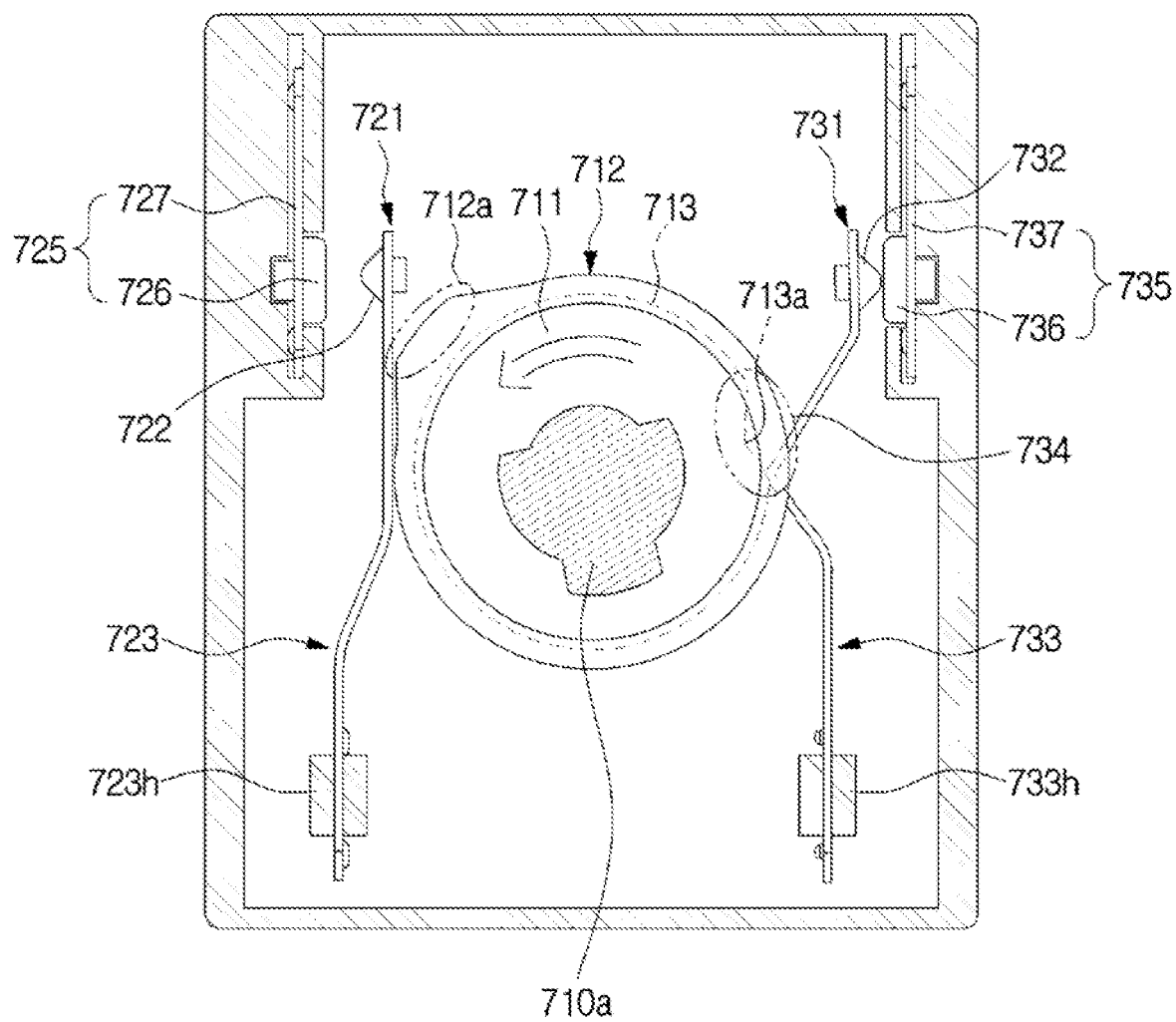
FIG. 30 is a first view for describing a process of sensing an ignition switch operation according to rotation of a cam according to an embodiment of the present disclosure.

FIG. 30 is a first view for describing a process of sensing an ignition switch operation according to rotation of a cam according to an embodiment of the present disclosure.

Figure 31:
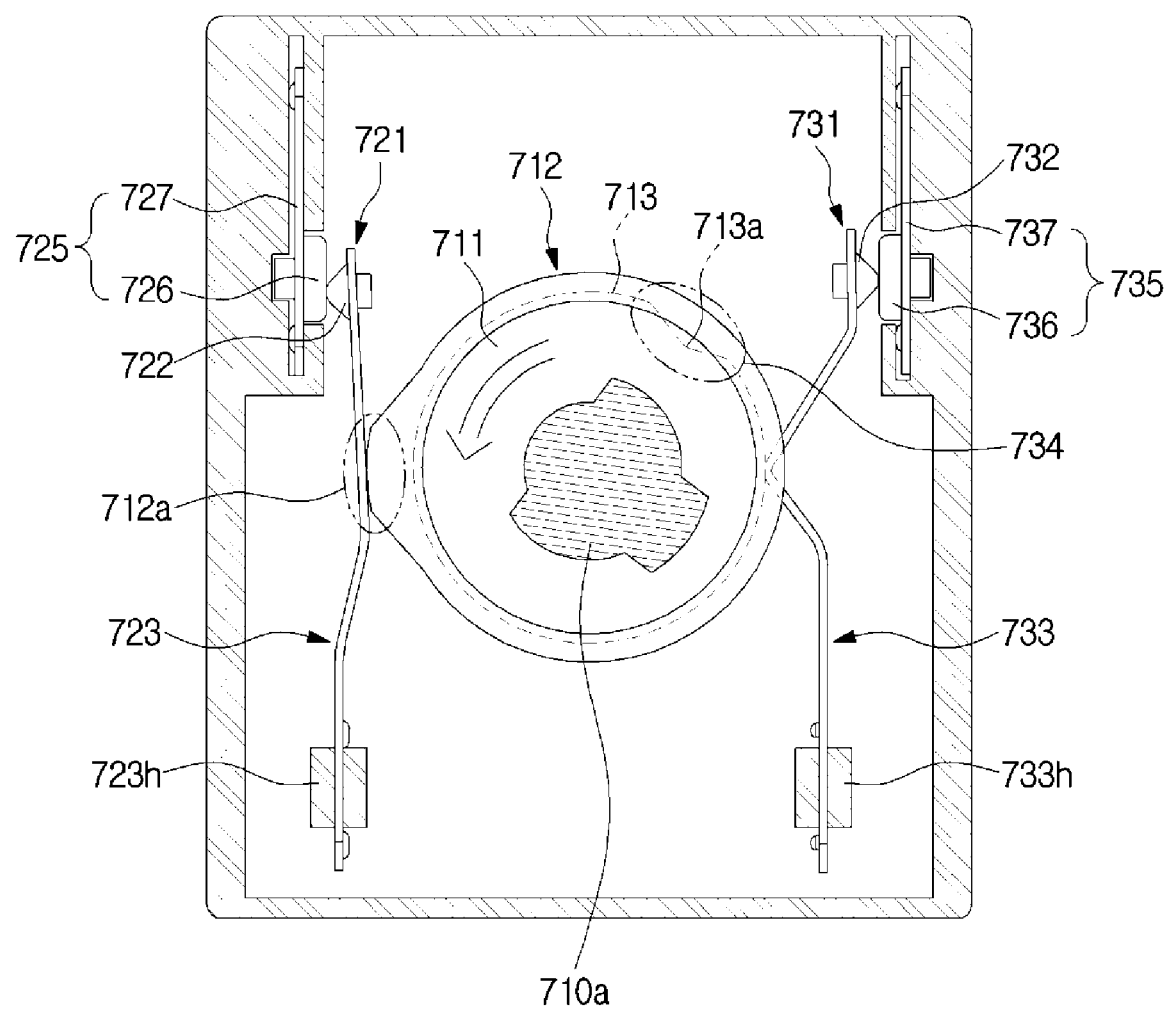
FIG. 31 is a second view for describing the process of sensing an ignition switch operation according to rotation of a cam according to an embodiment of the present disclosure.

FIG. 31 is a second view for describing the process of sensing an ignition switch operation according to rotation of a cam according to an embodiment of the present disclosure.

Referring to FIG. 30, when the cam member 710 rotates, the first driver 712 and the second driver 713 also rotate, and the protrusion 712a of the first driver 712 and the groove 713a of the second driver 713 also move.

The protrusion 712a applies a pushing force to the third portion 723e of the main body 723 of the first driven portion 721 while rotating, and the main body 723 is bent or moved in the direction receding from the cam member 710. Accordingly, as illustrated in FIG. 31, the contact terminal 722 provided at the main body 723 comes into contact with the contact terminal 726 of the first contact portion 725. In this case, when a current is applied to the main body 723, the current applied to the main body 723 is transmitted to the first contact portion 725 through the two contact terminals 722 and 726. Conversely, when a current is applied to the first contact portion 725, the current applied to the first contact portion 725 is transmitted to the main body 723 through the two contact terminals 722 and 726. Accordingly, the first driven portion 721 and the first contact portion 725 are conducted and a current flows therebetween. Accordingly, a current provided through a conducting wire connected to the power source may be transmitted to the first conducting wire 790 through the first driven portion 721 and the first contact portion 725 and may be ultimately transmitted to the ignition plug 699. In this way, the ignition plug driver 720 may drive the ignition plug.

When the groove 713a of the second driver 713 rotates, the groove coupler 734 of the second driven portion 731 is detached from the groove 713a while moving along the outer surface of the groove 713a. Accordingly, the main body 733 of the second driven portion 731 is bent or moved in the direction receding from the cam member 710. Accordingly, as illustrated in FIG. 31, the contact terminal 732 provided at the main body 733 comes into contact with the contact terminal 736 of the second contact portion 735. Accordingly, the second driven portion 731 and the second contact portion 735 are conducted and a current flows therebetween. Since the second driven portion 731 is electrically connected to any one of the second conducting wire 791 and the third conducting wire 792, and the second contact portion 735 is electrically connected to the other one of the second conducting wire 791 and the third conducting wire 792, the second conducting wire 791 and the third conducting wire 792 are also electrically connected due to conduction of the second driven portion 731 and the second contact portion 735. When any one of the second conducting wire 791 and the third conducting wire 792 is connected to the third communicator 620 and the other one is connected to the power source configured to supply power as described above, the current supplied from the power source may be transmitted to the third communicator 620 via the second conducting wire 791 and the third conducting wire 792. Accordingly, since whether the ignition switch 630 is operating may be transmitted to the third communicator 620, the ignition switch manipulation sensor 730 may sense whether the ignition switch 630 is operating.

Although the ignition plug driver 720 and the ignition switch manipulation sensor 730 of the ignition switch assembly 700 have been described above, functions or operations thereof may be switched with each other. For example, when the second conducting wire 791 and the third conducting wire 792 are connected to the ignition plug driver 720, the ignition plug driver 720 may serve as the ignition switch manipulation sensor 730. In addition, when the ignition switch manipulation sensor 730 is connected to the first conducting wire 790 and a conducting wire extending from the power source, e.g., the third conducting wire 792, the ignition switch manipulation sensor 730 may serve as the ignition plug driver 720.

Figure 32:
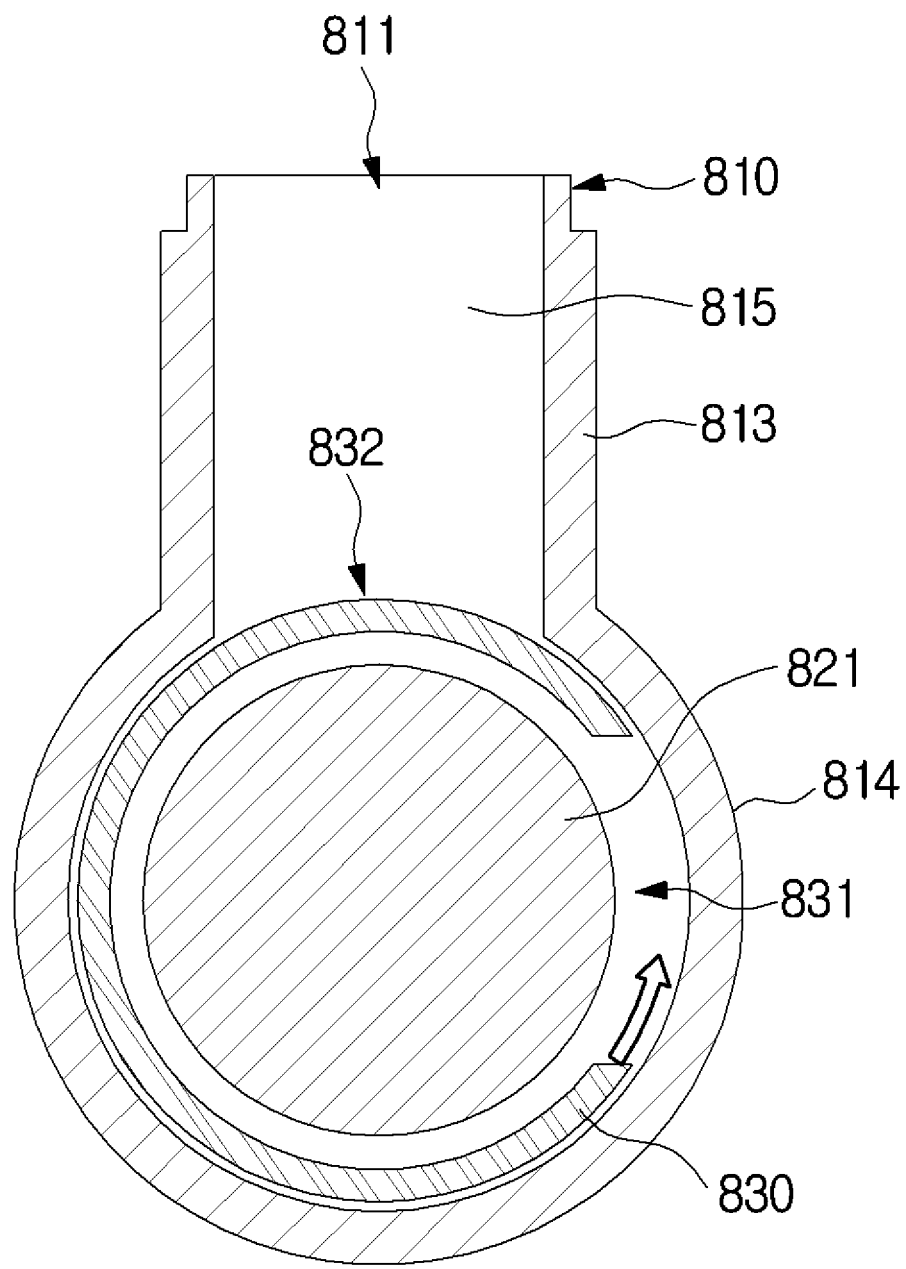
FIG. 32 is a first view for describing opening and closing of the gas supply assembly according to an embodiment of the present disclosure.

FIG. 32 is a first view for describing opening and closing of the gas supply assembly according to an embodiment of the present disclosure.

Figure 33:
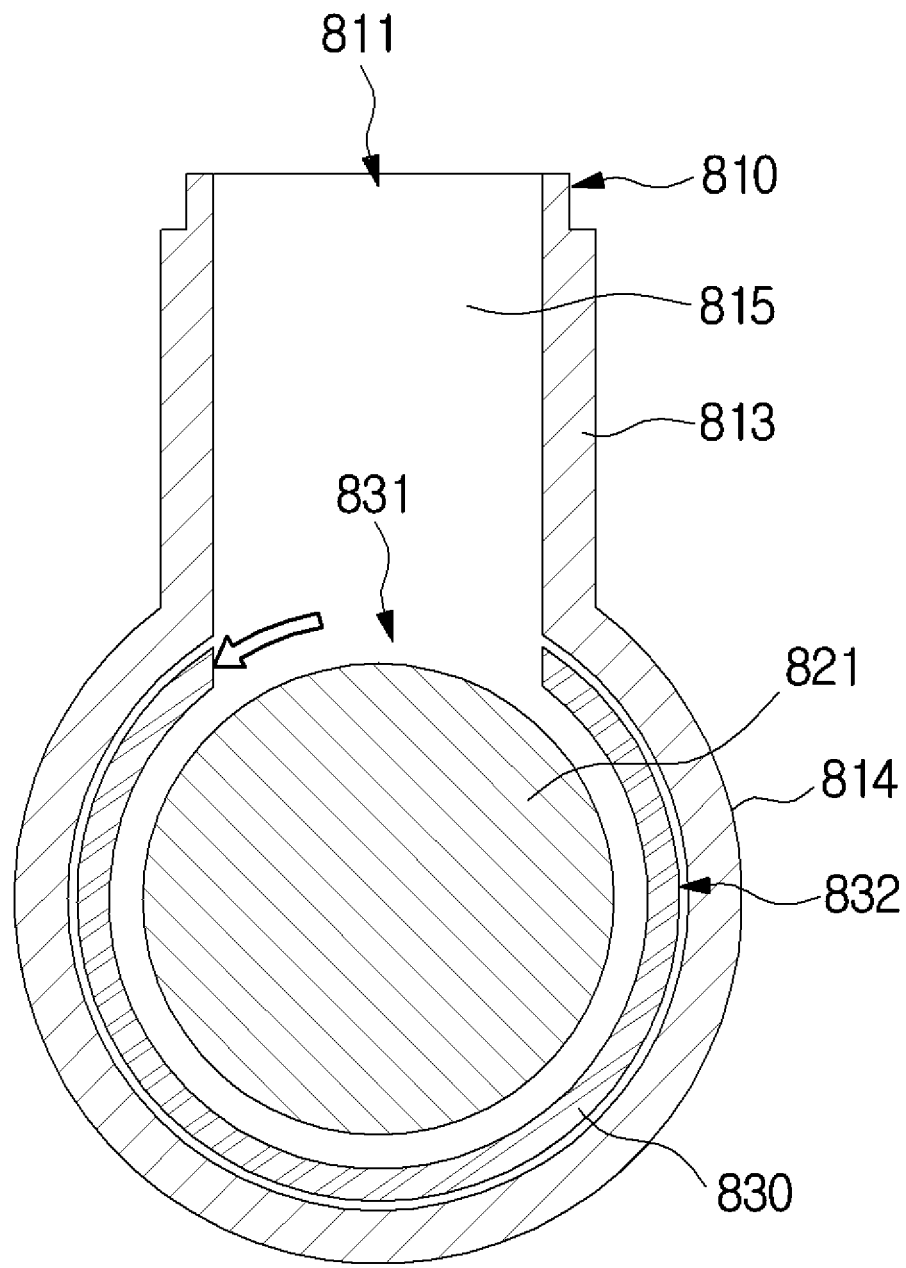
FIG. 33 is a second view for describing the opening and closing of the gas supply assembly according to an embodiment of the present disclosure.

FIG. 33 is a second view for describing the opening and closing of the gas supply assembly according to an embodiment of the present disclosure.

Referring to FIG. 26, the gas supply assembly 800 may include a gas exhaust 810 configured to suction combustion gas, a gas outlet 820 configured to discharge combustion gas, and the body 814 configured to connect the gas exhaust 810 to the gas outlet 820 and enable or block a flow of combustion gas.

The gas exhaust 810 may be coupled to the first gas pipe 801 from which combustion gas is provided and may include the gas suction hole 811 connected to the gas discharge hole of the first gas pipe 801 to enable the combustion gas to enter the body 814. The gas exhaust 810 may be provided so that the gas suction hole 811 faces upward, and the first gas pipe 801 may be seated on top of the gas exhaust 810.

A coupler 812 to be coupled to an inside of the exterior housing 601 of the third cooking apparatus 600 may be formed at a side surface of the gas exhaust 810. The coupler 812 is fixed to an inside of an upper surface of the exterior housing 601 using a screw, a bolt, or the like to enable the gas supply assembly 800 to be stably installed at the third cooking apparatus 600.

An extension 813 configured to extend from the gas exhaust 810 and form a flow passage of combustion gas may be additionally formed between the gas exhaust 810 and the body 814.

The body 814 may be connected to the gas exhaust 810 and the gas outlet 820. For example, an upper portion of the body 814 may be connected to the gas exhaust 810, and a rear surface of the body 814 may be connected to the gas outlet 820.

Referring to FIGS. 32 and 33, the gas opener-and-closer 830 may be provided inside the body 814. The gas opener-and-closer 830 may have a shape of a pipe body 832 having an opening 831 formed at one side surface and the other portions sealed, and the pipe body 832 is rotatably provided inside the body 814. The portion 830a of the gas opener-and-closer 830 may be coupled to an end of the second driver 713 of the cam member 710 to rotate inside the body 814 according to the rotation of the cam member 710.

Referring to FIG. 32, when the opening 831 faces a side surface of the body 814, the opening 831 is closed by a side frame of the body 814. In this case, a sealed portion of the pipe body 832 faces the gas exhaust 810 and blocks a passage 815 in the gas exhaust 810, thereby preventing combustion gas that has entered the gas exhaust 810 from flowing to the gas discharge hole 821. Accordingly, the gas supply assembly 800 may prevent the combustion gas from flowing to the burner 691.

When the opening 831 faces the upper surface of the body 814 as illustrated in FIG. 33, the passage 815 in the gas exhaust 810 is open, and the gas suction hole 811 and the gas discharge hole 821 are connected to each other to enable combustion gas to flow therethrough. Combustion gas that has entered through the gas suction hole 811 passes through the passage 815, enters the gas opener-and-closer 830, moves to the gas discharge hole 821 along a passage formed at the gas outlet 820, and is transmitted to the burner 691 along the second gas pipe 802. In this way, the gas supply assembly 800 may enable the combustion gas to be transmitted to the burner 691.

Figure 34:
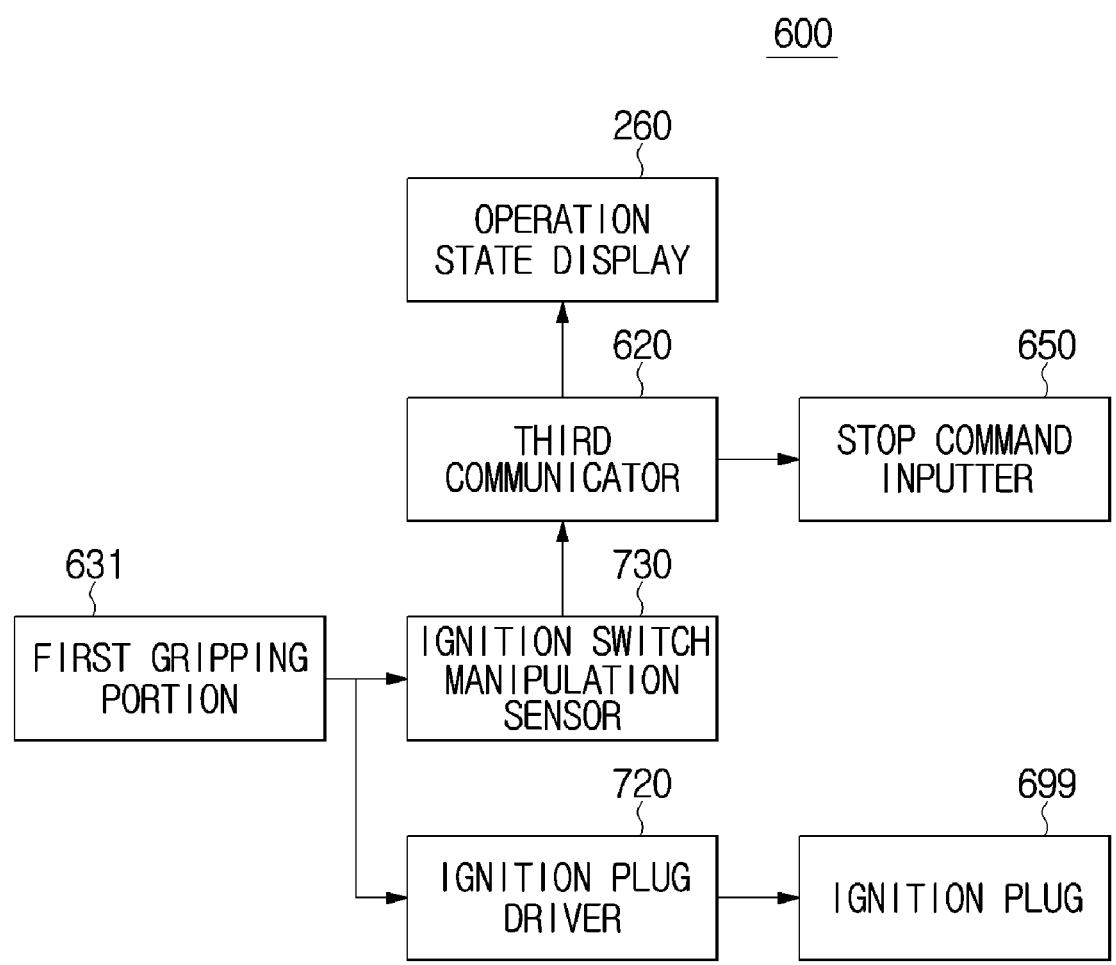
FIG. 34 is a view for describing a flow of controlling the third cooking apparatus according to an embodiment of the present disclosure.

FIG. 34 is a view for describing a flow of controlling the third cooking apparatus according to an embodiment of the present disclosure.

Figure 35:
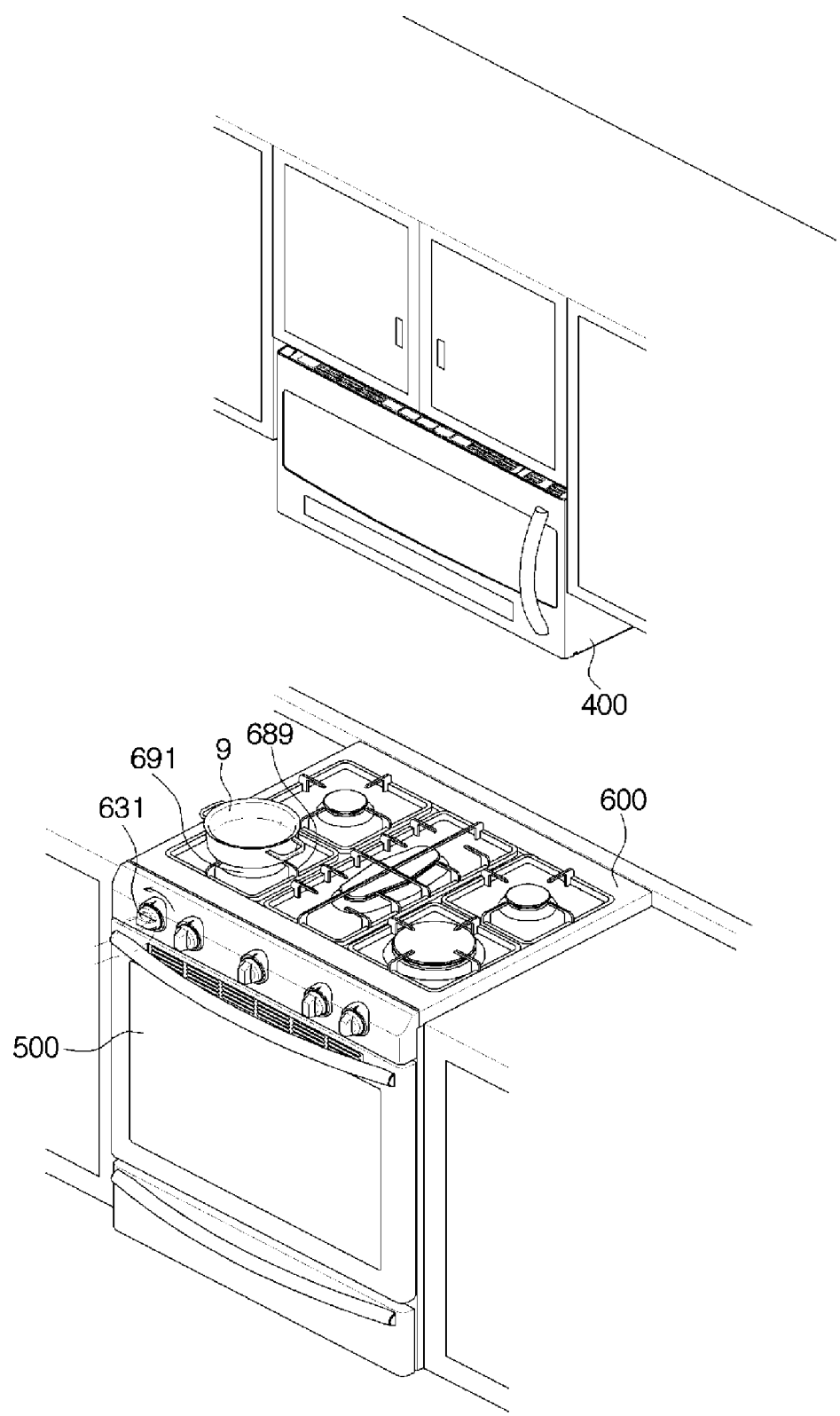
FIG. 35 is a first view for describing an operation of the first cooking apparatus in response to a cooking operation of the third cooking apparatus according to an embodiment of the present disclosure.

FIG. 35 is a first view for describing an operation of the first cooking apparatus in response to a cooking operation of the third cooking apparatus according to an embodiment of the present disclosure.

Figure 36:
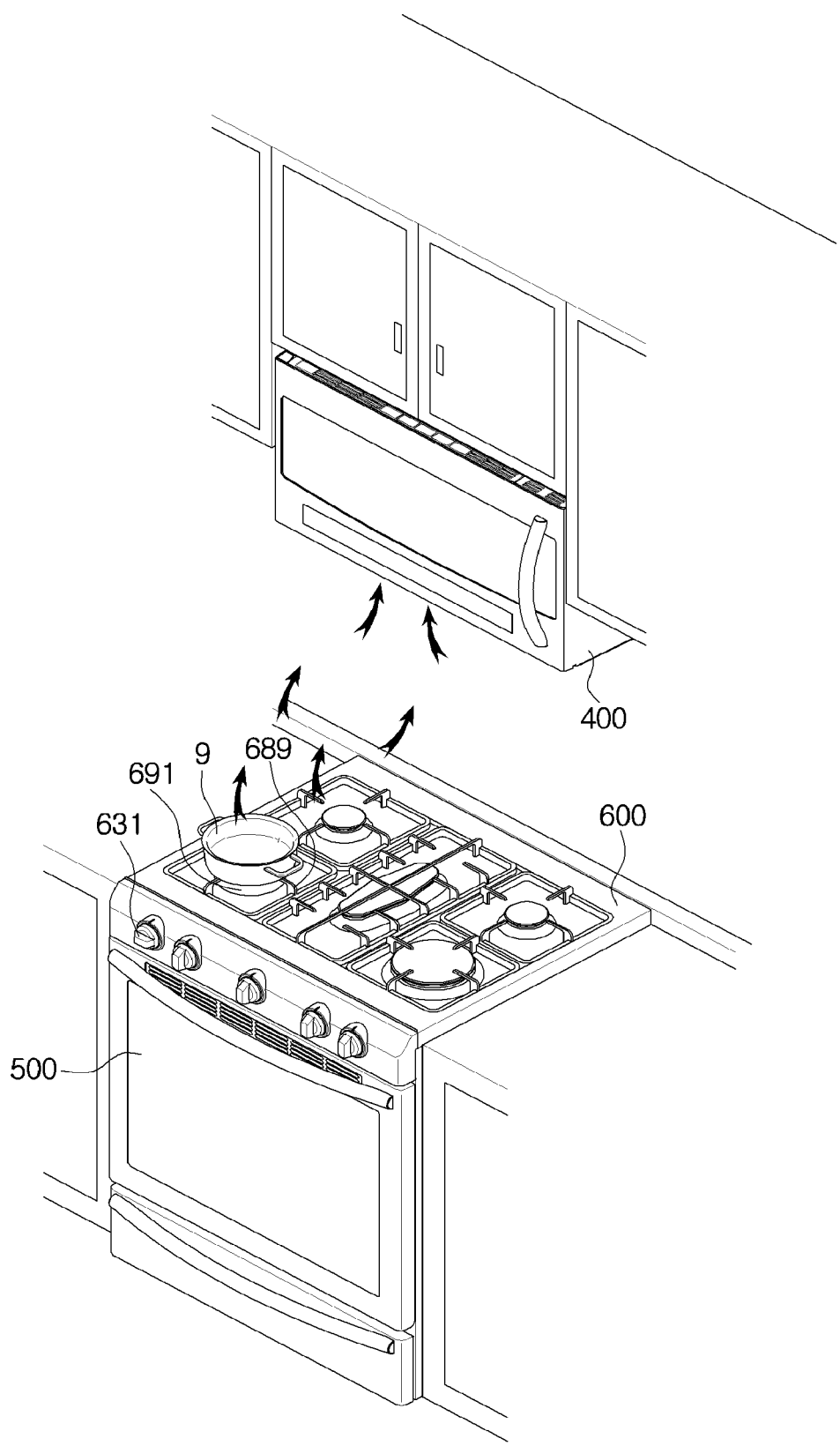
FIG. 36 is a second view for describing an operation of the first cooking apparatus in response to the cooking operation of the third cooking apparatus according to an embodiment of the present disclosure.

FIG. 36 is a second view for describing an operation of the first cooking apparatus in response to the cooking operation of the third cooking apparatus according to an embodiment of the present disclosure. In FIG. 34, only elements required for convenience of describing the flow of controlling the third cooking apparatus are briefly illustrated.

Referring to FIG. 34, the third cooking apparatus 600 may include the first gripping portion 631, the third communicator 620, the ignition plug 699, the ignition plug driver 720, and the ignition switch manipulation sensor 730.

Referring to FIG. 35, when the user manipulates the first gripping portion 631, the ignition plug driver 720 outputs an electrical signal according to the rotation of the first gripping portion 631 and transmits the electrical signal to the ignition plug 699 as described above. Accordingly, the burner 691 is ignited, and a container 9 seated on the container mount 689 near the burner 691 is heated.

In addition, an electrical signal is also output by the ignition switch manipulation sensor 730 according to the rotation of the first gripping portion 631, and the electrical signal is transmitted to the third communicator 620 through a transmitter such as a conducting wire. The electrical signal may be converted into a digital signal by an analog-digital converter or may be amplified by an amplifier before being transmitted to the third communicator 620.

The third communicator 620 may convert the electrical signal according to the sensed manipulation of the ignition switch 630 into a communicable form and transmit the electrical signal to the first communicator 420 of the first cooking apparatus 400.

The first communicator 420 of the first cooking apparatus 400 receives the electrical signal according to the sensed manipulation of the ignition switch 630, and transmits the received electrical signal to the controller 480. The controller 480 may apply power to the fan driver 458a based on received information to operate the fan driver 458a. Accordingly, as illustrated in FIG. 36, smoke 8 generated from the container 9 during a cooking process flows toward the bottom surface of the first cooking apparatus 400 and is suctioned by the exhaust 450 provided at the bottom surface of the first cooking apparatus 400 to be emitted to the outside.

According to an embodiment, when the third cooking apparatus 600 is operated, the third cooking apparatus 600 may sense heat near the burner 691 using a sensor (not illustrated) and transmit information on the sensed heat to the first cooking apparatus 400 to enable the controller 480 of the first cooking apparatus 400 to operate the fan driver 458a based on transmitted information on a temperature near the burner 691.

In addition, the third cooking apparatus 600 may include the stop command inputter 650. The stop command inputter 650 may output an electrical signal according to a user manipulation and transmit the output electrical signal to the third communicator 620, and the third communicator 620 may convert the received electrical signal into a communicable form and transmit the electrical signal to the second communicator 520 of the second cooking apparatus 500.

The second communicator 520 of the second cooking apparatus 500 may receive an electrical signal according to manipulation of the stop command inputter 650, and the received signal may be transmitted to the second cooker 590, a power source configured to apply an electrical signal to the second cooker 590, or a switch configured to connect the second cooker 590 to the power source to temporarily interrupt or non-temporarily stop operation of the second cooker 590.

In addition, the third cooking apparatus 600 may include the operation state display 660, and the operation state display 660 may display a state of the second cooking apparatus 500. In this case, the third communicator 620 may receive an electrical signal transmitted from the second communicator 520 of the second cooking apparatus 500 corresponding to a state of the second cooking apparatus 500, and may directly transmit the received electrical signal to the operation state display 660 or transmit the received electrical signal to a separate controller (not illustrated) provided at the third cooking apparatus 600 to enable the operation state display 660 to emit predetermined light or display a predetermined image according to the state of the second cooking apparatus 500.

Figure 37:
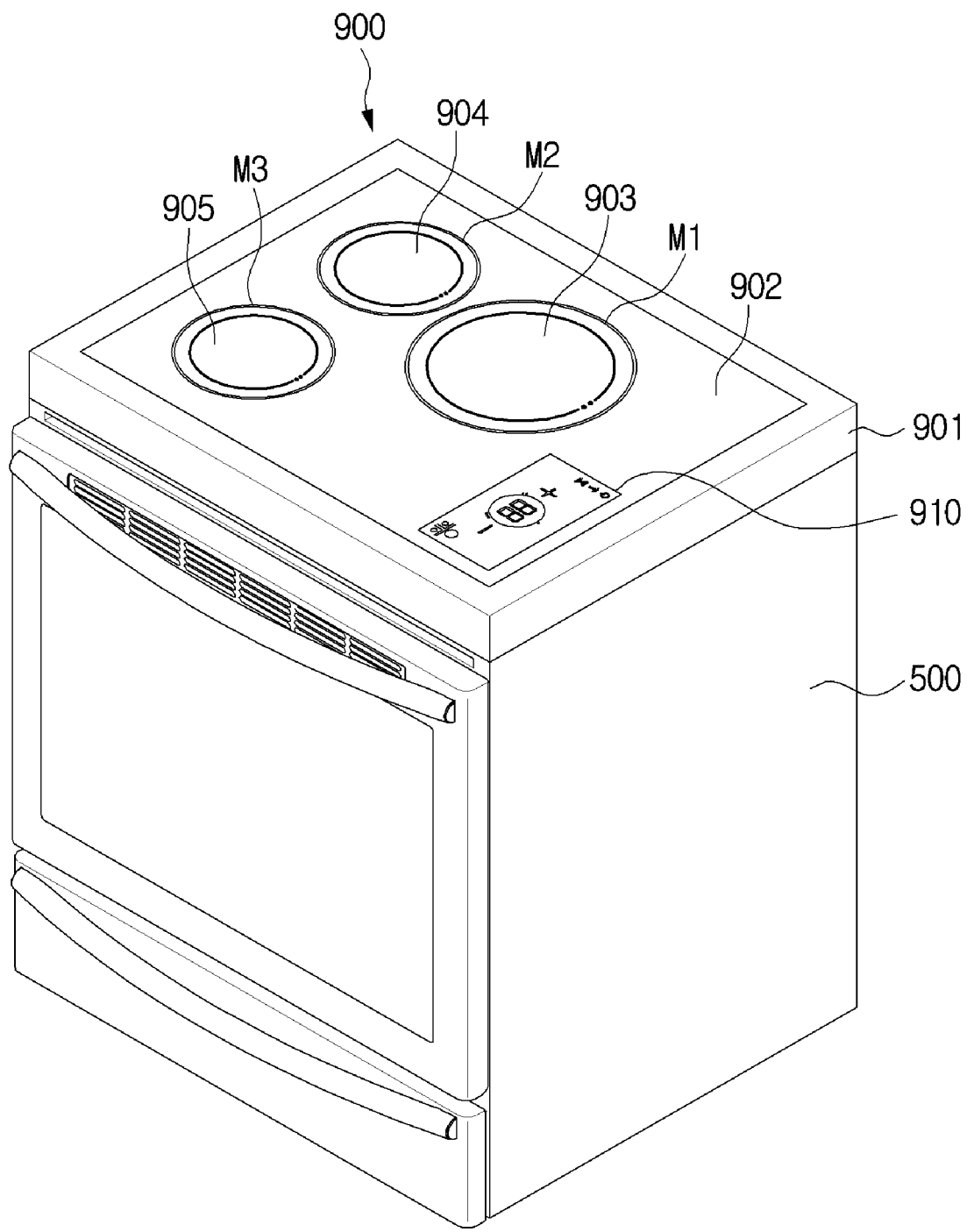
FIG. 37 is a perspective view of a third cooking apparatus according to an embodiment of the present disclosure.

FIG. 37 is a perspective view of a third cooking apparatus according to an embodiment of the present disclosure.

Referring to FIG. 37, a third cooking apparatus 900 may be an electric stove. In this case, the cooking apparatus 900 may be provided above the second cooking apparatus 500, e.g., an oven. According to an embodiment, the third cooking apparatus 900 may be separately manufactured from the second cooking apparatus 500 and then seated on the second cooking apparatus 500, or may be integrally formed with the second cooking apparatus 500. When the third cooking apparatus 900 and the second cooking apparatus 500 are integrally formed, the third cooking apparatus 900 may be manufactured to share an exterior housing with the second cooking apparatus 500.

The third cooking apparatus 900 may include an exterior housing 901, a cooking plate 902 provided at an upper surface of the exterior housing 901, and a plurality of burners 903 to 905 realized by heating coils provided inside the cooking plate 902. Each of the burners 903 to 905 serves as a heat source.

The exterior housing 901 forms an exterior of the third cooking apparatus 900 and has various types of parts required for a cooking operation of the third cooking apparatus 900 installed therein.

The cooking plate 902 may be realized using tempered glass such as ceramic glass so as not to be easily damaged. In addition, guide marks M1, M2, and M3 may be marked on the cooking plate 902 to guide a heating position as illustrated in FIG. 37.

One or more induction heating coils (not illustrated) configured to generate a magnetic field may be provided at a lower end of the cooking plate 902 on which the guide marks M1, M2, and M3 are marked. A single induction heating coil may be installed for each of the guide marks M1, M2, and M3, or a plurality of induction heating coils may be installed.

An induction heating coil may have a circular or elliptical shape, and a magnetic field changing over time is induced inside the induction heating coil when AC is supplied to the induction heating coil. The magnetic field generated by the induction heating coil and changing over time passes through a bottom surface of a cooking container seated on the guide marks M1, M2, and M3. Here, a current rotating about the magnetic field, i.e., an eddy current, is generated on the bottom surface of the cooking container. When the eddy current is generated at the cooking container, electrons generate heat by colliding with atoms forming the cooking container due to the eddy current, and the cooking container is heated by the generated heat.

In this way, the third cooking apparatus 900, which is an electric stove, may heat the cooking container.

Various types of parts may be installed inside the exterior housing 901 of the third cooking apparatus 900. For example, not only the induction heating coil described above, but also various types of parts for performing an operation of the third cooking apparatus 900, e.g., an operation of applying a current to the induction heating coil, a semiconductor chip and related parts for controlling such an operation, and a substrate having the semiconductor chip and the like installed thereon may be provided inside the external housing 901. In addition, a communication module configured to serve as a communicator may be installed inside the external housing 901, and the communication module may communicate with one or more of the first cooking apparatus 400 and the second cooking apparatus 500. The communication module may be realized using a substrate, a communication chip mounted on the substrate, an antenna, etc.

The third cooking apparatus 900 may acquire information on an operation of the third cooking apparatus 900. For example, the third cooking apparatus 900 may detect a current being applied to an induction heating coil or measure heat around the burners 903 to 905 to acquire the information on the operation of the third cooking apparatus 900.

As described above, the third cooking apparatus 900 may transmit the acquired information on the operation of the third cooking apparatus 900 in the form of an electrical signal to the controller 480 of the first cooking apparatus 400 through the communication module, and the controller 480 of the first cooking apparatus 400 may operate the fan driver 438*a* based on the information transmitted from the third cooking apparatus 900. Accordingly, smoke generated in the container during a cooking process using the third cooking apparatus 900 flows toward the bottom surface of the first cooking apparatus 400 and is suctioned by the exhaust 450 provided at the bottom surface of the first cooking apparatus 400 to be emitted to the outside.

In addition, the third cooking apparatus 900 may further include a user interface 910. The user interface 910 may display information on the third cooking apparatus 900 or display an operation related to the second cooking apparatus 500. Specifically, the user interface 910 of the third cooking apparatus 900 may provide information on a state of the second cooking apparatus 500 to the user using a lighting device such as an LED lamp or various types of display panels. In addition, the user interface 910 may also receive a stop command related to the second cooking apparatus 500. Information provided through the user interface 910 or a user command input through the user interface 910 may be transmitted between the second communicator 520 provided at the second cooking apparatus 500 and the communicator provided at the third cooking apparatus 900.

Figure 38:
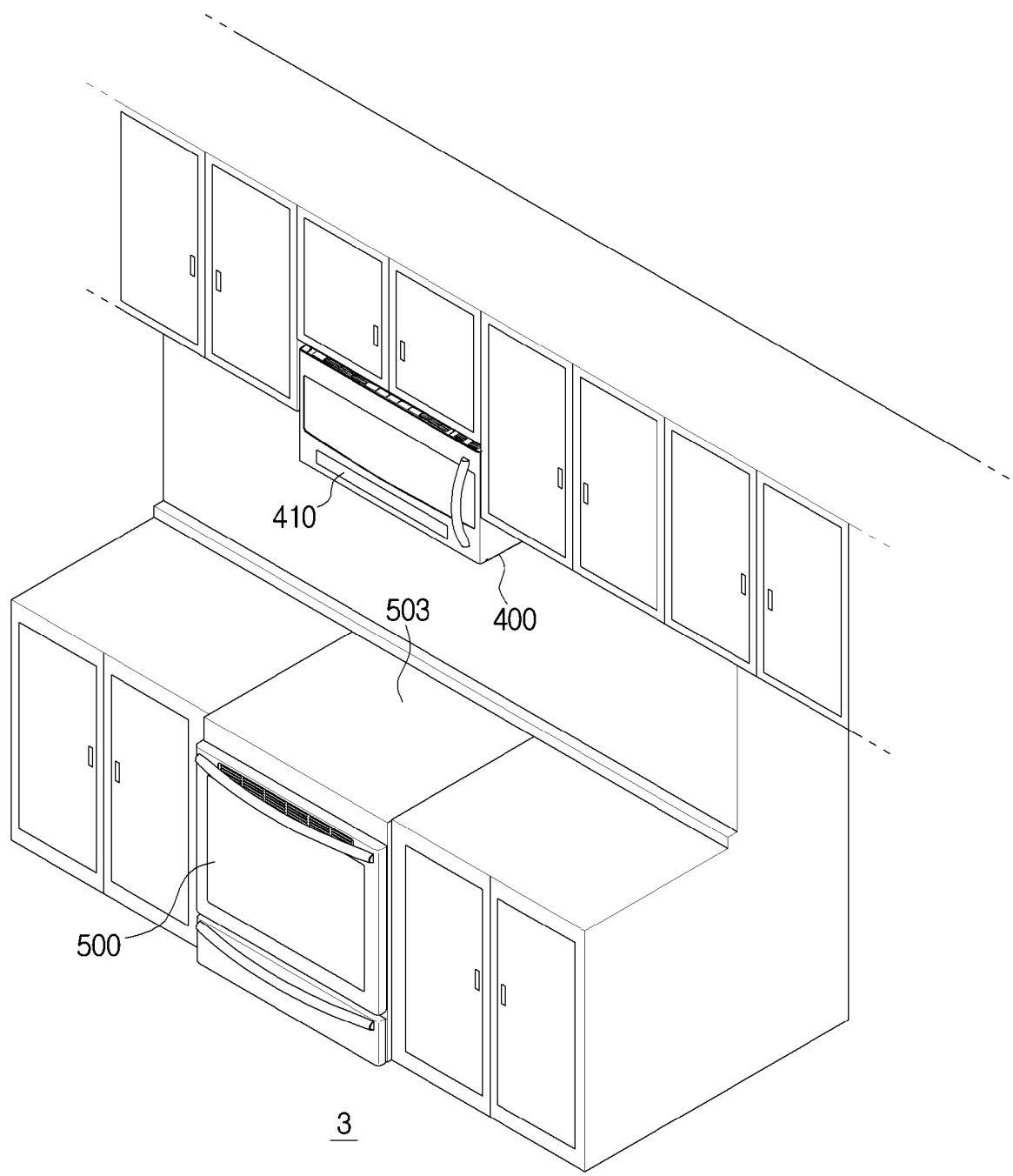
FIG. 38 is a view illustrating an example of a cooking apparatus controlling system in which the first cooking apparatus is a microwave oven and the second cooking apparatus is an oven according to an embodiment of the present disclosure.

FIG. 38 is a view illustrating an example of a cooking apparatus controlling system in which the first cooking apparatus is a microwave oven and the second cooking apparatus is an oven according to an embodiment of the present disclosure.

Referring to FIG. 38, a cooking apparatus controlling system 3 may include the first cooking apparatus 400 and the second cooking apparatus 500. In other words, the third cooking apparatuses 600 and 900 may be omitted. In this case, an upper surface of the second cooking apparatus 500 may be exposed toward the first cooking apparatus 400. Home appliances such as a dish dryer may be installed on the upper surface of the second cooking apparatus 500 as needed. Since the first cooking apparatus 400 and the second cooking apparatus 500 have been described above, detailed descriptions thereof will be omitted.

Figure 39:
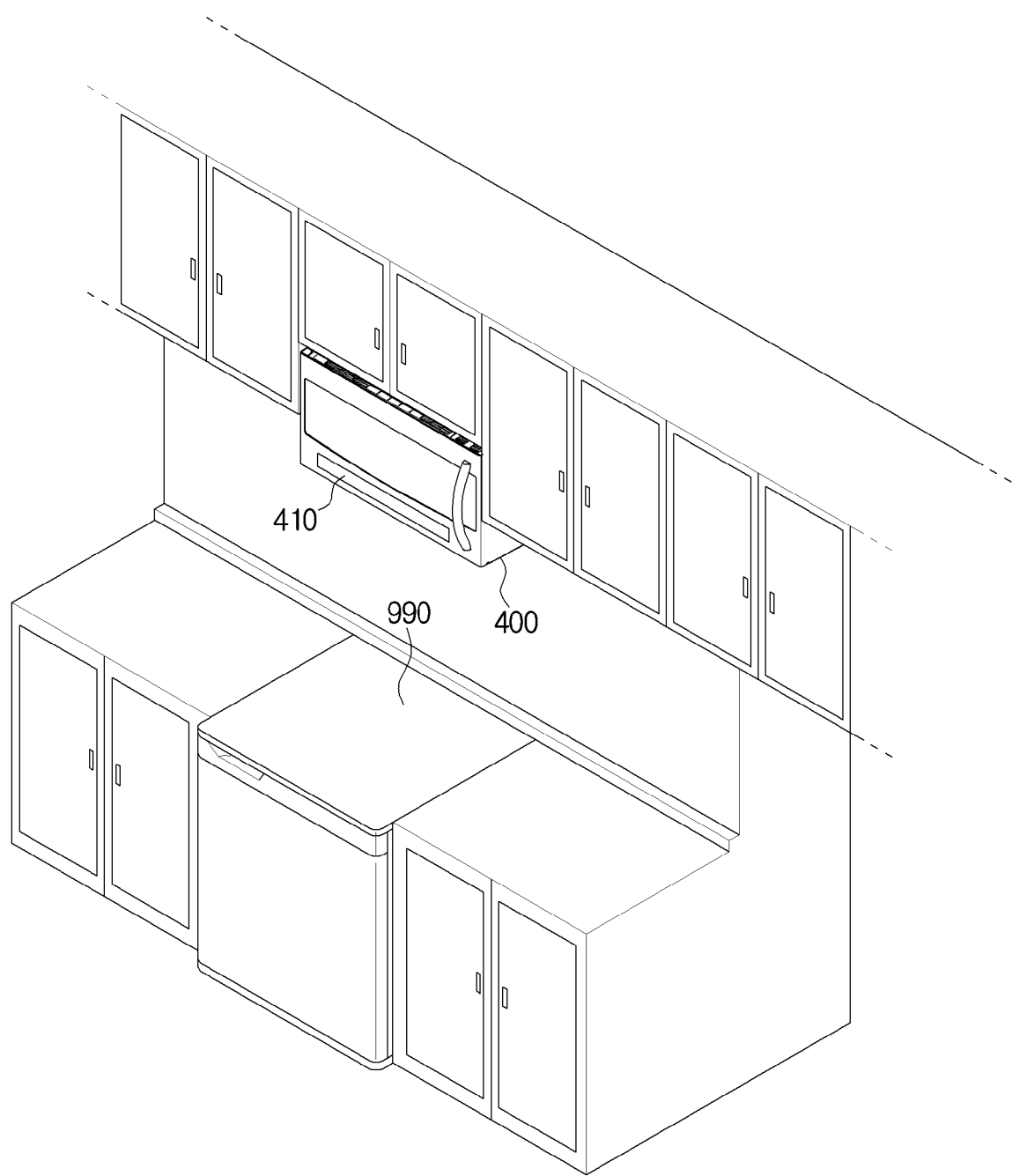
FIG. 39 is a view illustrating a home appliance controlling system including a microwave oven and a refrigerator according to an embodiment of the present disclosure.

FIG. 39 is a view illustrating a home appliance controlling system including a microwave oven and a refrigerator according to an embodiment of the present disclosure.

Referring to FIG. 39, a home appliance controlling system 4 may include the first cooking apparatus 400 and a home appliance 990, e.g., a refrigerator. Like the cases of the cooking apparatus controlling systems 1 to 3, the first cooking apparatus 400 and the home appliance 990 may be set to communicate with each other through a wired communication network or a wireless communication network.

The home appliance 990 may be provided below the first cooking apparatus 400 and may be spaced a predetermined distance apart from the first cooking apparatus 400.

The user interface 410 may be provided at the first cooking apparatus 400, and the user interface 410 may receive a user command related to the first cooking apparatus 400 or receive a user command related to the home appliance 990. For example, the user may manipulate a physical button, a touch sensor, or the like formed at the user interface 410 of the first cooking apparatus 400 to adjust a temperature of a refrigerator compartment of the refrigerator 990. In addition, the user interface 410 may provide the user with information on the first cooking apparatus 400 and provide the user with information on the home appliance 990. For example, the user interface 410 may acquire information on a temperature of a freezer compartment of the refrigerator 990.

Hereinafter, a method of controlling a cooking apparatus according to various embodiments will be described with reference to FIGS. 40, 41, and 42.

Figure 40:
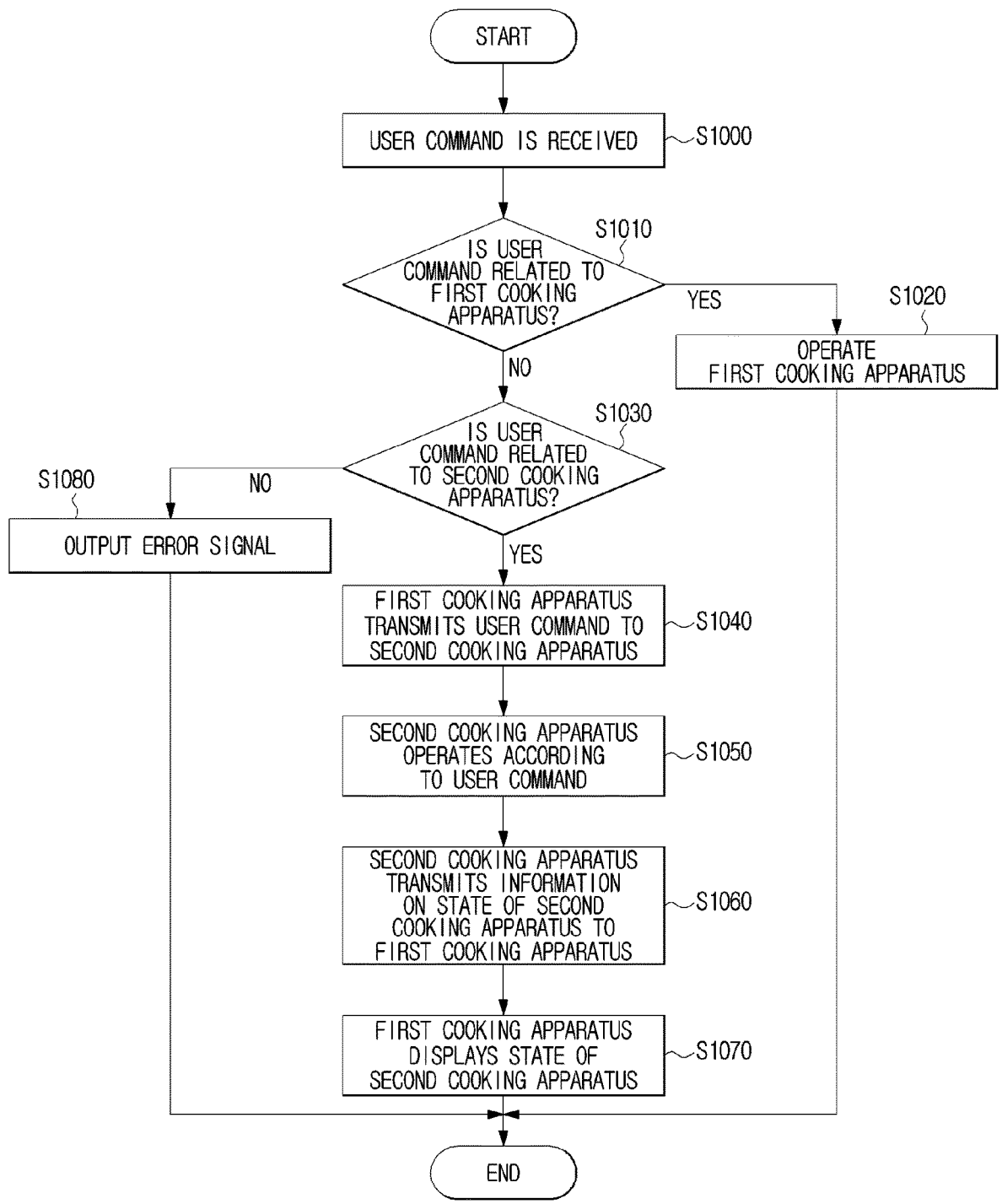
FIG. 40 is a flowchart of a method of controlling a cooking apparatus according to an embodiment of the present disclosure.
Figure 41:
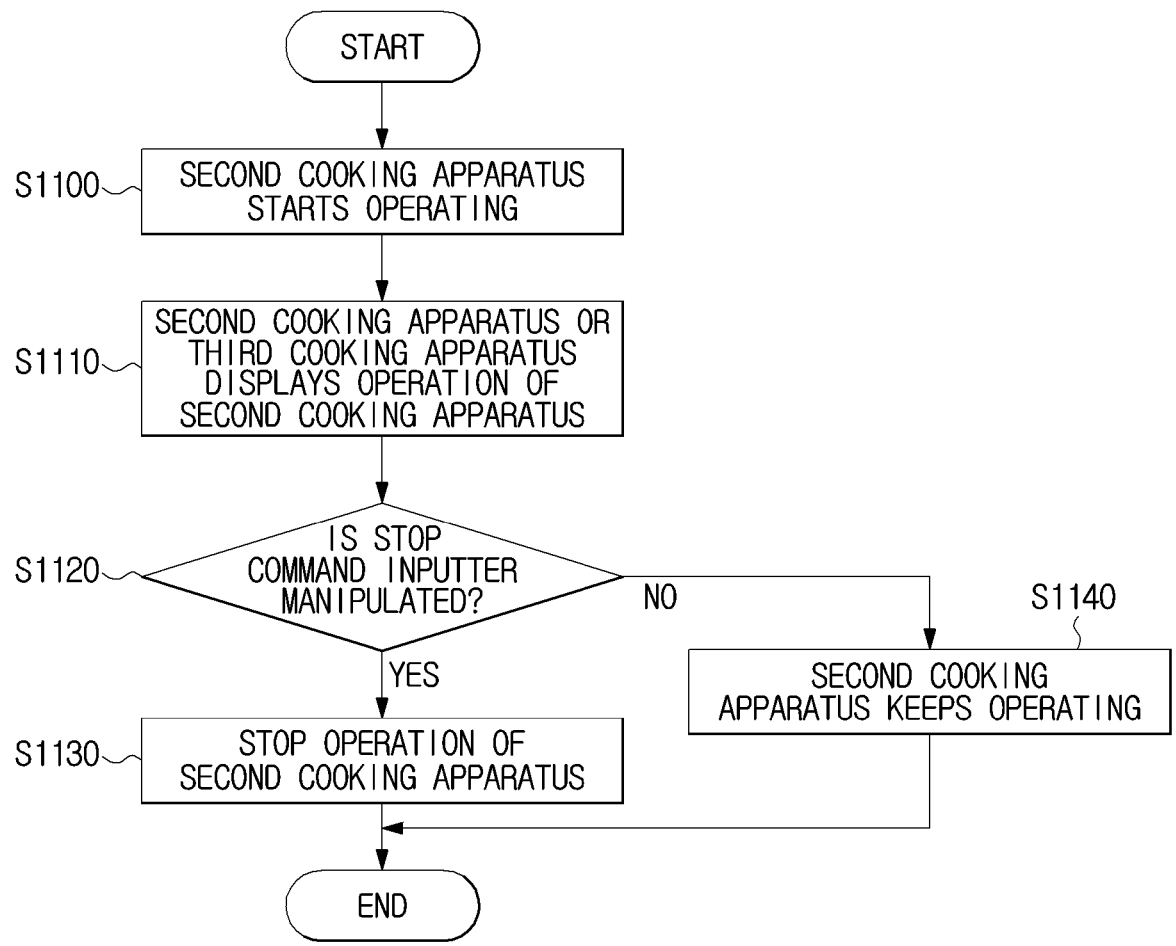
FIG. 41 is a flowchart of a method of controlling a cooking apparatus according to an embodiment of the present disclosure.
Figure 42:
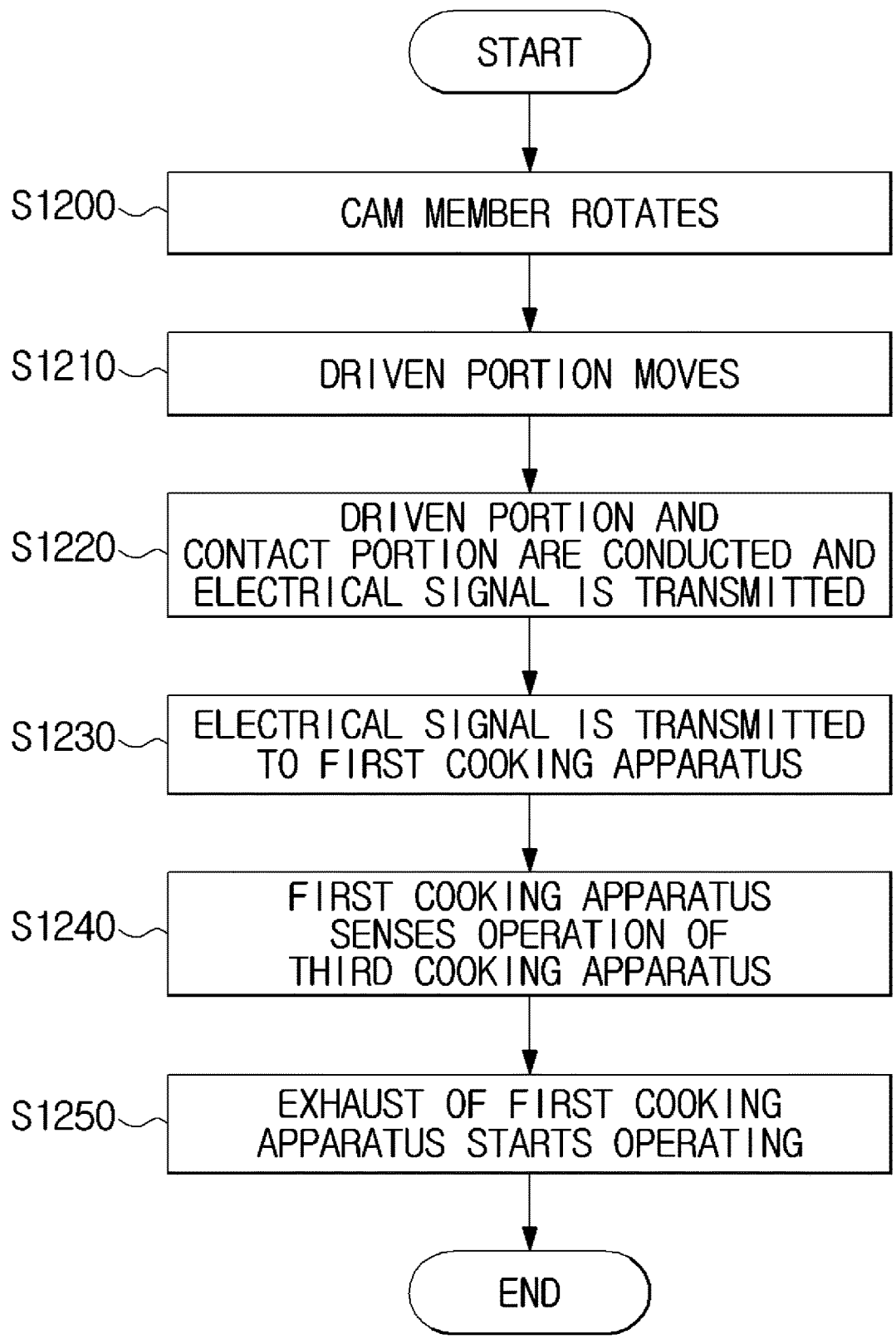
FIG. 42 is a flowchart of a method of controlling a cooking apparatus according to an embodiment of the present disclosure.

Methods illustrated in FIGS. 40, 41, and 42 relate to a method in which one or more of a plurality of cooking apparatuses are used to control one or more other cooking apparatuses when the plurality of cooking apparatuses are provided. Hereinafter, it will be assumed that two or three cooking apparatuses are provided, and each of the cooking apparatuses will be referred to as a first cooking apparatus, a second cooking apparatus, and a third cooking apparatus. According to an embodiment, the number of cooking apparatuses may be two or four or more.

Types of a first cooking apparatus, a second cooking apparatus, and a third cooking apparatus may vary depending on a designer's choice. For example, the first cooking apparatus may be one or more of an electric oven, a gas oven, and a microwave oven, and the second cooking apparatus may be one or more of the electric oven, the gas oven, and the microwave oven. The third cooking apparatus may be one or more of the electric oven, the gas oven, the microwave oven, a gas stove, and an electric stove. The first cooking apparatus, the second cooking apparatus, and the third cooking apparatus may be different types of cooking apparatuses. In addition, according to an embodiment, at least two of the first cooking apparatus, the second cooking apparatus, and the third cooking apparatus may be the same type of cooking apparatus, or all of the first cooking apparatus, the second cooking apparatus, and the third cooking apparatus may be the same type of cooking apparatus.

At least two of the first cooking apparatus, the second cooking apparatus, and the third cooking apparatus are designed to be able to communicate with each other, and the communication may be realized using one or more of a wired communication network or a wireless communication network. The wired communication network may be realized using a cable such as a pair cable, a coaxial cable, an optical fiber cable, or an Ethernet cable, and the wireless communication network may be realized using a wireless LAN, a Wi-Fi, Bluetooth, ZigBee, CAN communication, WFD, UWB communication, IrDA communication, Bluetooth low energy communication, NFC, and various types of mobile communication technologies based on 3GPP, 3GPP2, and Wi-Max.

One or more of the first cooking apparatus, the second cooking apparatus, and the third cooking apparatus may communicate with a separate terminal device, e.g., a smartphone or a laptop computer, through a wired communication network or a wireless communication network, and receive a user command from the terminal device or transmit information on one or more of the first cooking apparatus, the second cooking apparatus, and the third cooking apparatus to the terminal device.

FIG. 40 is a flowchart of a method of controlling a cooking apparatus according to an embodiment of the present disclosure.

Although a first cooking apparatus includes a user interface and a controlling device, e.g., a central processing unit (CPU) or an MCU, configured to control the first cooking apparatus and a second cooking apparatus, the second cooking apparatus may not be equipped with a user interface or a controlling device. According to an embodiment, the second cooking apparatus may include a simple level of a user interface, e.g., a lighting device configured to display a current state and the like.

Referring to FIG. 40, first, a user command may be input through a user interface of a first cooking apparatus at operation S1000. Here, the user command may include various commands such as commands related to starting cooking, stopping cooking, ending cooking, setting a cooking time, changing the cooking time, scheduling cooking, setting a cooking temperature, selecting an operation mode of a second cooking apparatus, and cleaning the second cooking apparatus.

The first cooking apparatus may determine whether the input user command is related to the first cooking apparatus or the second cooking apparatus at operations S1010 and S1030. In this case, the first cooking apparatus may determine what the input user command is related to according to whether the user interface is set to receive a command related to the second cooking apparatus or according to which one of various inputters, e.g., a physical button and a touch sensor, provided at the user interface has been manipulated.

When it is determined that a user command related to the first cooking apparatus has been input (YES to S1010), the first cooking apparatus may perform an operation corresponding to the user command according to the input user command. For example, the first cooker provided at the first cooking apparatus may start operating to perform a cooking operation at operation S1020.

When it is determined that a user command related to the second cooking apparatus has been input (YES to S1030), the first cooking apparatus may convert the input user command into a communicable form and transmit the user command to the second cooking apparatus through the wired and wireless communication networks described above at operation S1040.

When the user command is neither a command related to the first cooking apparatus nor a command related to the second cooking apparatus, e.g., when a command not corresponding to preset settings is input, the first cooking apparatus may output an error signal at operation S1080. Here, the error signal may include, for example, a message that requests that a command be re-input.

The second cooking apparatus receives the user command transmitted from the first cooking apparatus and starts an operation according to the received user command at operation S1050. For example, the second cooker of the second cooking apparatus may start operating according to the user command and cook a heating target at a predetermined temperature.

According to an embodiment, the second cooking apparatus may also transmit information on a state of the second cooking apparatus to the first cooking apparatus to be displayed to the user at operation S1060. The transmission of the information may be performed during a cooking operation or even when the cooking operation is not being performed. Here, the information on the state of the second cooking apparatus may include whether the second cooking apparatus is operating, an elapsed cooking time, a temperature of the second cooking apparatus, whether cooking has ended, whether a failure or an error has occurred in the second cooking apparatus, and various other types of information on the second cooking apparatus.

Upon receiving the information on the state of the second cooking apparatus, the first cooking apparatus may display the received information through the user interface at operation S1070. In this case, the first cooking apparatus may use a single display capable of selectively displaying a state related to the first cooking apparatus and a state related to the second cooking apparatus to display the information on the state of the second cooking apparatus. In addition, the first cooking apparatus may use a plurality of displays capable of respectively displaying a state related to the first cooking apparatus and a state related to the second cooking apparatus to display information on the state of the second cooking apparatus. For example, when the display includes a first display and a second display, the first cooking apparatus may use the second display to display a state related to the second cooking apparatus to be provided to the user. In this case, the first display may display a state related to the first cooking apparatus.

In this way, the user may use a separate cooking apparatus to control another cooking apparatus or be notified of a state related to the other cooking apparatus. When the first cooking apparatus is an OTR microwave oven with a user interface provided at an eye level of the user, the user may acquire information on various cooking apparatuses and control the various cooking apparatuses through the OTR microwave oven more comfortably without changing his or her posture, thereby improving convenience of the user.

FIG. 41 is a flowchart of a method of controlling a cooking apparatus according to an embodiment of the present disclosure.

Referring to FIG. 41, first, a second cooking apparatus may start operating at operation S1100. In this case, the second cooking apparatus may start a predetermined operation according to a user command input through the user interface of the first cooking apparatus described above.

When the second cooking apparatus starts operating, one or more of the second cooking apparatus and a third cooking apparatus may display information on the operation of the second cooking apparatus at operation S1110. In this case, the third cooking apparatus may be a cooking apparatus installed above the second cooking apparatus. For example, the second cooking apparatus may be an oven such as an electric oven and a gas oven, and the third cooking apparatus maybe a gas stove or an electric stove installed above the oven.

The displaying of the information on operation of the second cooking apparatus may be performed by an operation state display provided at one or more of the second cooking apparatus and the third cooking apparatus, and the operation state display may be realized using various types of lighting devices capable of emitting light of a predetermined color such as an LED lamp, a fluorescent lamp, a UV lamp, a halogen lamp, a mercury lamp, a sodium lamp, and an incandescent lamp. In this case, to simplify an inner structure of the second cooking apparatus or the third cooking apparatus, a separate controlling device configured to control the operation state display may not be provided inside the second cooking apparatus and the third cooking apparatus.

According to an embodiment, a stop command inputter configured to temporarily interrupt or non-temporarily stop an operation of the second cooking apparatus may be provided at one or more of the second cooking apparatus and the third cooking apparatus.

When the stop command inputter is manipulated (YES to S1120), the second cooking apparatus temporarily interrupt or non-temporarily stops the operation at operation S1130. When the stop command inputter is provided at the third cooking apparatus, the third cooking apparatus may transmit an electrical signal generated according to the manipulation of the stop command inputter or a signal corresponding thereto to the second cooking apparatus through wired and wireless communication networks, and the second cooking apparatus stops an operation in progress, e.g., a cooking operation, based on the received signal.

When the stop command inputter is not manipulated (NO to S1120), the second cooking apparatus keeps performing the operation in progress without stopping the operation S1140.

FIG. 42 is a flowchart of a method of controlling a cooking apparatus according to an embodiment of the present disclosure.

Meanwhile, a first cooking apparatus may operate according to whether a third cooking apparatus is operating. For example, when the third cooking apparatus is a gas stove or an electric stove, and the first cooking apparatus is an OTR microwave oven, an exhaust provided at a lower end of the first cooking apparatus may operate according to an operation of the third cooking apparatus. Hereinafter, a method of controlling a cooking apparatus according to an embodiment in a case in which the third cooking apparatus is a gas stove and includes an ignition switch configured to ignite a burner of the gas stove will be described.

In a case in which a gripping portion of an ignition switch is designed to rotate together with a cam member, when the gripping portion of a third cooking apparatus rotates, the cam member also rotates due to the rotation of the gripping portion at operation S1200 as illustrated in FIG. 42. Here, the cam member may have a first driver and a second driver. An ignition plug driver may drive an ignition plug according to an operation of the first driver, and an ignition switch manipulation sensor may sense an operation of an ignition switch according to an operation of the second driver.

For example, when the cam member rotates, the second driver rotates, and a driven portion of the ignition switch manipulation sensor provided to abut the second driver moves as a result at operation S1210.

The driven portion moves toward a contact portion to come into contact with the contact portion. When the driven portion and the contact portion come into contact with each other, the driven portion and the contact portion are conducted and an electrical signal may be transmitted therebetween at operation 51220. Accordingly, an electrical signal introduced into the ignition switch manipulation sensor may be transmitted to a third communicator provided at the third cooking apparatus. In this way, whether the ignition switch has been manipulated may be sensed.

The third communicator may transmit the electrical signal to a first communicator of the first cooking apparatus at operation S1230. In this case, the third communicator may be designed to convert the electrical signal into a communicable form, and the first communicator of the first cooking apparatus may be designed to invert the converted signal to acquire the original electrical signal.

The first cooking apparatus, particularly a controlling device of the first cooking apparatus, may determine that the third cooking apparatus has started operating based on the received electrical signal at operation S1240.

Then, the controlling device generates a control signal related to a fan driver of the exhaust of the first cooking apparatus and transmits the generated control signal to the fan driver to rotate a fan provided toward the third cooking apparatus, thereby suctioning smoke generated due to a cooking operation of the third cooking apparatus through a suction hole of the exhaust at operation S1250. Consequently, the first cooking apparatus may automatically perform a smoke suctioning operation according to the operation of the third cooking apparatus.

The methods of controlling a cooking apparatus according to the embodiments described above may be realized in the form of a program that may be executed through various computer means. Here, the program may include a program command, a data file, a data structure, etc., alone or in a combination. Here, the program may be designed and produced using, for example, a machine language code generated by a compiler as well as a high-level language code that may be executed by a computer using an interpreter and the like. In addition, the program may be a program exclusively designed to realize the methods of controlling a cooking apparatus described above, or may be a program realized using various types of functions or definitions already known to and usable by those of ordinary skill in the computer software field.

A program for realizing the methods of controlling a cooking apparatus described above may be recorded in a computer readable recording medium. The computer readable recording medium may include various types of recording media capable of storing particular programs executed according to a call from a computer and the like, including magnetic disk storage media such as a hard disk and a floppy disk, a magnetic tape, various types of optical media such as a compact disc (CD) and a digital versatile disc (DVD), magneto-optical media such as a floptical disk, and semiconductor storage devices such as a read-only memory (ROM), a random access memory (RAM), and a flash memory.

According to a cooking apparatus, a cooking apparatus controlling system, and a method of controlling a cooking apparatus described above, the cooking apparatus acquires information on whether another separately provided cooking apparatus is operating and performs an operation based on the acquired information such that the cooking apparatus can start and perform an operation in response to the operation of the other cooking apparatus.

According to a cooking apparatus, a cooking apparatus controlling system, and a method of controlling a cooking apparatus described above, even when another separately provided cooking apparatus is not equipped with an information provider, information on an operation of the other cooking apparatus can be provided using the cooking apparatus, and a user can recognize whether the other cooking apparatus is operating as a result.

According to a cooking apparatus, a cooking apparatus controlling system, and a method of controlling a cooking apparatus described above, when an electric stove disposed below the cooking apparatus is operating, the cooking apparatus can perform an operation of suctioning gas generated during a cooking process using the electric stove, and a safe cooking environment can be provided to a user as a result.

According to a cooking apparatus, a cooking apparatus controlling system, and a method of controlling a cooking apparatus described above, when an electric stove is disposed below the cooking apparatus, the cooking apparatus performs a gas suctioning operation only in response to an operation of the electric stove, thereby preventing a malfunction of the cooking apparatus.

According to a cooking apparatus, a cooking apparatus controlling system, and a method of controlling the cooking apparatus described above, the cooking apparatus can determine whether a gas supply valve of an electric stove is open and perform an exhaust operation according to a determined result.

Although a cooking apparatus, a cooking apparatus controlling system, and a method of controlling a cooking apparatus according to various embodiments have been described above, the cooking apparatus, the cooking apparatus controlling system, and the method of controlling a cooking apparatus are not limited to the embodiments described above but also include various other embodiments that may be realized by those of ordinary skill in the art modifying and changing the embodiments described above. For example, the technologies described above may be coupled or combined in forms differing from ways in which elements of systems, structures, devices, circuits, and the like are described above, may be replaced or substituted with other elements or their equivalents, or may be performed in an order differing from the ways described above. A result identical or similar to that achieved by a program stored for the cooking apparatus, the cooking apparatus controlling system, and the method of controlling a cooking apparatus described above may be acquired even by altered systems, structures, devices, and methods.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A cooking apparatus controlling system comprising:
    a first cooking apparatus including an exhaust provided at a bottom surface of the first cooking apparatus; and
    a second cooking apparatus capable of communicating with the first cooking apparatus and positioned below the first cooking apparatus,
    wherein the second cooking apparatus comprises:
        an ignition switch assembly configured to ignite a heat source based on a rotation of a gripping portion of an ignition switch and output a detection signal related to the rotation of the gripping portion; and
        a communicator configured to transmit the detection signal to the first cooking apparatus,
    wherein the exhaust is configured to operate in response to receiving the detection signal transmitted from the second cooking apparatus, and
    wherein the ignition switch assembly comprises:
        a cam configured to rotate by rotation of the gripping portion and including a first driver and a second driver extending from the first driver;
        an ignition plug driver configured to output an electrical signal for igniting the heat source by rotation of the first driver; and
        an ignition switch manipulation sensor configured to the detection signal by rotation of the second driver.

2. The cooking apparatus controlling system of claim 1, wherein the ignition plug driver comprises:
    a first driven portion configured to move based on the rotation of the first driver, and a first contact portion configured to contact with the first driven portion or be spaced apart from the first driven portion based on movement of the first driven portion, and wherein the ignition switch manipulation sensor comprises:
- a second driven portion configured to move based on the rotation of the second driver, and
- a second contact portion configured to contact with the second driven portion or be spaced apart from the second driven portion based on movement of the second driven portion.

3. The cooking apparatus controlling system of claim 2, wherein the first driver of the cam comprises a protrusion formed at a portion of an outer surface of the first driver, and wherein the second driver of the cam comprises a groove recessed toward a center at a portion of an outer surface of the second driver.

4. The cooking apparatus controlling system of claim 3, wherein the second driven portion comprises:
- a groove coupler inserted into the groove of the second driven portion or separated from the groove of the second driven portion by the rotation of the second driver; and
- a contact terminal contacting the second contact portion or being spaced apart from the second contact portion by the rotation of the second driver.

5. The cooking apparatus controlling system of claim 1, wherein the communicator is further configured to communicate with the first cooking apparatus based on at least one of Wi-Fi, Bluetooth, Bluetooth low energy communication, ZigBee, Wi-Fi direct (WFD), ultra-wideband (UWB) communication, infrared data association (IrDA) communication, or near field communication (NFC).

6. A method of controlling a cooking apparatus, the method comprising:
- detecting a manipulation of a gripping portion of an ignition switch included in a second cooking apparatus positioned below a first cooking apparatus;
- transmitting a detection signal related to rotation of the gripping portion to the first cooking apparatus; and
- starting an operation of an exhaust provided at a bottom surface of the first cooking apparatus in response to receiving the detection signal, wherein the detecting of the manipulation of the gripping portion comprises:
- moving a driven portion of an ignition switch manipulation sensor provided around a cam according to rotation of the cam connected to the gripping portion, and
- contacting the driven portion to contact portion of the ignition switch manipulation sensor.

7. The method of according to claim 6, wherein the moving of the driven portion comprises:
- separating a groove coupler of the driven portion from a groove provided at a portion of an outer surface of the cam.

* * * * *